US011821500B2

(12) United States Patent
Bourgault et al.

(10) Patent No.: US 11,821,500 B2
(45) Date of Patent: Nov. 21, 2023

(54) METHOD AND SYSTEM FOR HARNESSING WIND ENERGY USING A TETHERED AIRFOIL

(71) Applicant: NEW LEAF MANAGEMENT LTD., Vancouver (CA)

(72) Inventors: Frederic Bourgault, Vancouver (CA); Devin Todd, Abbotsford (CA); Jason Beatch, Maple Ridge (CA); Mojtaba Kheiri, Burnaby (CA); David Luke Damron, Vancouver (CA); Vahid Saberi Nasrabad, Vancouver (CA)

(73) Assignee: NEW LEAF MANAGEMENT LTD., Vancouver (CA)

( * ) Notice: Subject to any disclaimer, the term of this patent is extended or adjusted under 35 U.S.C. 154(b) by 1034 days.

(21) Appl. No.: 16/616,391

(22) PCT Filed: Dec. 6, 2017

(86) PCT No.: PCT/CA2017/051478
§ 371 (c)(1),
(2) Date: Nov. 22, 2019

(87) PCT Pub. No.: WO2018/213913
PCT Pub. Date: Nov. 29, 2018

(65) Prior Publication Data
US 2020/0080541 A1   Mar. 12, 2020

Related U.S. Application Data

(60) Provisional application No. 62/533,531, filed on Jul. 17, 2017, provisional application No. 62/510,265, filed on May 23, 2017.

(51) Int. Cl.
*F03D 9/28* (2016.01)
*F04B 17/02* (2006.01)
(Continued)

(52) U.S. Cl.
CPC ............... *F16H 39/02* (2013.01); *F03C 1/04* (2013.01); *F03C 1/0409* (2013.01);
(Continued)

(58) Field of Classification Search
CPC ..... F03D 5/00; F03D 9/17; F03D 9/28; F03C 1/04; F03C 1/0409; F03C 1/0419; F04B 17/02; Y02E 10/70
See application file for complete search history.

(56) References Cited

U.S. PATENT DOCUMENTS 4,124,182 A   11/1978   Arnold
4,251,040 A    2/1981   Loyd
(Continued)

FOREIGN PATENT DOCUMENTS

CA   2784201 A1   2/2012
EP   0494236 B1  12/1995
(Continued)

OTHER PUBLICATIONS

Crosswind Kite Power Miles L. Loyd, 1980. Journal of Energy, vol. 4, No. 3, 1980, pp. 106-111.

*Primary Examiner* — Michael Leslie
(74) *Attorney, Agent, or Firm* — D'Ambrosio & Menon, PLLC; Usha Menon

(57) ABSTRACT

Methods, systems, and techniques for harnessing wind energy use a tethered airfoil and a digital hydraulic pump and motor, which may optionally be a combined pump/motor. During a traction phase, a wind powered airfoil is allowed to extend a tether and a portion of the wind energy harnessed through extension of the tether is stored prior to distributing the wind energy to an electrical service. During a retraction phase, the wind energy that is stored during the
(Continued)

traction phase is used to retract the tether. The digital hydraulic pump and motor are mechanically coupled to the tether.

69 Claims, 30 Drawing Sheets

(51) Int. Cl.

| | | |
|---|---|---|
| *F03D 9/17* | (2016.01) | |
| *F03C 1/04* | (2006.01) | |
| *F16H 39/02* | (2006.01) | |
| *F03D 15/10* | (2016.01) | |
| *F03D 5/00* | (2006.01) | |
| *F04B 1/043* | (2020.01) | |
| *F03C 1/30* | (2006.01) | |
| *F04B 1/0408* | (2020.01) | |
| *F04B 1/0421* | (2020.01) | |
| *F04B 7/00* | (2006.01) | |
| *F04B 9/103* | (2006.01) | |
| *F04B 9/109* | (2006.01) | |
| *F04B 9/129* | (2006.01) | |
| *F03C 1/22* | (2006.01) | |
| *F03C 1/053* | (2006.01) | |
| *F04B 1/0404* | (2020.01) | |
| *F04B 1/0413* | (2020.01) | |
| *F04B 1/0538* | (2020.01) | |

(52) U.S. Cl.
CPC .............. *F03C 1/0419* (2013.01); *F03D 5/00* (2013.01); *F03D 9/17* (2016.05); *F03D 9/28* (2016.05); *F03D 15/10* (2016.05); *F04B 1/043* (2013.01); *F04B 1/0408* (2013.01); *F04B 1/0421* (2013.01); *F04B 7/0065* (2013.01); *F04B 9/103* (2013.01); *F04B 9/109* (2013.01); *F04B 9/129* (2013.01); *F04B 17/02* (2013.01); *F03C 1/053* (2013.01); *F03C 1/223* (2013.01); *F03C 1/226* (2013.01); *F04B 1/0404* (2013.01); *F04B 1/0413* (2013.01); *F04B 1/0538* (2013.01); *F05B 2240/9172* (2020.08); *Y02E 10/70* (2013.01)

(56) References Cited

U.S. PATENT DOCUMENTS

| | | |
|---|---|---|
| 4,496,846 A | 1/1985 | Parkins |
| 6,555,931 B2 | 4/2003 | Mizzi |
| 6,681,571 B2 | 1/2004 | Bailey et al. |
| 7,504,741 B2 | 3/2009 | Wrage et al. |
| 8,602,363 B2 | 12/2013 | Larson |
| 8,622,719 B2 | 1/2014 | Tsutsumi et al. |
| 9,003,954 B2 * | 4/2015 | Salter .................. F03D 9/28 92/72 |
| 9,046,072 B2 | 6/2015 | Tattersfield et al. |
| 9,103,438 B2 | 8/2015 | Caldwell et al. |
| 9,328,720 B2 * | 5/2016 | Caldwell ................ F04B 17/02 |
| 2005/0046197 A1 | 3/2005 | Kingsley |
| 2007/0228738 A1 | 10/2007 | Wrage et al. |
| 2011/0030361 A1 | 2/2011 | Gopalswamy |
| 2011/0272527 A1 | 11/2011 | Larson |
| 2012/0045327 A1 | 2/2012 | Caldwelll et al. |
| 2012/0059523 A1 | 3/2012 | Salter et al. |
| 2012/0117958 A1 | 5/2012 | Caldwelll et al. |
| 2013/0285377 A1 | 10/2013 | Tattersfield et al. |
| 2015/0048621 A1 | 2/2015 | Smeenk et al. |
| 2016/0208898 A1 | 7/2016 | Caldwelll et al. |

FOREIGN PATENT DOCUMENTS

| | | |
|---|---|---|
| EP | 1319836 A2 | 6/2003 |
| EP | 2481916 A1 | 8/2012 |
| EP | 2631468 B1 | 8/2013 |
| EP | 2732155 B1 | 6/2015 |
| EP | 2529112 B1 | 8/2015 |
| EP | 2726737 B1 | 8/2015 |
| EP | 3091230 A1 | 11/2016 |
| FR | 2949248 A1 | 2/2011 |
| GB | 2469740 A | 10/2010 |
| JP | 2013503279 A | 1/2013 |
| JP | 2013535612 A | 9/2013 |
| WO | 2010053389 A2 | 5/2010 |
| WO | 2010053389 A3 | 5/2010 |
| WO | 2011104544 A2 | 9/2011 |
| WO | 2011147997 A2 | 12/2011 |
| WO | 2012022924 A1 | 2/2012 |
| WO | 20120022924 A1 | 2/2012 |
| WO | 2012102622 A1 | 8/2012 |
| WO | 2013090230 A1 | 6/2013 |
| WO | 2014002142 A1 | 1/2014 |
| WO | 2014006663 A1 | 1/2014 |
| WO | 2014054072 A1 | 4/2014 |
| WO | 2014063258 A1 | 5/2014 |
| WO | 2017010890 A2 | 1/2017 |

* cited by examiner

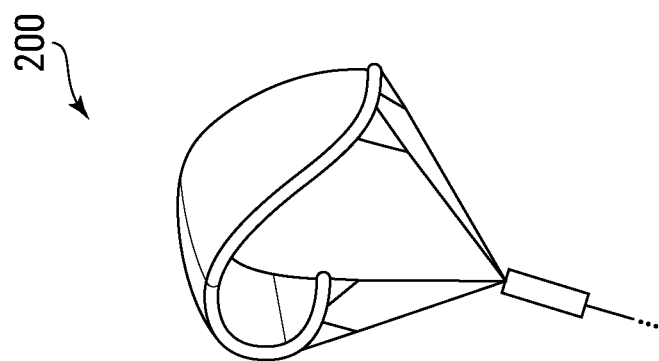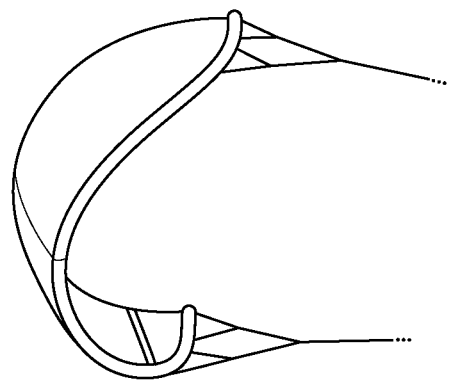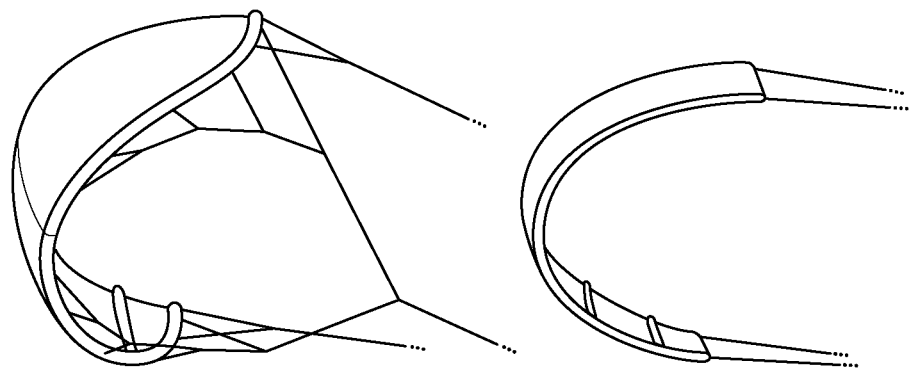
FIG. 2B

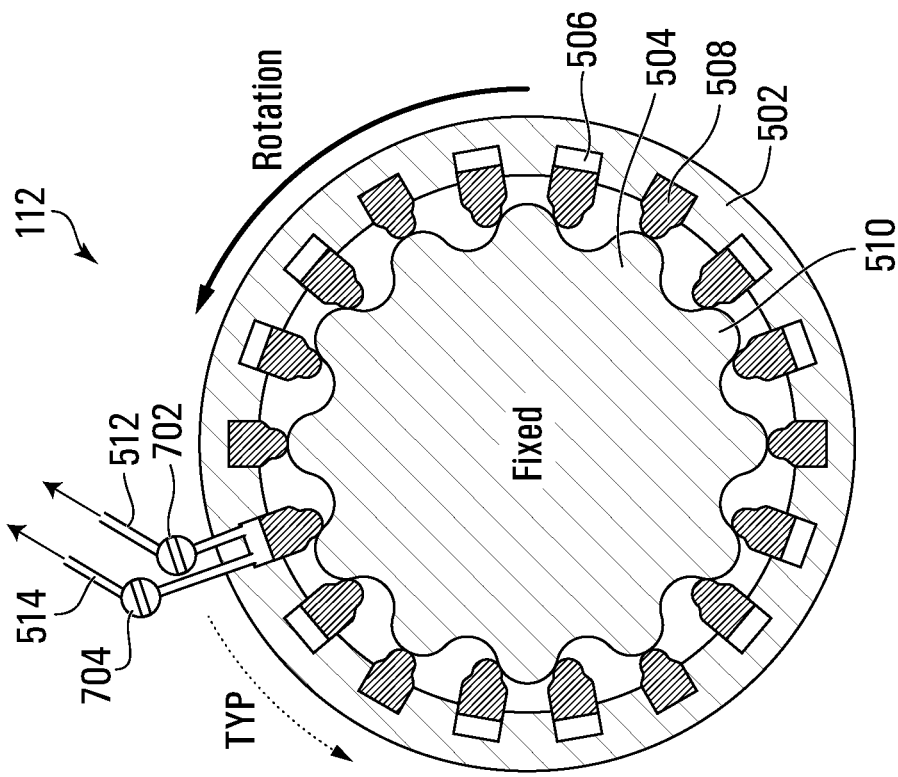
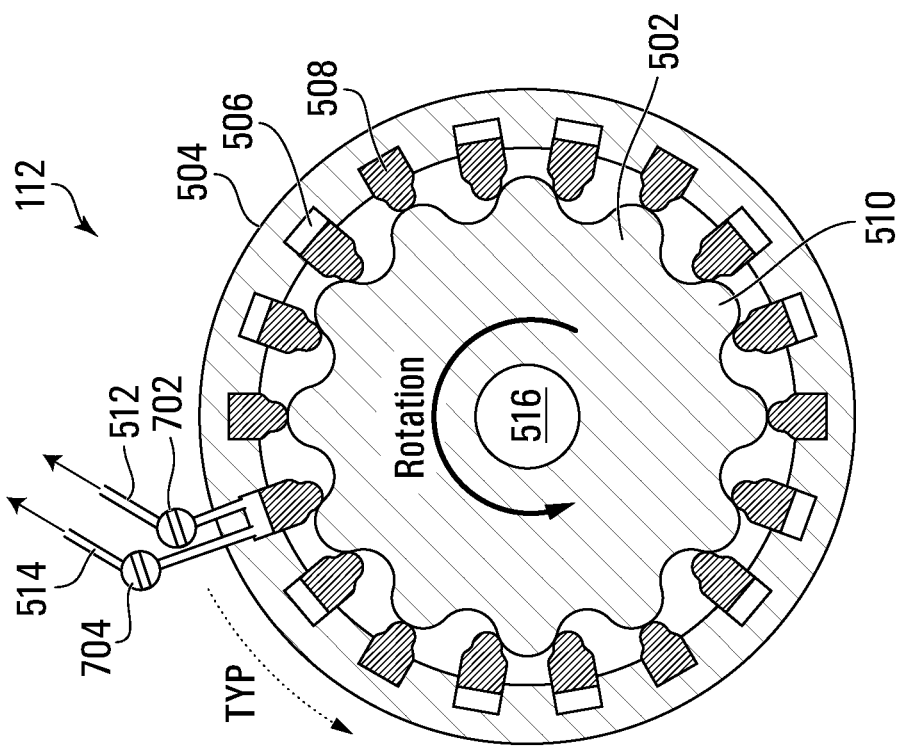
FIG. 5B
FIG. 5A

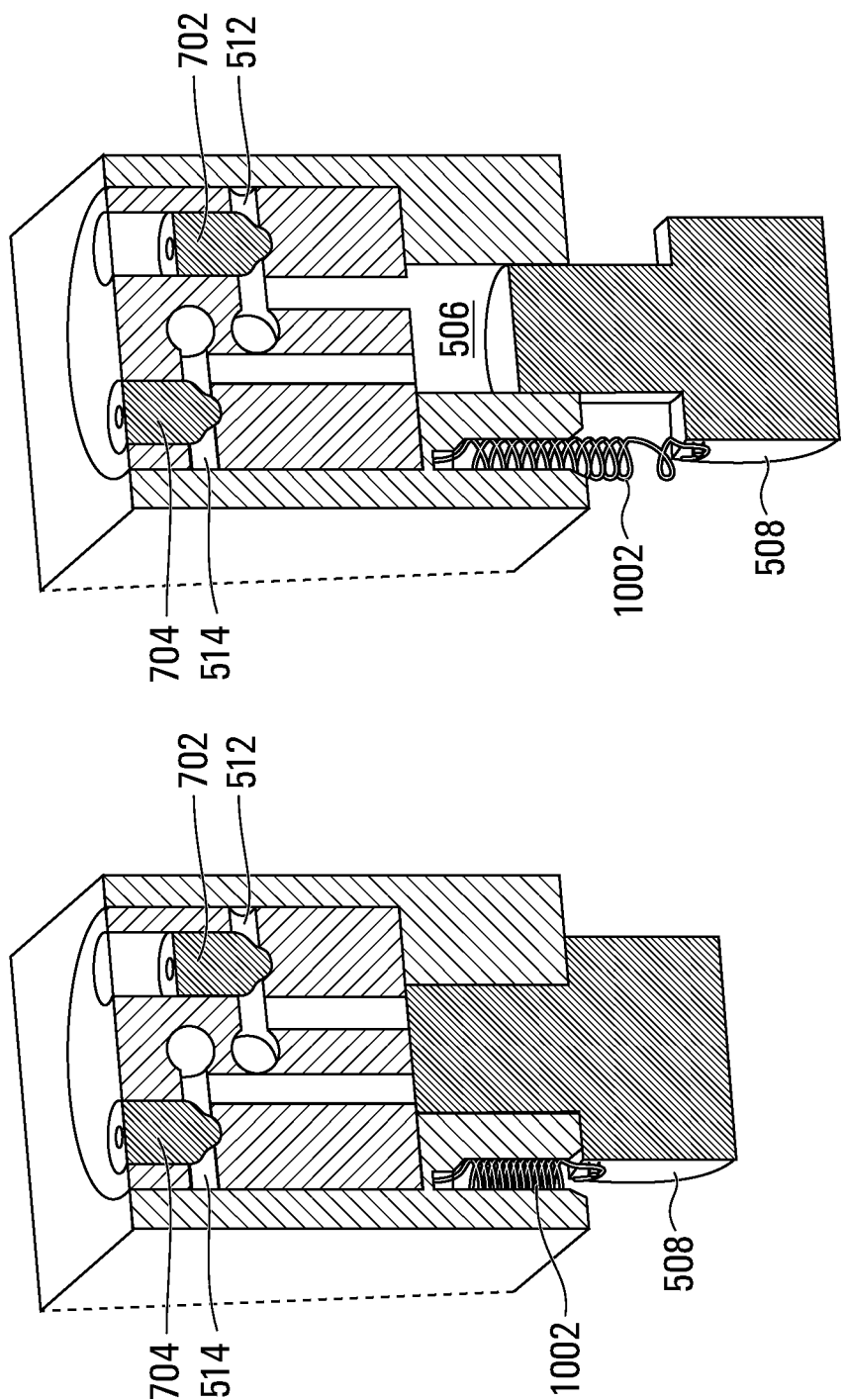

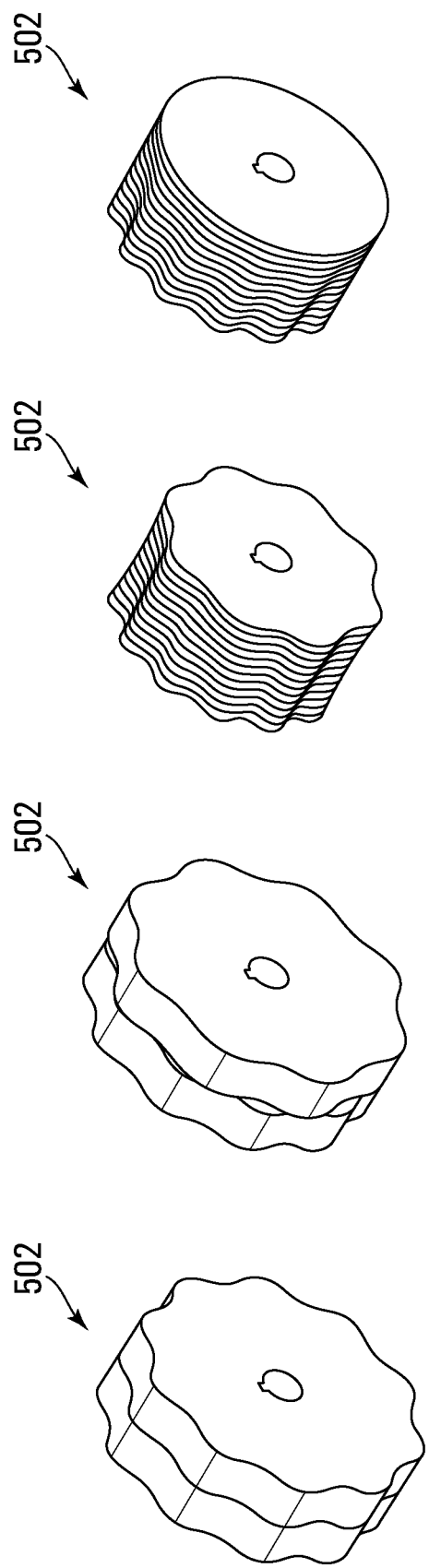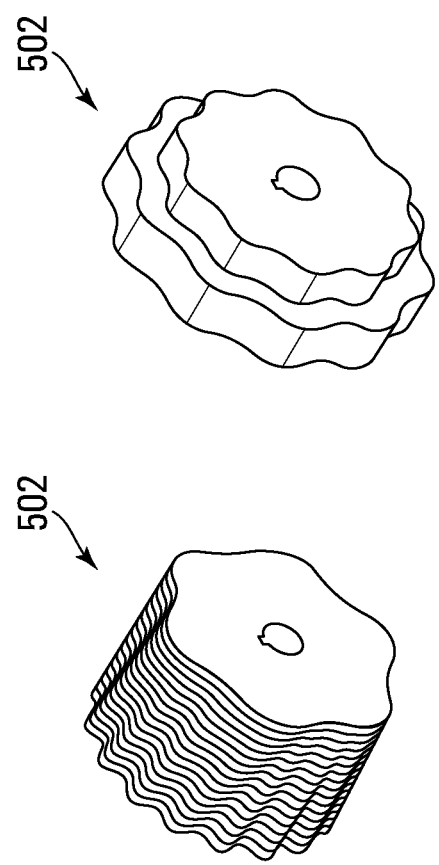

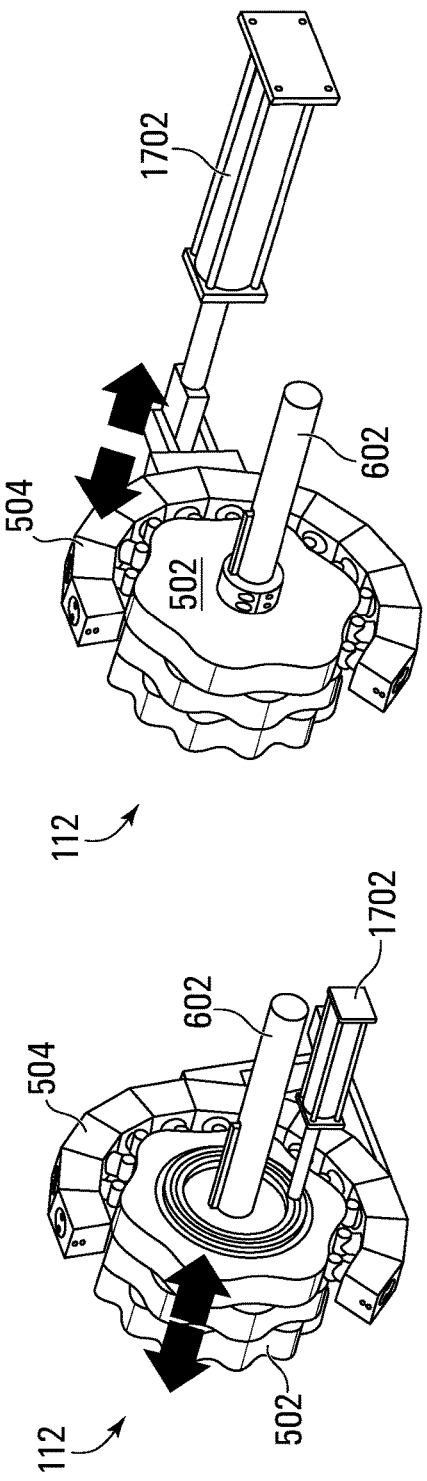
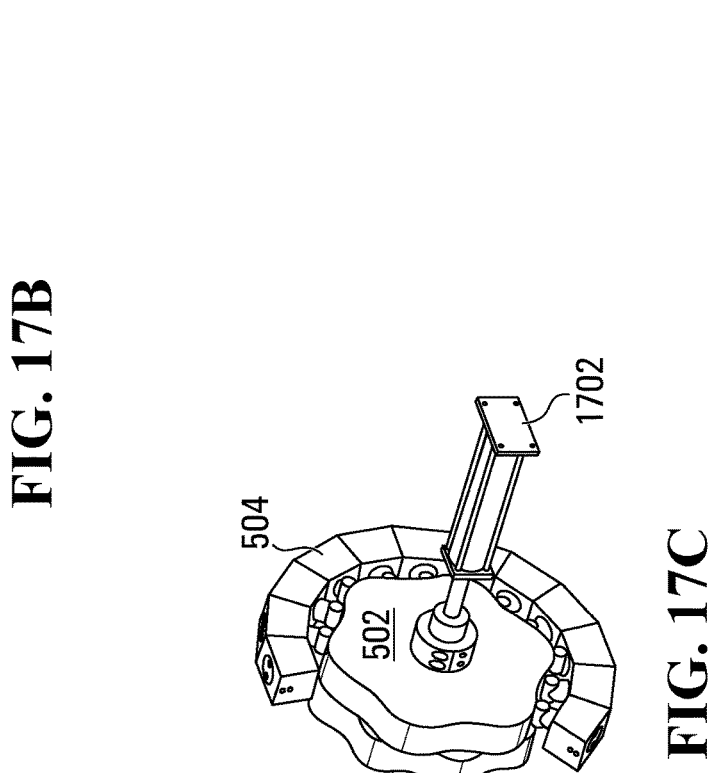
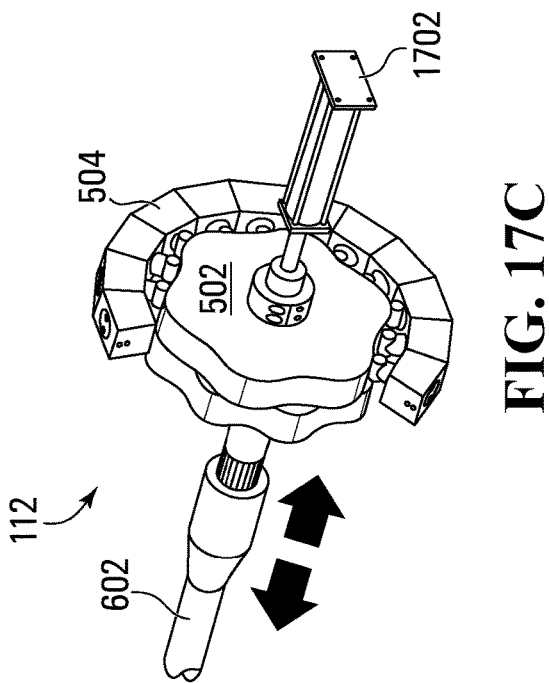
FIG. 17A
FIG. 17B
FIG. 17C

METHOD AND SYSTEM FOR HARNESSING WIND ENERGY USING A TETHERED AIRFOIL

TECHNICAL FIELD

The present disclosure is directed at methods, systems, and techniques for harnessing wind energy using a tethered airfoil.

BACKGROUND

Obtaining power by burning fossil fuels can be environmentally harmful and, increasingly, is becoming uneconomical. One alternative to generating power by burning fossil fuels is to generate power by harnessing the wind.

Wind energy may be harnessed using different types of devices. For example, ground-mounted horizontal-axis and vertical-axis wind turbines harness wind energy near ground level. In contrast, airborne wind energy systems also exist, and are able to more flexibly harness wind energy at higher elevations.

SUMMARY

According to one aspect, there is provided a method for harnessing wind energy using a tethered airfoil. The method comprises, during a traction phase, allowing wind to extend a tether and storing at least some wind energy harnessed through extension of the tether prior to using the wind energy that is stored to generate electricity; and during a retraction phase, using at least some of the wind energy stored during the traction phase to retract the tether. The wind energy is harnessed using a digital hydraulic pump mechanically coupled to the tether.

At least some of the wind energy that is stored may be used to retract the tether using a digital hydraulic motor mechanically coupled to the tether.

The wind energy may be mechanically stored.

A digital hydraulic pump/motor may comprise the digital hydraulic pump and digital hydraulic motor.

The digital hydraulic pump/motor may comprise working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and lobes, wherein the lobes and working chambers are movable relative to each other and the lobes are shaped and positioned to cause the pistons to reciprocate when the working chambers and lobes move relative to each other and the pistons maintain contact with the lobes.

The method may further comprise deactivating, during the retraction phase, one or more of the working chambers that is active during the traction phase.

Deactivating one or more of the working chambers may comprise, for each of at least some of the working chambers to be deactivated, fluidly coupling the working chamber to the same pressure channel for multiple reciprocations of the piston responsive to pressure within the working chamber.

For each of at least some of the working chambers to be deactivated, the working chamber may be fluidly coupled to the low pressure channel for multiple reciprocations of the piston.

The digital hydraulic pump/motor may be configured, for a certain wind speed, to have a higher average displacement during the traction phase than the retraction phase.

For each of at least some of the working chambers to be deactivated, deactivating the working chamber may comprise determining when reciprocation of the piston causes the working chamber to be at less than maximum volume; and when the working chamber is at less than maximum volume, sealing the working chamber from the high and low pressure channels.

The working chamber may be sealed when a peak of one of the lobes is in contact with the piston.

For each of at least some of the working chambers to be deactivated, deactivating the working chamber may comprise fluidly coupling the working chamber to only the low pressure channel; increasing the pressure outside of the working chamber such that the piston moves to decrease the volume of the working chamber; and then sealing the working chamber from the low pressure channel.

Increasing the pressure outside of the working chamber may comprise increasing the pressure within a case that houses the working chambers and the lobes, and the method may further comprise sealing the working chambers that are to remain activated during the retraction phase from the high and low pressure channels prior to increasing the pressure within the case.

The pressure outside of the working chamber may be increased to higher than that of the low pressure channel.

The method may further comprise a tension spring within the working chamber and connected to the piston and the working chamber. The tension spring may be biased to draw the piston within the working chamber and to apply a force to the piston less than that applied to the piston from the low pressure channel when the working chamber is fluidly coupled to only the low pressure channel.

The method may further comprise a compression spring within at least one of the working chambers that is to remain activated during the retraction phase. The compression spring may be biased to push the piston out of the working chamber and to apply a force to the piston greater than the pressure within the case used to deactivate the at least some of the working chambers to be deactivated.

The working chambers to be deactivated may comprise a first and a second group of working chambers, and deactivating the one or more working chambers may comprise fluidly sealing the low pressure channel for the first group from the low pressure channel for the second group; fluidly coupling the first and second groups of working chambers to the low pressure channels for the first and second groups, respectively; pressurizing the low pressure channels for the first and second groups, wherein the low pressure channel for the first group is pressurized to a pressure higher than that of the low pressure channel for the second group; increasing the pressure outside of the first and second groups to be between the pressure of the low pressure channels for the first and second groups; and then sealing the second group from the low pressure channel for the second group.

The low pressure channels for the first and second groups may be fluidly coupled together when the first and second groups are activated.

The digital hydraulic pump/motor may comprise a first group and a second group of working chambers; a first and a second high pressure channel and a first and a second low pressure channel; for each of the working chambers, a piston movable in response to pressure within the working chamber, wherein each of the first and second groups of working chambers is selectively fluidly couplable to the first high and low pressure channels and the second high and low pressure channels to adjust the pressure, respectively; a first and second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes; a first case containing the first group of working chambers and the pistons movable in response to the pressure therein, first high and low pressure channels, and first group of lobes; and a second case containing the second group of working chambers and the pistons movable in response to the pressure therein, second high and low pressure channels, and second group of lobes. The first and second cases may be fluidly sealed from each other. The method may further comprise deactivating, during the retraction phase, at least some of one of the groups of the working chambers by pressurizing the case containing the one of the groups of working chambers to a pressure higher than that of the low pressure channel for the one of the groups.

The digital hydraulic pump/motor may comprise a first group and a second group of working chambers; a first and a second high pressure channel and a first and a second low pressure channel; for each of the working chambers, a piston movable in response to pressure within the working chamber, wherein each of the first and second groups of working chambers is selectively fluidly couplable to the first high and low pressure channels and the second high and low pressure channels to adjust the pressure, respectively; and a first and a second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes. The first group of working chambers may comprise part of one of a first rotor or a first stator and the first group of lobes may comprise part of the other of the first rotor or the first stator. The second group of working chambers may comprise part of one of a second rotor or a second stator and the second group of lobes may comprise part of the other of the second rotor or the second stator. A full rotation of the first rotor relative to the first stator may result in a higher displacement than a full rotation of the second rotor relative to the second stator. The method may further comprise, during the traction phase, harnessing the wind energy by allowing extension of the tether to cause rotation of at least the first rotor relative to the first stator and, during the retraction phase, retracting the tether using rotation of the second rotor relative to the second stator without allowing the first rotor to rotate relative to the first stator.

The first rotor and stator may respectively have a larger ring diameter than the second rotor and stator.

The first and second rotors may be respectively located along a first and a second shaft and wherein a clutch is operable to couple the shafts together.

Each of the rotors may be located along a shaft about which the rotors rotate and a first and a second clutch may respectively couple the first and second rotors to the shaft.

The digital hydraulic pump/motor may comprise working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and an axially extending ring of lobes, wherein the working chambers are axially and peripherally movable relative to the lobes, the lobes are shaped and positioned to cause the pistons to reciprocate when the working chambers and lobes respectively move peripherally relative to each other and the pistons maintain contact with the lobes, and the lobes axially vary in at least one of amplitude and number such that total displacement of the working chambers resulting from a full rotation of the ring of lobes depends on axial position of the working chambers relative to the lobes. The method may further comprise, axially moving the working chambers and ring of lobes relative to each other such that the total displacement of the working chambers is higher during the traction phase than the retraction phase.

The total displacement of the working chambers resulting from a full rotation of lobes relative to the working chambers may change monotonically as relative movement between the lobes and working chambers progresses axially in one direction.

As the lobes and working chambers move axially relative to each other in the one direction, the total displacement may change, stays constant, and then change again.

The ring of lobes may comprise part of a rotor and the working chambers may comprise part of a stator, and relative axial movement of the working chambers and ring of lobes may be caused by moving the ring of lobes axially along a shaft.

The ring of lobes may comprise part of a rotor and the working chambers may comprise part of a stator, and relative axial movement of the working chambers and ring of lobes may be caused by axially moving a shaft on which the ring of lobes is secured.

The ring of lobes may comprise part of a rotor and the working chambers may comprise part of a stator, and relative axial movement of the working chambers and ring of lobes may be caused by axially moving a case containing the working chambers.

The tether may be mechanically extended and retracted using a linear tether engine.

The linear tether engine may comprise wheels between which the tether is linearly extended and retracted.

The linear tether engine may comprise tracks between which the tether is linearly extended and retracted.

The linear tether engine may comprise belts between which the tether is linearly extended and retracted.

The tether may be mechanically extended and retracted using a tether engine, the tether engine comprising a drum around which the tether is wrapped; and a ring gear having a center aligned with an axis of rotation of the drum and fixedly coupled to the drum. The digital hydraulic motor and pump may respectively drive and be driven by the ring gear.

The digital hydraulic pump/motor may comprise a ring of working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and a cam-ring eccentrically positioned relative to the ring of working chambers, wherein the cam-ring and working chambers are rotatable relative to each other such that the pistons reciprocate when the working chambers and cam-ring rotate relative to each other and the pistons maintain contact with the cam-ring.

The method may further comprise generating electricity during the fraction and refraction phases using at least some of the wind energy that is harnessed during the traction phase to power a generator using an additional digital hydraulic motor that is mechanically coupled to the generator.

During the traction phase, the generator may be powered using wind energy that is harnessed and not stored during the traction phase.

During the traction phase, the generator may also be powered using wind energy that has been stored after being harnessed during the traction phase or a previous traction phase.

According to another aspect, there is provided a system for harnessing wind energy using a tethered airfoil. The system comprises an airfoil; a tether coupled to the airfoil; a tether engine coupled to the tether and configured to allow the tether to extend during a traction phase and to retract the tether during a refraction phase; a hydraulic circuit; a digital hydraulic pump mechanically coupled to the tether engine and hydraulically coupled to the hydraulic circuit, the hydraulic pump configured to transfer the wind energy harnessed via extension of the tether from the tether engine to the hydraulic circuit; a digital hydraulic motor mechanically coupled to the tether engine and hydraulically coupled to the hydraulic circuit, the hydraulic motor configured to convert energy from the hydraulic circuit to actuate the tether engine to retract the tether during the retraction phase; and a control system communicatively coupled to the hydraulic pump and motor. The control system is configured to perform a method comprising, during a traction phase, allowing wind to extend a tether and storing at least some wind energy harnessed through extension of the tether prior to using the wind energy that is stored to generate electricity; and during a refraction phase, using at least some of the wind energy stored during the traction phase to retract the tether.

The hydraulic circuit may comprise a high-pressure circuit; a low-pressure circuit; an accumulator hydraulically coupled to the high-pressure circuit and configured to store harnessed wind energy; and a low pressure reservoir hydraulically coupled to the low-pressure circuit.

A digital hydraulic pump/motor may comprise the digital hydraulic pump and digital hydraulic motor.

The digital hydraulic pump/motor may comprise working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and lobes, wherein the lobes and working chambers are movable relative to each other and the lobes are shaped and positioned to cause the pistons to reciprocate when the working chambers and lobes move relative to each other and the pistons maintain contact with the lobes.

The method may further comprise deactivating, during the retraction phase, one or more of the working chambers that is active during the traction phase.

Deactivating one or more of the working chambers may comprise, for each of at least some of the working chambers to be deactivated, fluidly coupling the working chamber to the same pressure channel for multiple reciprocations of the piston responsive to pressure within the working chamber.

For each of at least some of the working chambers to be deactivated, the controller may fluidly couple the working chamber to the low pressure channel for multiple reciprocations of the piston.

The controller may configure the digital hydraulic pump/motor to have, for a certain wind speed, a higher average displacement during the traction phase than the retraction phase.

For each of at least some of the working chambers to be deactivated, deactivating the working chamber may comprise determining when reciprocation of the piston causes the working chamber to be at less than maximum volume; and when the working chamber is at less than maximum volume, sealing the working chamber from the high and low pressure channels.

The controller may seal the working chamber when a peak of one of the lobes is in contact with the piston.

For each of at least some of the working chambers to be deactivated, deactivating the working chamber may comprise fluidly coupling the working chamber to only the low pressure channel; increasing the pressure outside of the working chamber such that the piston moves to decrease the volume of the working chamber; and then sealing the working chamber from the low pressure channel.

The digital hydraulic pump/motor may further comprise a case that houses the working chambers and the lobes, wherein increasing the pressure outside of the working chamber may comprise increasing the pressure within the case. The method may further comprise sealing the working chambers that are to remain activated during the retraction phase from the high and low pressure channels prior to increasing the pressure within the case.

The pressure outside of the working chamber may be increased to higher than that of the low pressure channel.

The digital hydraulic pump/motor may further comprise a tension spring within the working chamber and connected to the piston and the working chamber, the tension spring biased to draw the piston within the working chamber and to apply a force to the piston less than that applied to the piston from the low pressure channel when the working chamber is fluidly coupled to only the low pressure channel.

The digital hydraulic pump/motor may further comprise a compression spring within at least one of the working chambers that is to remain activated during the retraction phase, the compression spring biased to push the piston out of the working chamber and to apply a force to the piston greater than the pressure within the case used to deactivate the at least some of the working chambers to be deactivated.

The working chambers to be deactivated may comprise a first and a second group of working chambers, and deactivating the one or more working chambers may comprise fluidly sealing the low pressure channel for the first group from the low pressure channel for the second group; fluidly coupling the first and second groups of working chambers to the low pressure channels for the first and second groups, respectively; pressurizing the low pressure channels for the first and second groups, wherein the low pressure channel for the first group is pressurized to a pressure higher than that of the low pressure channel for the second group; increasing the pressure outside of the first and second groups to be between the pressure of the low pressure channels for the first and second groups; and then sealing the second group from the low pressure channel for the second group.

The controller may fluidly couple together the low pressure channels for the first and second groups when the first and second groups are activated.

The digital hydraulic pump/motor may comprise a first group and a second group of working chambers; a first and a second high pressure channel and a first and a second low pressure channel; for each of the working chambers, a piston movable in response to pressure within the working chamber, wherein each of the first and second groups of working chambers is selectively fluidly couplable to the first high and low pressure channels and the second high and low pressure channels to adjust the pressure, respectively; a first and second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes; a first case containing the first group of working chambers and the pistons movable in response to the pressure therein, first high and low pressure channels, and first group of lobes; and a second case containing the second group of working chambers and the pistons movable in response to the pressure therein, second high and low pressure channels, and second group of lobes. The first and second cases may be fluidly sealed from each other. The method may further comprise deactivating, during the retraction phase, at least some of one of the groups of the working chambers by pressurizing the case containing the one of the groups of working chambers to a pressure higher than that of the low pressure channel for the one of the groups.

The digital hydraulic pump/motor may comprise a first group and a second group of working chambers; a first and a second high pressure channel and a first and a second low pressure channel; for each of the working chambers, a piston movable in response to pressure within the working chamber, wherein each of the first and second groups of working chambers is selectively fluidly couplable to the first high and low pressure channels and the second high and low pressure channels to adjust the pressure, respectively; and a first and a second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes. The first group of working chambers may comprise part of one of a first rotor or a first stator and the first group of lobes comprises part of the other of the first rotor or the first stator. The second group of working chambers may comprise part of one of a second rotor or a second stator and the second group of lobes may comprise part of the other of the second rotor or the second stator. A full rotation of the first rotor relative to the first stator may result in a higher displacement than a full rotation of the second rotor relative to the second stator. The method may further comprise, during the traction phase, harnessing the wind energy by allowing extension of the tether to cause rotation of at least the first rotor relative to the first stator and, during the retraction phase, and retracting the tether using rotation of the second rotor relative to the second stator without allowing the first rotor to rotate relative to the first stator.

The first rotor and stator may respectively have a larger ring diameter than the second rotor and stator.

The system may further comprise a shaft on which the rotors rotate and a clutch, on the shaft, between the rotors.

The system may further comprise a shaft on which the rotors rotate, and a first clutch and a second clutch respectively coupling the first and second rotors to the shaft.

The digital hydraulic pump/motor may comprise working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and an axially extending ring of lobes, wherein the working chambers are axially and peripherally movable relative to the lobes, the lobes are shaped and positioned to cause the pistons to reciprocate when the working chambers and lobes respectively move peripherally relative to each other and the pistons maintain contact with the lobes, and the lobes axially vary in at least one of amplitude and number such that total displacement of the working chambers resulting from a full rotation of the ring of lobes depends on axial position of the working chambers relative to the lobes. The method may further comprise, axially moving the working chambers and ring of lobes relative to each other such that the total displacement of the working chambers is higher during the traction phase than the retraction phase.

The total displacement of the working chambers resulting from a full rotation of lobes relative to the working chambers may change monotonically as relative movement between the lobes and working chambers progresses axially in one direction.

As the lobes and working chambers move axially relative to each other in the one direction, the total displacement may change, stays constant, and then change again.

The ring of lobes may comprise part of a rotor and the working chambers may comprise part of a stator, and relative axial movement of the working chambers and ring of lobes may be caused by moving the ring of lobes axially along a shaft.

The ring of lobes may comprise part of a rotor and the working chambers may comprise part of a stator, and relative axial movement of the working chambers and ring of lobes may be caused by axially moving a shaft on which the ring of lobes is secured.

The ring of lobes may comprise part of a rotor and the working chambers may comprise part of a stator, and relative axial movement of the working chambers and ring of lobes may be caused by axially moving a case containing the working chambers.

The tether engine may linearly extend and retract the tether.

The tether engine may comprise wheels between which the tether is linearly extended and retracted.

The tether engine may comprise tracks between which the tether is linearly extended and retracted.

The tether engine may comprise belts between which the tether is linearly extended and retracted.

The tether engine may comprise a drum around which the tether is wrapped; and a ring gear having a center aligned with an axis of rotation of the drum and fixedly coupled to the drum; wherein the digital hydraulic motor and pump respectively drive and are driven by the ring gear.

The digital hydraulic pump/motor may comprise a ring of working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and a cam-ring eccentrically positioned relative to the ring of working chambers, wherein the cam-ring and working chambers are rotatable relative to each other such that the pistons reciprocate when the working chambers and cam-ring rotate relative to each other and the pistons maintain contact with the cam-ring.

The system may further comprise an additional digital hydraulic motor fluidly coupled to the hydraulic circuit and a generator mechanically coupled to the additional hydraulic motor, wherein the control system is further configured to power the generator during the traction and retraction phases using at least some of the wind energy that is harnessed.

During the traction phase, the generator may be powered using wind energy that is harnessed and not stored during the traction phase.

During the traction phase, the generator may also be powered using wind energy that has been stored after being harnessed during the traction phase or a previous traction phase.

According to another aspect, there is provided a non-transitory computer readable medium having stored thereon computer program code, executable by a processor, and that when executed by the processor causes the processor to perform the above recited method.

According to another aspect, there is provided a digital hydraulic machine, comprising, a first group and a second group of working chambers; a first and a second high pressure channel and a first and a second low pressure channel; for each of the working chambers, a piston movable in response to pressure within the working chamber, wherein each of the first and second groups of working chambers is selectively fluidly couplable to the first high and low pressure channels and the second high and low pressure channels to adjust the pressure, respectively; a first and second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes; a first case containing the first group of working chambers and the pistons movable in response to the pressure therein, first high and low pressure channels, and first group of lobes; and a second case containing the second group of working chambers and the pistons movable in response to the pressure therein, second high and low pressure channels, and second group of lobes; wherein the first and second cases are fluidly sealed from each other.

According to another aspect, there is provided a digital hydraulic machine, comprising. a first group and a second group of working chambers; a first and a second high pressure channel and a first and a second low pressure channel; for each of the working chambers, a piston movable in response to pressure within the working chamber, wherein each of the first and second groups of working chambers is selectively fluidly couplable to the first high and low pressure channels and the second high and low pressure channels to adjust the pressure, respectively; and a first and a second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes; wherein the first group of working chambers comprises part of one of a first rotor or a first stator and the first group of lobes comprises part of the other of the first rotor or the first stator; wherein the second group of working chambers comprises part of a second rotor or a second stator and the second group of lobes comprises part of the other of the second rotor or the second stator; and wherein a full rotation of the first rotor relative to the first stator results in a higher displacement than a full rotation of the second rotor relative to the second stator.

The first rotor and stator may respectively have a larger ring diameter than the second rotor and stator.

The machine may further comprise a first and a second shaft on which the first and second rotors respectively rotate and a clutch, operable to couple the shafts, between the rotors.

The machine may further comprise a shaft on which the rotors rotate, and a first clutch and a second clutch respectively coupling the first and second rotors to the shaft.

According to another aspect, there is provided a digital hydraulic machine, comprising, working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and an axially extending ring of lobes, wherein the working chambers are axially and peripherally movable relative to the lobes, the lobes are shaped and positioned to cause the pistons to reciprocate when the working chambers and lobes respectively move peripherally relative to each other and the pistons maintain contact with the lobes, and the lobes axially vary in at least one of amplitude and number such that total displacement of the working chambers resulting from a full rotation of the ring of lobes depends on axial position of the working chambers relative to the lobes.

The total displacement of the working chambers resulting from a full rotation of lobes relative to the working chambers may change monotonically as relative movement between the lobes and working chambers progresses axially in one direction.

As the lobes and working chambers may move axially relative to each other in the one direction, the total displacement may change, stays constant, and then change again.

The ring of lobes may comprise part of a rotor and the working chambers may comprise part of a stator, and relative axial movement of the working chambers and ring of lobes may be caused by moving the ring of lobes axially along a shaft.

The ring of lobes may comprise part of a rotor and the working chambers may comprise part of a stator, and relative axial movement of the working chambers and ring of lobes may be caused by axially moving a shaft on which the ring of lobes is secured.

The ring of lobes may comprise part of a rotor and the working chambers may comprise part of a stator, and relative axial movement of the working chambers and ring of lobes may be caused by axially moving a case containing the working chambers.

According to another aspect, there is provided a digital hydraulic machine, comprising, a ring of working chambers; a high pressure channel and a low pressure channel; for each of the working chambers, a piston movable in response to pressure within the working chamber, wherein each of the working chambers is selectively fluidly couplable to the high pressure channel and the low pressure channel to adjust the pressure; and a cam-ring eccentrically positioned relative to the ring of working chambers, wherein the cam-ring and working chambers are rotatable relative to each other such that the pistons reciprocate when the working chambers and cam-ring rotate relative to each other and the pistons maintain contact with the cam-ring.

According to another aspect, there is provided a tether engine, comprising, tether storage configured to store a tether; and a linear tether retraction and extension unit for linearly moving the tether on to and off of the tether storage.

The linear tether retraction and extension unit drive may comprise wheels between which the tether is linearly extended and retracted.

The linear tether retraction and extension unit drive may comprise tracks between which the tether is linearly extended and retracted.

The linear tether retraction and extension unit drive may comprise belts between which the tether is linearly extended and retracted.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 2A and 2B depict example tethered airfoils.

FIGS. 5A-5D and 6 depict example embodiments of a cam-ring digital hydraulic machine.

FIGS. 16A-16F and 17A-17C depict various cam-ring profiles that may be used in a digital hydraulic machine, according to additional embodiments.

DETAILED DESCRIPTION

Figure 1A:
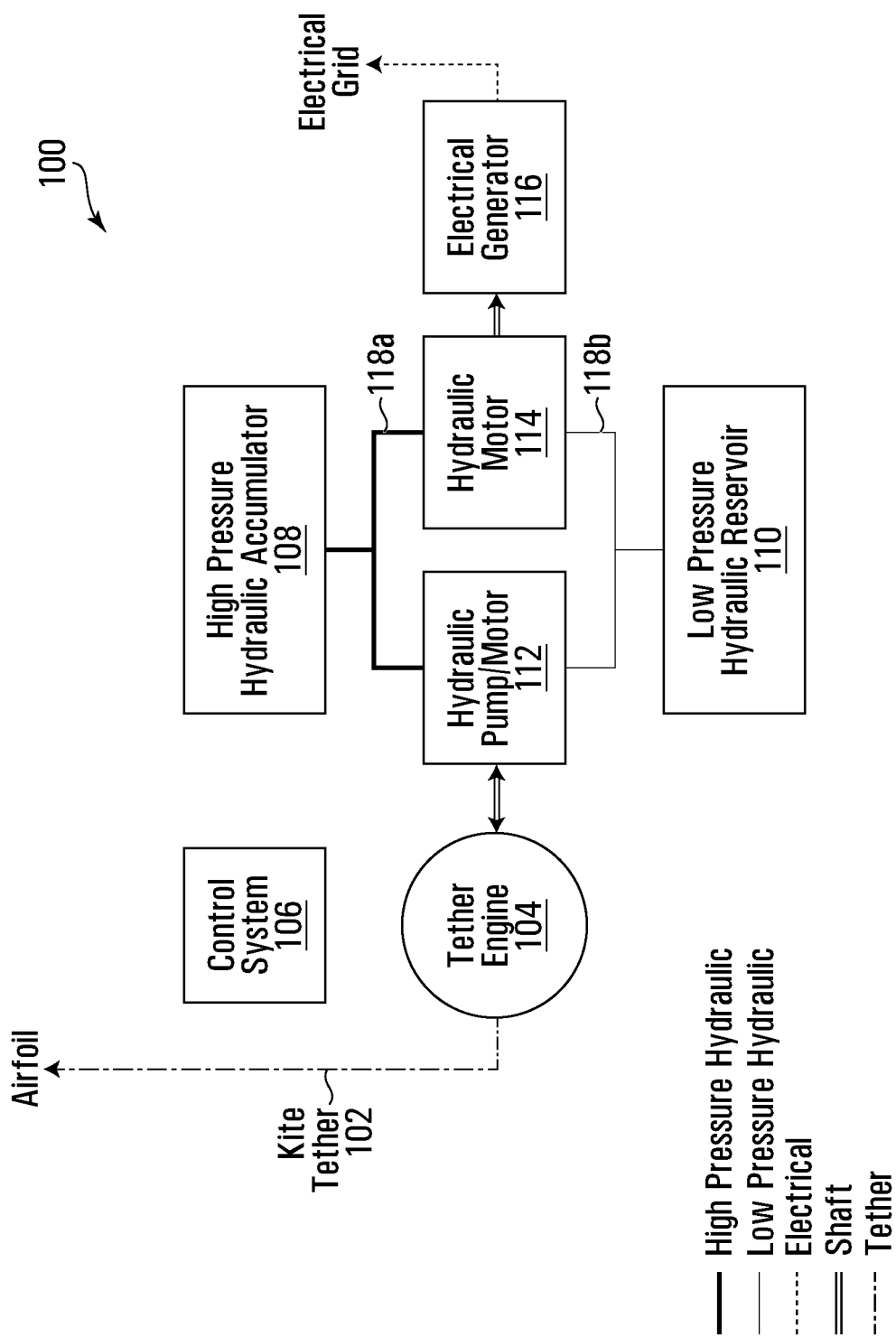
FIGS. 1A and 1B depict example embodiments of a system for harnessing wind energy using a tethered airfoil.

There is an immediate need for environmentally friendly and renewable energy sources. One such source is wind. Multiple airborne wind energy (AWE) systems have been proposed to economically harvest wind energy. A pumping kite generator (PKG) is one such type of generator. PKGs are one of the configurations of AWE systems that exploit crosswind principles as proposed in Loyd, M. L. (1980), Crosswind kite power (for large-scale wind power production), *Journal of energy*, 4(3), 106-111, the entirety of which is hereby incorporated by reference herein. It has been shown that a vast amount of wind power may be produced at a Levelized Cost of Energy significantly lower than that of conventional wind power.

In a PKG system, traction power from fast tethered airfoil(s) (also referred to as wing(s) or kite(s)), flown in a generally transverse direction to the incoming wind in approximately circular or figure-of-eight trajectories, is harvested from a ground station featuring an electric generator, whilst the tether(s) is/are being reeled-out (this is the "power stroke" or "traction phase"). At the end of a power stroke, the airfoil is adjusted to reduce or minimize tether tension and the airfoil(s) and tether(s) are reeled-in quickly (this is the "retraction stroke" or "retraction phase") in preparation for a new power stroke. The power stroke produces energy while the retraction stroke consumes some of it; the net energy production over a cycle is, ideally, positive.

However, other classes of AWE that use pumping cycles for energy harvest that do not use crosswind principles exist. Certain of the embodiments described herein are also applicable to these other classes. These other classes include systems such as pumping Magnus-effect balloons, dragging/pumping parachutes, and non-crosswind pumping airfoils. PKG is the embodiment primarily discussed herein.

A desirable trait for a PKG ground system is to produce consistent ("smoothed") electric power to the end-user (e.g., utility grid), in spite of the cyclic nature of the mechanical power generated using the kite. Another desirable trait for a PKG is a low cost of electricity produced; this may be achieved through any one or more of a higher capacity factor, higher efficiency, lower capital cost, and lower operating cost. Efficiency of the PKG depends on the coupled efficiencies of the pumping cycle (e.g., minimizing energy expenditure during retraction and maximizing energy harvesting during the power stroke are advantageous), which are dependent on the aerodynamic efficiency of the airfoil(s) and the efficiencies of related subsystems (e.g., specifying machines that are efficient over their envisioned operation range are advantageous).

Herein, a PKG "ground station" (a.k.a. "drive-train") refers to the means to provide reeling (in and out) functionality to the tether(s), to apply and manage tether(s) tension, as well as the means to transform the linear mechanical energy harvested from the tether(s) into electrical energy output deliverable to the end-user.

Certain embodiments described herein pertain to a pumping-cycle AWE system comprising a hydraulic-machine based ground station. The ground station comprises tether engine(s) driven by hydraulic pump/motor(s), hydraulic motor(s), energy accumulator(s) (e.g., a hydro-pneumatic accumulator), electric generator(s), and a control system. A hydraulic PKG ground station is envisaged (versus the aforementioned electric ground station) to possess higher efficiency and lower capital costs.

Digital hydraulic machines are a subset of variable displacement hydraulic machines that selectively deactivate working chambers from a plurality of working chambers that comprise the machine. This deactivation is achieved through selective control of chamber inlet and outlet valving, such that a deactivated chamber does (or receives) no mechanical work as fluid is displaced by it. An example digital hydraulic machine is a Digital Distributor Valve System by Diineff AS.

Application of digital hydraulics to horizontal axis wind turbines (HAWTs) drive-trains has been described in the prior art. HAWTs are technically distinct from PKGs. In normal (power generating) operation, HAWTs are generally driven by the wind in exclusively one direction, although slow-speed bi-directional motoring may be permitted for e.g., maintenance positioning. In contrast, PKGs in normal operation require cyclic bi-directional tether motion with a significant speed ratio (e.g., typically greater than 5 times for aerodynamically efficient kites) of reel-in speed over reel-out speed (low-power high-speed motoring and high-power low-speed pumping).

Certain embodiments herein comprise a PKG with a ground station comprising digital hydraulics. In certain embodiments, the digital hydraulic systems may still move fluid into and out of deactivated working chambers (e.g., fluid is exchanged/swished between a chamber and manifold of similar pressure). This presents at least two disadvantages: there is energy lost into fluid friction in deactivated working chambers as fluid is still moved, with viscous losses increasing with speed; and there is a mechanical failure risk above a critical speed where fluid cavitation and/or float of components occurs. Cavitation may occur when the system's ability to fill a deactivated working chamber is exceeded by the demand from e.g., a quickly retracting piston rigidly linked to a crankshaft. Whereas relatedly, a piston following a cam may float off the cam when the cam profile and rotation speed dictate a fill rate that the system cannot meet.

Certain other embodiments accordingly comprise one or more additional improvements specific to address the problem of moving fluid, described above. These adaptations reduce the quantity of fluid motion occurring in deactivated working chambers; this increases the pump/motor's efficiency over a range of speeds and is particularly useful for a PKG's distinguishable low-speed & high-torque tether power stroke and high-speed & low-torque tether retraction stroke.

In one example embodiment, the PKG comprises a ground station and tethered airfoil. The airfoil comprises any maneuverable flying device that has the ability to produce variable tether tension as a result of aerodynamic forces. The ground station comprises the means to couple to and manipulate the tether(s) (a tether engine) and the means to transfer harvested wind energy to an electrical generator.

A PKG derives its name from its method of harvesting wind energy. A PKG operates in a cycle comprising at least a power stroke (during a traction phase) and a retraction stroke (during a retraction phase). During the power stroke, aerodynamic forces on the airfoil create tether tension. The tether is drawn out from the ground station under the tension. This tension and displacement at the ground station are transformed into electricity. During the retraction stroke aerodynamic forces on the airfoil are reduced and ideally minimized to reduce tether tension. The tether is retracted using the ground station. Residual drag and inertia of the tethered airfoil and ground station require an energy input to the tether engine.

The mechanical energy from the tether(s) at the ground station is ideally a net positive over a PKG cycle; however, the power is time-variant over a cycle. It is desirable for a PKG to provide to the end-user electricity at consistent power. Therefore, means to accumulate energy within and controllably release energy from the ground station are provided. This permits consistent (or load following, i.e., end-user specified) power to the end-user where PKG cycle power fluctuations have been filtered out. The power to the end-user is still subject to average energy harvest variability (PKG cycle-to-cycle variation in net energy, e.g., from wind speed changes). However, constrained by accumulator capacity and state-of-charge, this variability may also be filtered with appropriately sized accumulator(s).

The depicted embodiments are directed at methods, systems, and techniques for a PKG that utilizes a hydraulic machine-based ground-station to store and release wind energy such that the electrical output meets end-user expectations. As discussed above, however, different embodiments may comprise a different type of AWE.

In certain embodiments, the ground-station harnesses wind energy during the traction phase by allowing wind to extend a tether. At least some of the harnessed wind energy is stored prior to using that wind energy to generate electricity. During the retraction phase, at least some of the wind energy that is stored during the traction phase is used to retract the tether. The wind energy is harnessed using a digital hydraulic pump mechanically coupled to the tether, and at least some of the wind energy that is stored is used to retract the tether. In certain embodiments, at least some of the wind energy that is stored is used to retract the tether using a digital hydraulic motor mechanically coupled to the tether. The wind energy that is harnessed may be stored mechanically (e.g., using an accumulator) or non-mechanically, such as using a battery or super-capacitor. In certain embodiments in which energy is stored non-mechanically, the energy during the retraction phase may be used to directly power an electric motor to retract the tether during the retraction phase. The harnessed wind energy may be used to generate electricity during one or both of the traction and retraction phases. For example, during the refraction phase the energy used to generate electricity comprises wind energy that was stored during the fraction phase. During the fraction phase, the energy used to generate electricity comprises one or both of energy that was stored during the current or a previous fraction phase, and energy harnessed during the current traction phase that has not been stored since being harnessed. The energy used to generate electricity can accordingly be buffered with stored energy as desired such that consistent power is provided to the user.

Referring to FIG. 1A, there is depicted an example embodiment of the system 100 for harnessing wind energy using a tethered airfoil 200. In the depicted embodiment, system 100 is a PKG. The system 100 comprises an airfoil 200 (not depicted in FIG. 1A, but shown in FIGS. 2A and 2B) coupled to at least one tether 102, and a ground station coupled to the tether(s) 102. The ground station comprises at least one low-pressure hydraulic circuit 118*b* and one high-pressure hydraulic circuit 118*a* (collectively, "hydraulic circuit 118"); a tether engine 104 coupled to and capable of manipulating the tether(s) 102; at least one hydraulic pump/motor(s) 112 mechanically coupled to the tether engine 102 and hydraulically coupled to the hydraulic circuit 118; an accumulator 108 hydraulically coupled to the high-pressure circuit 118*a*; a low-pressure hydraulic reservoir 110 hydraulically coupled to the low-pressure circuit 118*b*; one or more hydraulic motors or pump/motors 114 ("generator hydraulic motor 114") mechanically coupled to one or more electric generators 116 for generating and sending generated electricity to an electrical grid; and a control system 106 comprising a suitable combination of hardware and software to control the ground station and the airfoil 200 or a farm of devices (not shown). In the depicted example embodiment, the control system 106 is located entirely at the ground station; in a different embodiment (not depicted) the control system 106 may be located entirely elsewhere (e.g., on the ground away from the ground station or in the airfoil 200) or distributed and located at several locations (e.g., partially at the ground station as depicted in FIG. 1A and also in the airfoil 200). In one example embodiment, the means to control the ground station comprises a controller (not depicted), itself comprising a processor communicatively coupled to a non-transitory computer readable medium such as a random access computer memory. The medium has stored thereon computer program code that is executable by the processor and that, when executed by the processor, causes the processor to perform any one or more of the example methods described herein.

Figure 1B:
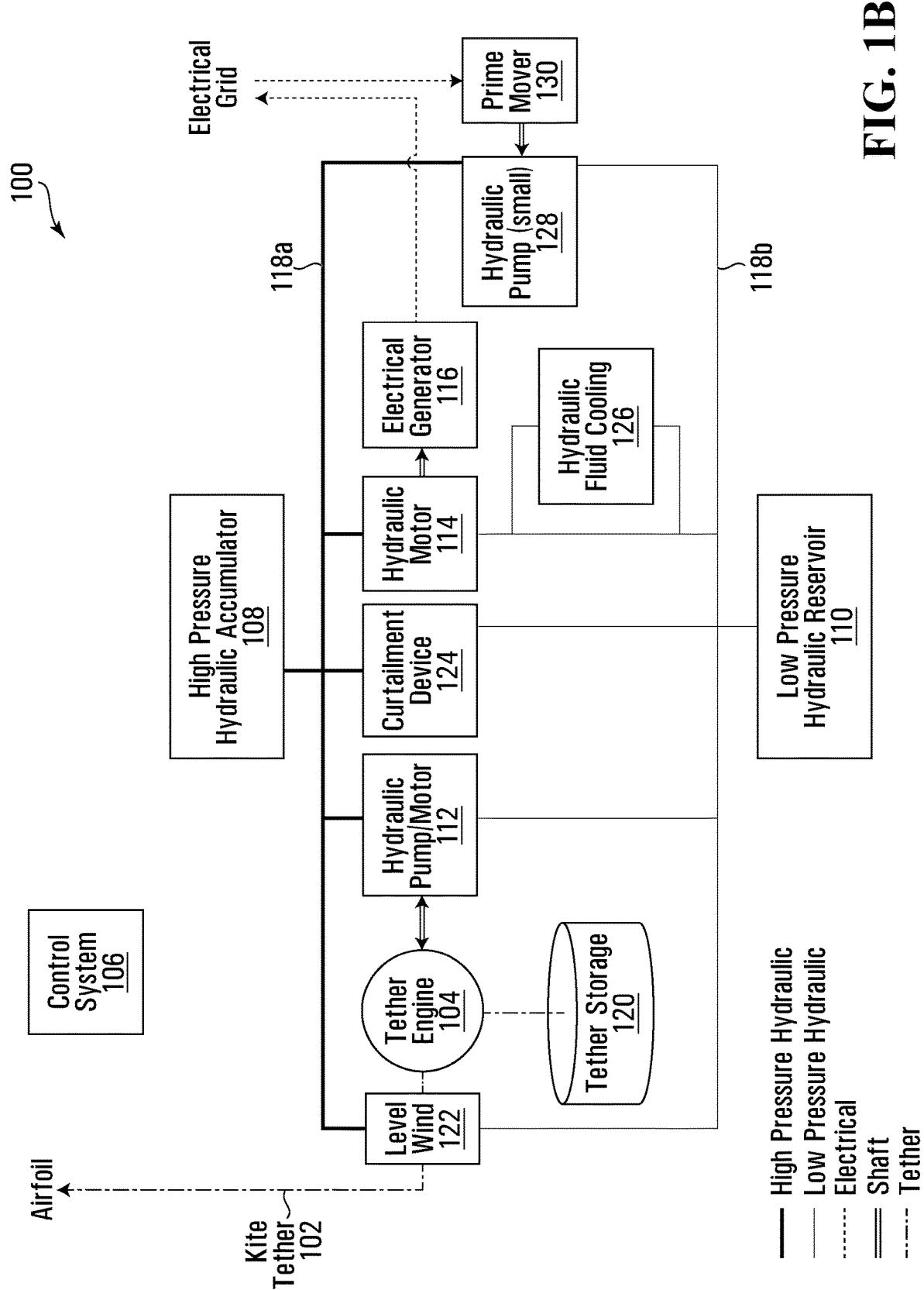

FIG. 1B depicts another embodiment of the system 100. In FIG. 1B, the system 100 comprises any one or more of the following, each fluidly coupled to the hydraulic circuit 118: a hydraulic pump 128 for charging the accumulator 108 using an electric or combustion prime mover 130; a hydraulic fluid conditioning system 126 for heating, cooling, and/or filtration; and a curtailment device 124 for providing means of dissipating excess energy from the hydraulic system 100. The system 100 may also comprise other energy consumers and producers connected to the hydraulic circuit 118 to form subsystems that provide additional functionality. For example, the system 100 may also comprise one or both of a level wind 122 to facilitate winding/unwinding of the tether 102 and additional tether storage 120, such as a drum, for supplementing the tether engine's 104 storage.

The system 100 of FIGS. 1A and 1B may be hydraulically and/or electrically coupled with additional systems 100 to form a farm of systems 100. In one embodiment of the farm, any one or more of the systems 100 comprising the farm may share the accumulator 108, the pump/motor 112, and/or the generator hydraulic motor 114. Sharing may be accomplished by fluidly coupling the systems 100 to the hydraulic circuit 118 such that any one or more of the systems 100 may store energy in the accumulator 108, hydraulically power the pump/motor 112, and/or hydraulically power the generator hydraulic motor 114. Additionally or alternatively, sharing may be accomplished by electrically coupling the systems 100 such that any one or more of the systems 100 may power the prime mover 130, thereby indirectly charging the accumulator 108, powering the pump/motor 112, and/or powering the generator hydraulic motor 114.

Figure 2A:
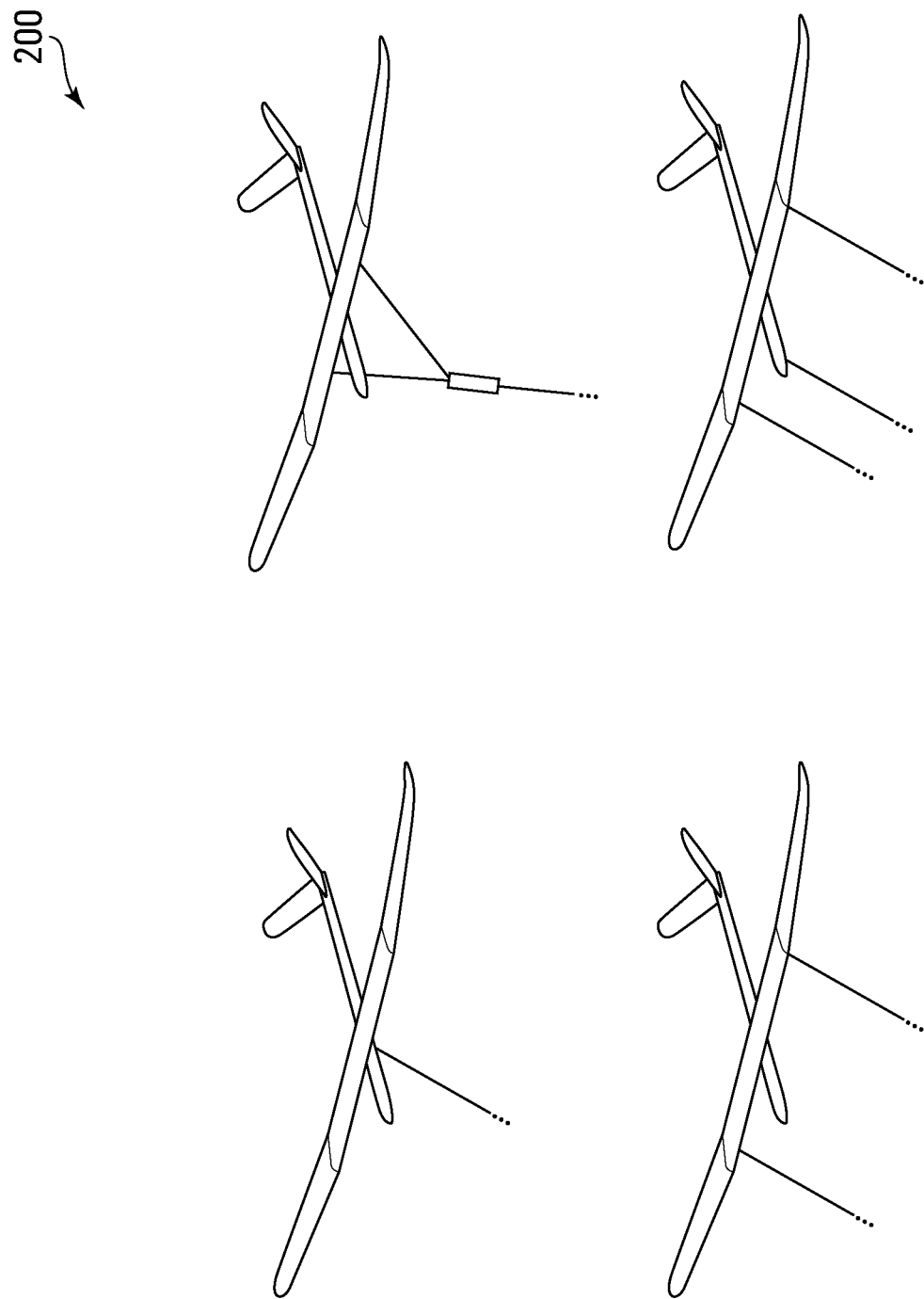

The airfoil 200 may comprise any suitable combination of lifting surfaces, structure, maneuvering means, instrumentation and controls. FIG. 2A depicts embodiments of the airfoil 200 of rigid construction featuring aerodynamic control surfaces (e.g., glider), with the different embodiments featuring one, two, or three tethers 102. FIG. 2B depicts embodiments of the airfoil 200 of flexible construction (e.g., soft kite), with the different embodiments featuring one, two, three, or four tethers 102 that communicate wind energy and maneuvering control with the ground station.

Figure 3B:
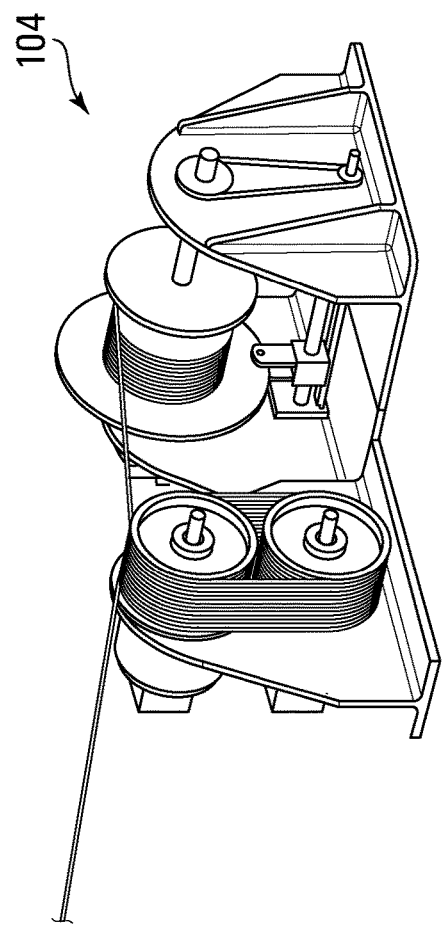
FIGS. 3A-3C depict example rotary tether engines.
Figure 3C:
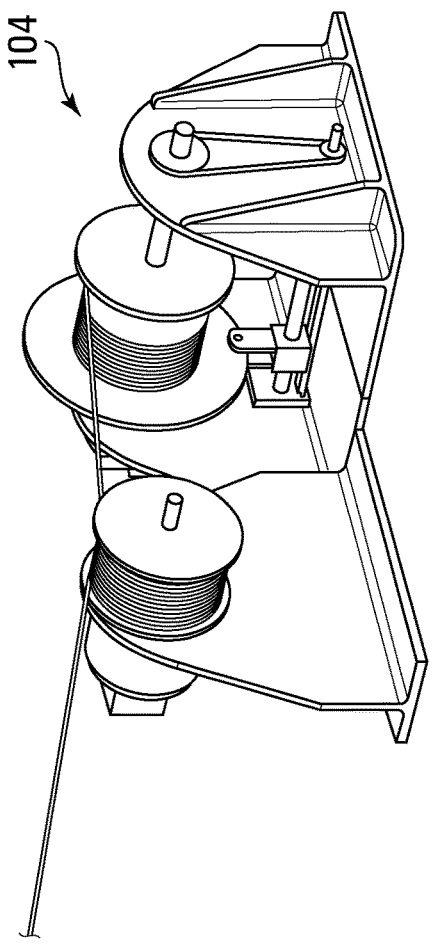
Figure 3A:
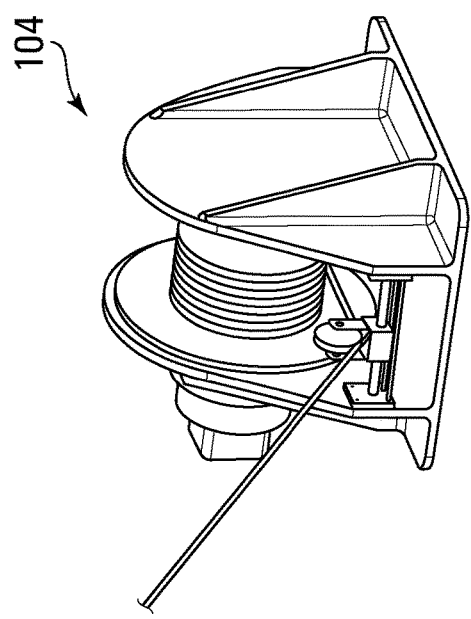

Referring to FIGS. 3A-3C, there are depicted three embodiments of the tether engine 104 based on a rotary drum winching system. A first embodiment (FIG. 3A) is a simple winch design, wherein a rotating winch drum manipulates/tensions and stores the tether 102. The second embodiment (FIG. 3B) is a single-capstan design, where a capstan loads/offloads tension from the tether 102 and a tether storage means (e.g., a reel) is provided by a drum. The single-capstan design may be extended to multiple-capstans, such as the dual capstan embodiment of FIG. 3C. The components of the tether engine 104 may be reproduced in parallel to accommodate any suitable number or configuration of tethers 102 for power transmission and/or aircraft maneuvering. These tether engines 104 share the characteristic of wrapping the tether 102 about a drum; this action occurs cyclically in the PKG application. This is disadvantageous as bending is imparted in the tether 102, which adversely affects tether lifespan. Although increasing the radii of the drums reduces the adverse impact on tether lifespan, another consequence of this is more massive tether engine components whose inertia reduces PKG cycle efficiency because of the additional time and/or forces required when transitioning between power and retraction strokes.

Referring to FIGS. 4A-4G, three embodiments of a linear tether engine 104 are depicted. The linear tether engines 104 have relatively low inertia and handle their charge without significantly bending the tether 102. As PKG power capacity increases, so does tether diameter, and so do the problems of the tether engines 104 of FIGS. 3A-3C. Linearly deploying and retracting the tether 102 addresses this problem. The first of these linear tether engine 104 embodiments (FIG. 4A) comprises at least one pair of opposing elements in the form of wheels 404, wherein one or both wheels 404 are mechanically coupled to an actuator 410 (e.g., sharing a common hydraulic pump/motor or one hydraulic pump/motor per wheel). During the PKG power stroke, linear motion of the tether 102 harnessed using the tether engine 104 is converted to energy. During the PKG retraction stroke, the tether engine 104 may be driven to retract the tether 102. In the second and third embodiments of FIGS. 4B and 4C, respectively, the opposing wheels 404 of the first embodiment are replaced with different opposing elements: bands of track plates 406 in FIG. 4B and flexible belts 408 in FIG. 4C. As in FIG. 4A, an actuator 410 powers the track plates 406 and belts 408 of FIGS. 4B and 4C, respectively.

Figure 4A:
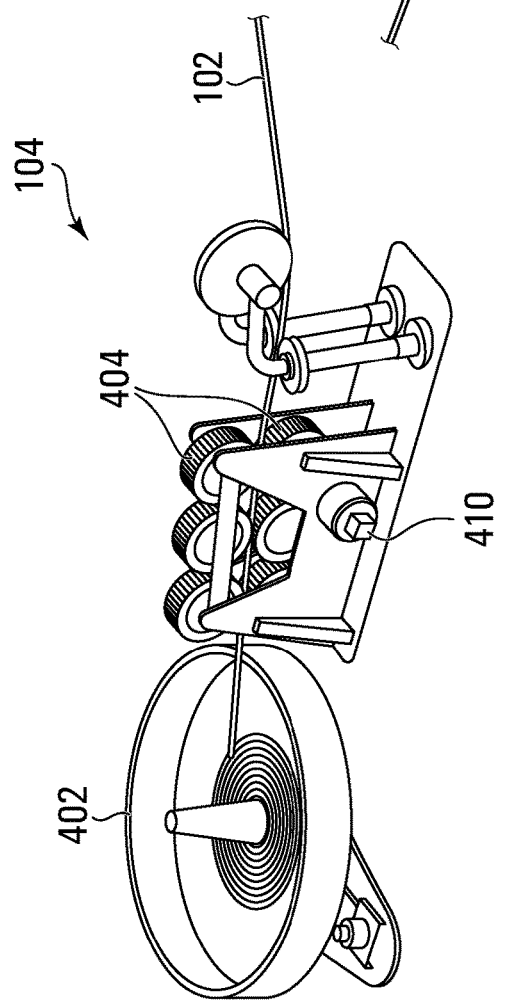
FIGS. 4A-4G depict example linear tether engines.
Figure 4B:
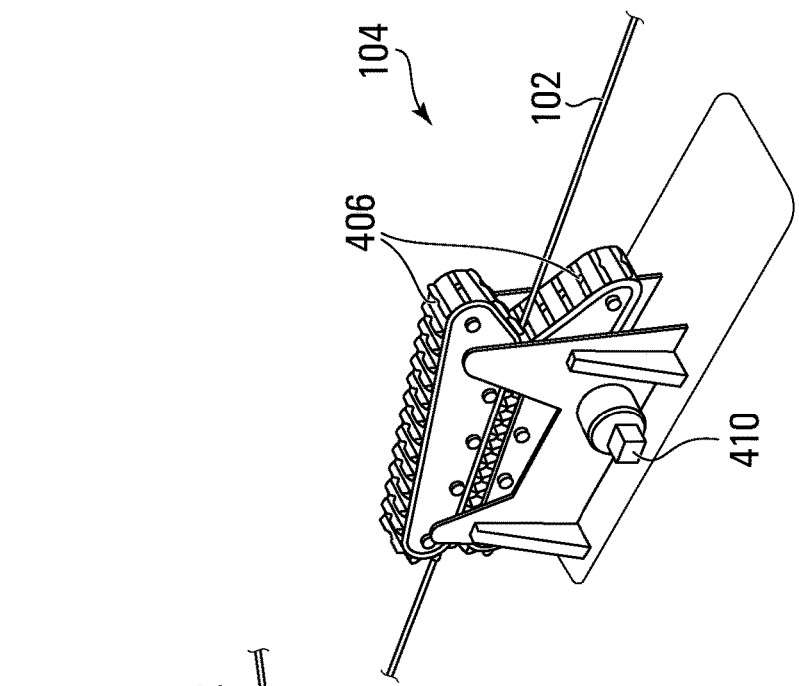
Figure 4C:
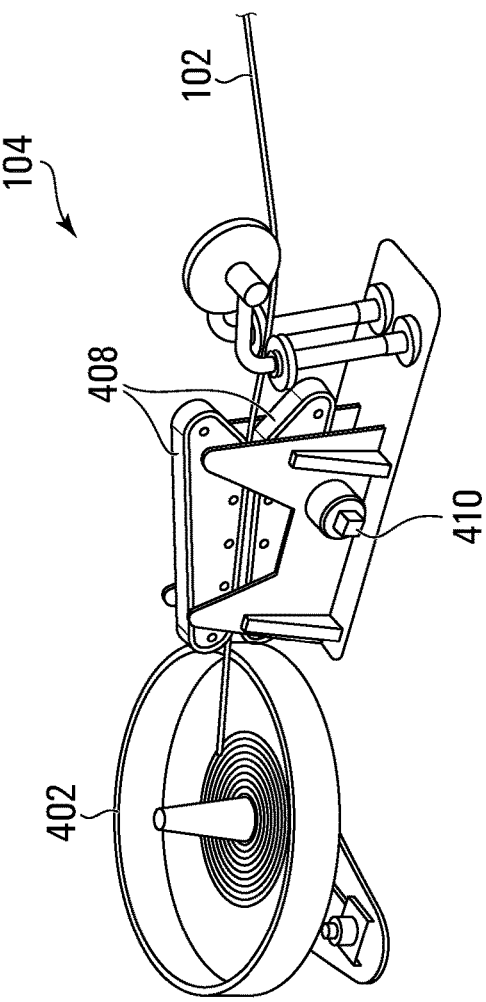
Figure 4D:
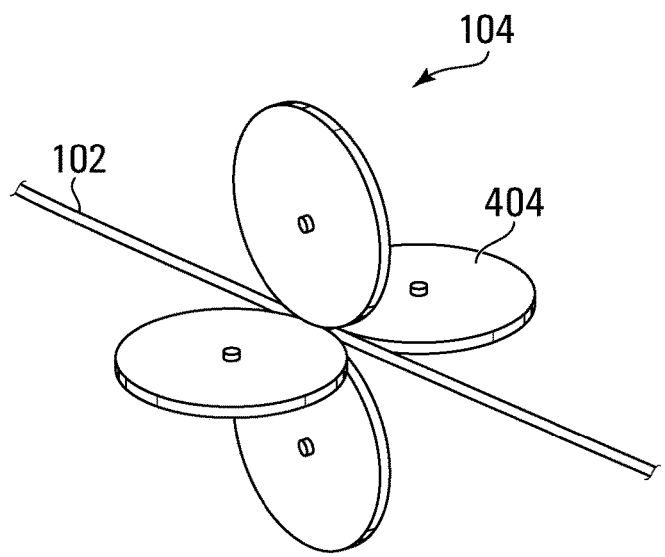
Figure 4E:
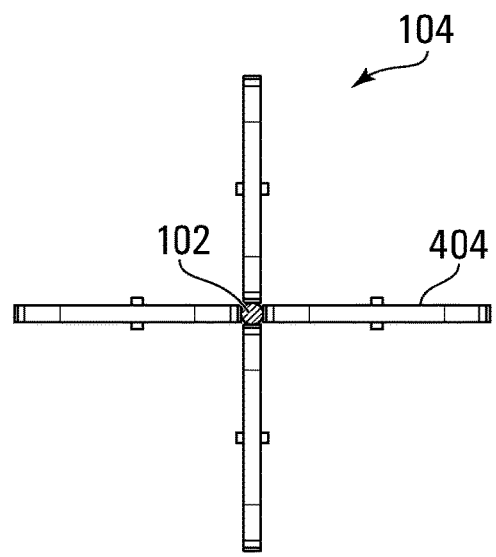
Figure 4F:
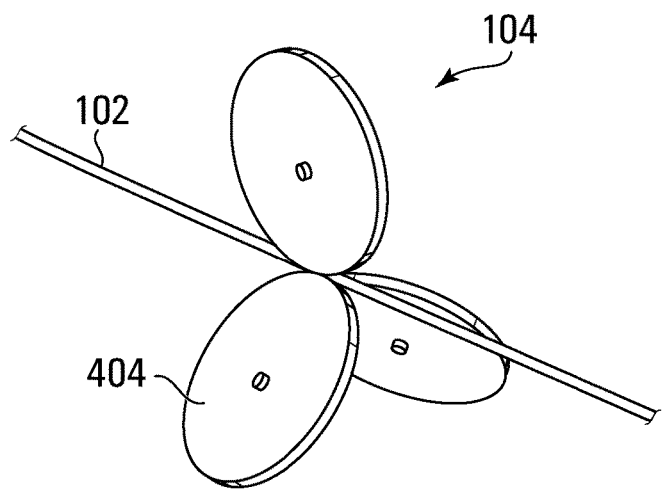
Figure 4G:
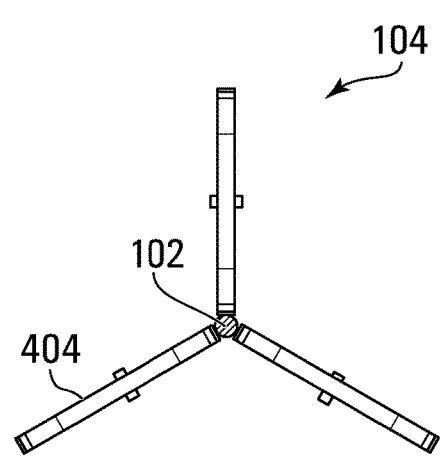

FIGS. 4D to 4G show additional orientations of the opposing elements that may be used in alternative embodiments of the linear tether engine 104. FIGS. 4D and 4E show a perspective and a top plan view, respectively, of four opposing elements, in the form of wheels 404, located circumferentially around the tether 102 at one longitudinal position of the tether 102. FIGS. 4F and 4G show a perspective and a top plan view, respectively, of three opposing elements, in the form of wheels 404, located circumferentially around the tether 102 at one longitudinal position of the tether 102. In each of FIGS. 4D to 4G the wheels 404 are equally spaced around and consequently rotationally symmetric about the tether 102; in different embodiments (not depicted) the opposing elements may be positioned such that they are not rotationally symmetric about the tether 102.

Additional embodiments (not depicted) of the linear tether engine 104 are possible: as opposed to a single pair of opposing elements as shown in FIG. 4A, multiple pairs of opposing elements may be located along the tether 102; and the aforementioned embodiments may have one of the opposing elements substituted for another type (or for a low friction immobile surface). Additionally, the forces to engage elements against the tether(s) 102 may be derived from actuators (not illustrated; the actuators may comprise, for example, linear hydraulic ram(s)) coupled to the hydraulic circuit 118.

The tether engine 104 may be mechanically coupled to a digital hydraulic pump and a digital hydraulic motor, which in certain embodiments may comprise the combined digital hydraulic pump/motor 112 shown in FIGS. 1A and 1B. In certain embodiments, such as the embodiments of FIGS. 1A and 1B, there is also at least one hydraulic motor 114 (or pump/motor) coupled to at least one electrical generator 116. The option of a pump/motor for driving the generator 116 may substitute for a dedicated pump 128 used for accumulator charging, if the electric generator 116 is also capable of motoring. It is desirable, if an alternating current generator is selected, that the generator 116 rotational speed is constant. In certain embodiments, it is also desirable to not couple the generator 116 and its hydraulic motor 114 through a variable transmission and/or to not use a hydraulic pressure throttling device on the motor 114. Accordingly, the embodiments of FIGS. 1A and 1B directly couple the generator 116 to a variable-displacement hydraulic motor 114 (or pump/motor); this allows electrical power to be modulated while maintaining synchronous speed. However, in certain different embodiments (not depicted), a gearbox may be used to couple the motor 114 and the generator 116. Any gearbox that is used may be single speed or variable speed. The tether engine 104 produces and consumes variable power at variable speeds owing to the PKG cycle and wind variability. In one embodiment, the tether engine hydraulic pump/motor 112 is operated such that the product of displaced volume and pressure (difference between low and high pressure circuits) of hydraulic fluid (corresponding to energy harvested) is maximized during the power stroke, and the same product is minimized during the retraction stroke; i.e., such that the difference between the products is maximized over a cycle. As discussed in further detail below, it is desirable that the hydraulic pump/motor(s) 112 coupled to the tether engine 104 be of variable displacement. Variable displacement of the hydraulic machine is defined as a variable (and controllable) quantity of fluid displaced per revolution of the machine.

A hydraulic pump/motor, pump, or motor that uses digital hydraulics uses a plurality of binary on-off hydraulic valves to fluidly couple working chambers to high and low pressure fluid channels. The following discusses digital hydraulics in the context of a digital hydraulic pump/motor; however, in different embodiments (not depicted), digital hydraulics may be applied to one or both of a digital hydraulic pump and a digital hydraulic motor that are distinct from each other.

A digital hydraulic pump/motor comprises a plurality of working chambers, with each chamber including at least one inlet and one outlet valve, with the valves being active in that a control system can actuate them at will. The digital hydraulic pump/motor is distinguished by having at least one electronically controlled valve for each of low-pressure and high-pressure manifolds, or channels, per working chamber. In contrast, a non-digital hydraulic device from the prior art may comprise only passive valves (working on a pressure differential, such as ball check valves) for a pumping device, or active valves mechanically linked to shaft rotational position for a motoring device. Through control of the electronically controlled valves, working chambers of the digital hydraulic pump/motor may be selected to participate or not participate in the work-contributing displacement of the pump/motor.

Referring to FIG. 5A, there is depicted one example embodiment of the digital hydraulic pump/motor 112. It comprises a multi-lobe cam-ring having a central aperture 516 to receive a shaft 602 (shown in FIG. 6). The cam-ring comprises a plurality of lobes 510 and, in FIG. 5A, comprises a rotor 502 of the pump/motor 112. A stator 504 comprises a plurality of working chambers 506 disposed circumferentially about the cam-ring with their principal axes substantially normal to the average cam-ring cam surface, a low-pressure fluid manifold (hereinafter interchangeably referred to as a "low-pressure channel 514"), a high-pressure fluid manifold (hereinafter interchangeably referred to as a "high-pressure channel 512"), and a case 1304 (not shown in FIG. 5A, but shown in FIG. 13) to support these. Each working chamber 506 comprises the internal surface of a cylinder (a bore, which may be formed out of the case 1304); a surface at one end of the chamber 506; a piston 508 at the opposing end of the chamber 506 that traverses along the chamber 506 and whose non-chamber side follows, such as by using a follower, the cam-ring; one low-pressure valve 704 in fluid communication between the chamber 506 and the low-pressure channel 514; and one high-pressure valve 702 in fluid communication between the chamber 506 and the high-pressure channel 512. The lobes 510 and working chambers 506 are accordingly movable relative to each other and the lobes 510 are accordingly shaped and positioned to cause the pistons 508 to reciprocate when the working chambers 506 and lobes 510 move relative to each other and the pistons 508 maintain contact with the lobes 510.

Referring to FIG. 5B, there is depicted a second embodiment of the digital hydraulic pump/motor 112. In FIG. 5B, the stator 504 comprises the multi-lobe cam-ring fixed to an immobile case, and the rotor 502 comprises a carrier case fixed to a shaft and supporting a plurality of working chambers 506 disposed circumferentially about the cam-ring with their principal axes substantially normal to the average cam-ring cam surface. The pump/motor 112 of FIG. 5B further comprises the low-pressure fluid channel 514 and the high-pressure fluid channel 512. Each working chamber 506 comprises the internal surface of a cylinder (a bore, which may be formed out of the case 1304), a surface of which is at one end of the chamber 506; a piston 508 that is at the opposing end of the chamber 506 and traverses along the chamber 506 and whose non-chamber side follows, such as by using a follower, the cam-ring; one low-pressure valve 704 in fluid communication between the chamber and the low-pressure channel 514; and one high-pressure valve 702 in fluid communication between the chamber 506 and the high-pressure channel 512.

Figure 5C:
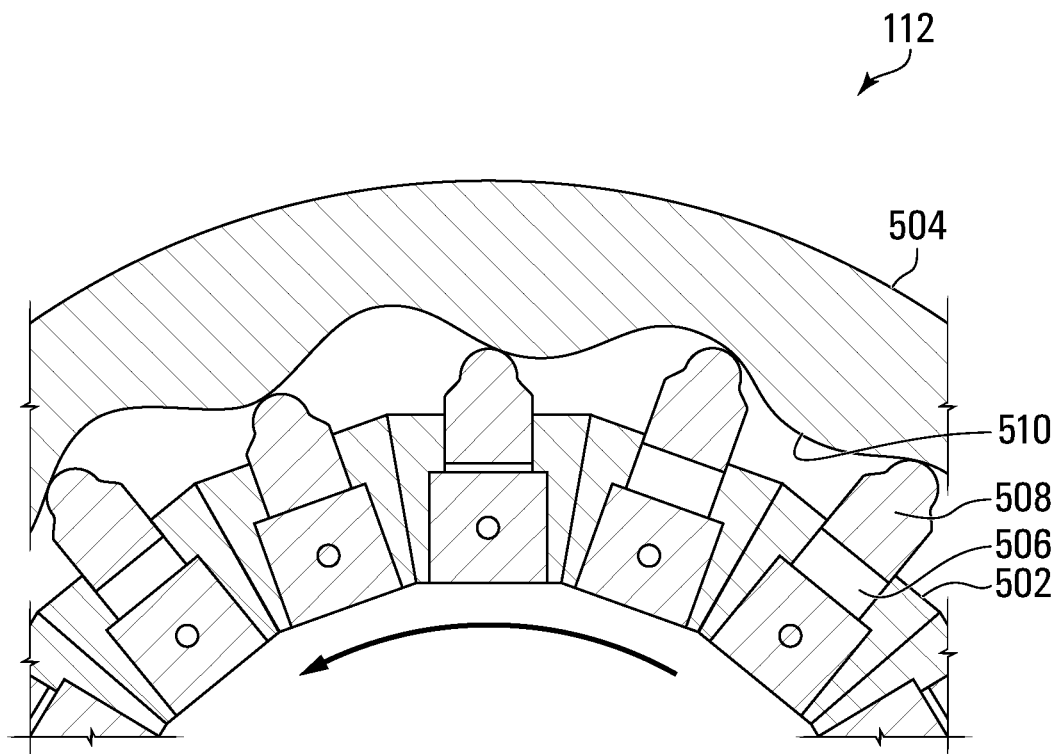
Figure 6:
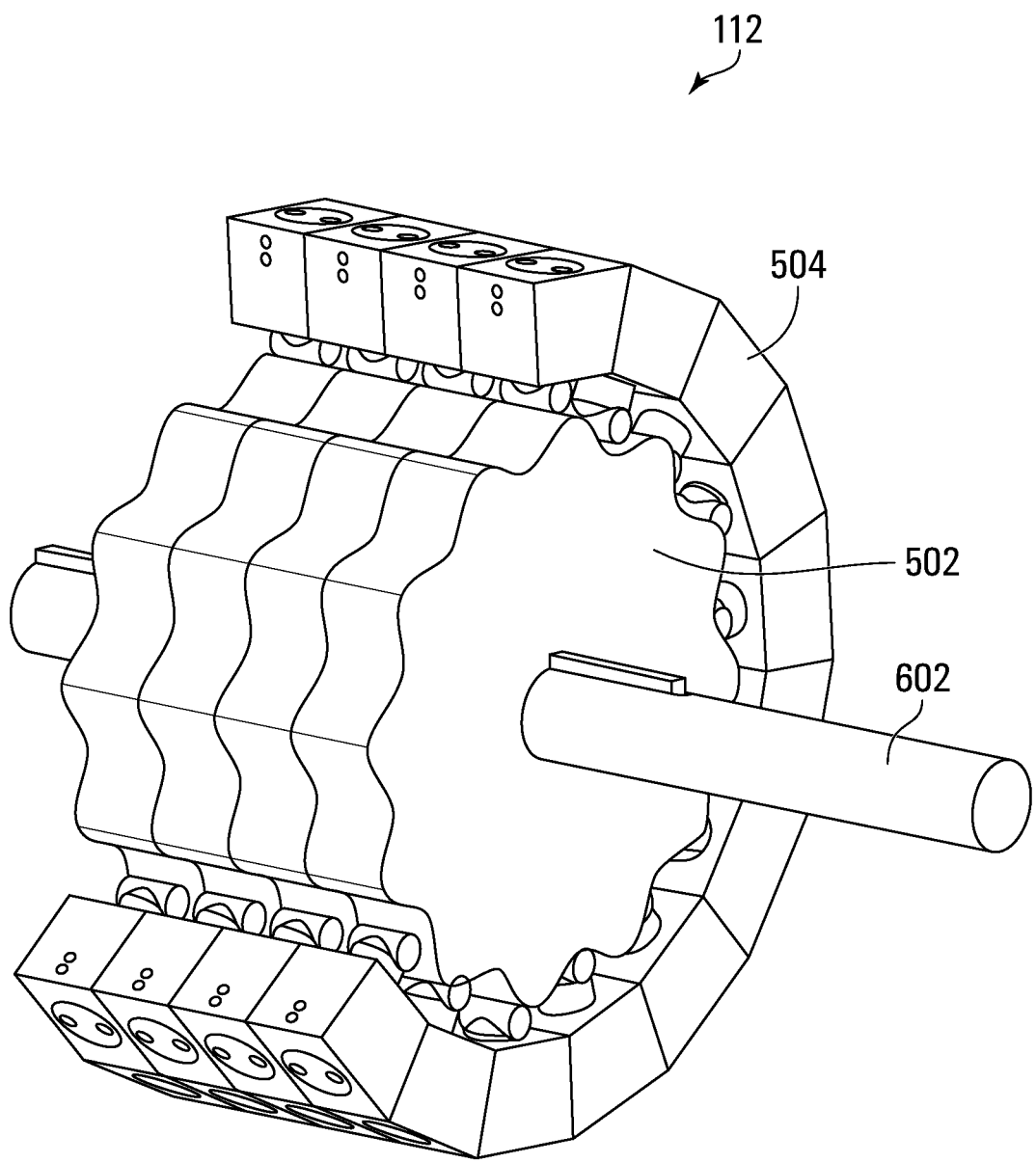

Referring to FIG. 5C, there is depicted a third embodiment of the digital hydraulic pump/motor 112. It comprises an immobile cam-ring stator 504, and its rotor 502 comprises a carrier case fixed to a shaft and supporting a plurality of working chambers 506 disposed circumferentially within the cam-ring's circumference with their principal axes substantially normal to the average cam-ring cam surface; a low-pressure channel 514; and a high-pressure channel 512. Each working chamber 506 comprises the internal surface of a cylinder (a bore, which may be formed out of the case 1304), a surface at one end of the chamber 506; a piston 508 that is at the opposing end of the chamber 506 and traverses along the chamber 506 and whose non-chamber side follows, such as by using a follower, the cam-ring; one low-pressure valve 704 in fluid communication between the chamber and the low-pressure channel 514; and one high-pressure valve 702 in fluid communication between the chamber 506 and the high-pressure channel 512.

Figure 5D:
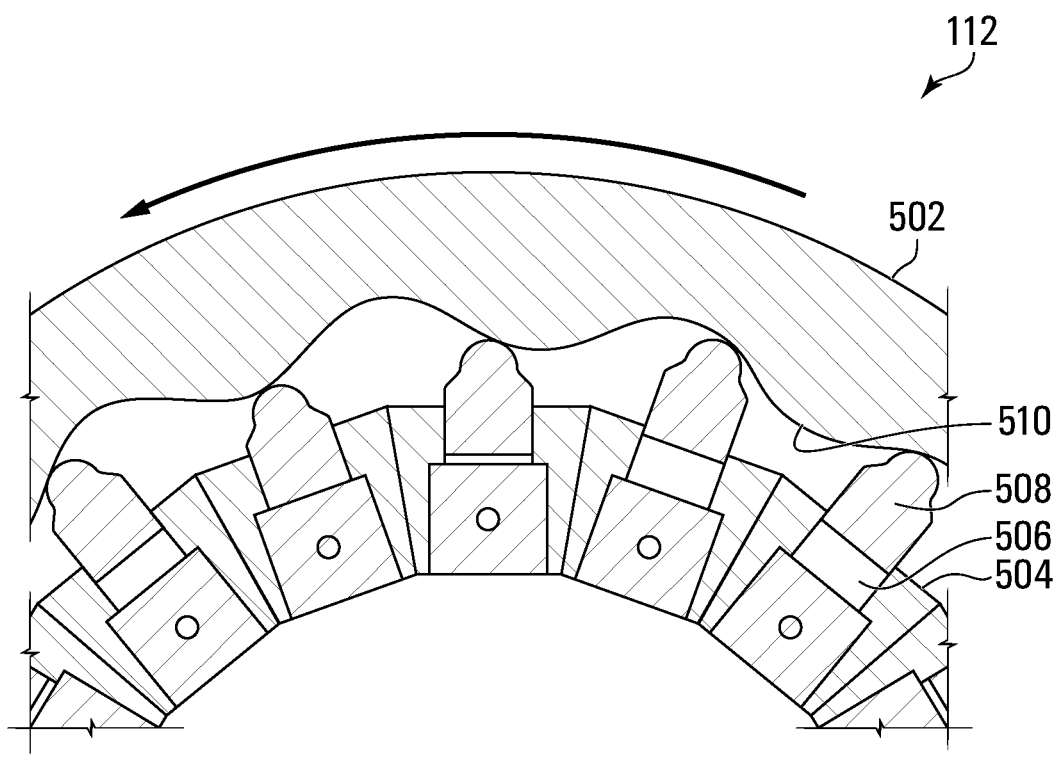

Referring to FIG. 5D there is depicted a fourth embodiment of the digital hydraulic pump/motor 112. It comprises a mobile cam-ring rotor 502 coupled to a shaft, and a stator 504 comprising a plurality of working chambers 506 disposed circumferentially within the cam-ring's circumference with their principal axes substantially normal to the average cam-ring cam surface; a low-pressure channel 514; a high-pressure channel 512; and a case 1304 to support these. Each working chamber 506 comprises the internal surface of a cylinder (a bore, which may be formed out of the case 1304), a surface at one end of the chamber 506; a piston 508 that is at the opposing end of the chamber 506 and traverses along the chamber 506 and whose non-chamber side follows, such as by using a follower, the cam-ring; one low-pressure valve 704 in fluid communication between the chamber and the low-pressure channel 514; and one high-pressure valve 702 in fluid communication between the chamber 506 and the high-pressure channel 512.

In the embodiments of FIGS. 5A-5D, the valves are selectively controlled by the controller.

The embodiments of FIGS. 5C and 5D are distinguished from the embodiments of FIGS. 5A and 5B by featuring a cam-ring with an internal cam surface (i.e., the cam-ring is outside of the working chambers 506). In contrast, the embodiments of FIGS. 5B and 5D are distinguished from the embodiments of FIGS. 5A and 5C by having their rotor 502 situated outside the stator 504 (i.e., an outrunner configuration).

The following description is in respect of the embodiment of FIG. 5A; accordingly, a reference to the "cam-ring" is also a reference to the rotor 502. However, the following description applies analogously to other embodiments, such as the embodiments of FIGS. 5B-5D.

Additional embodiments of the digital hydraulic pump/motor 112 may be developed by, for example, axially disposing a plurality of cam-ring and working chamber groups along a common shaft 602 (FIG. 6), by increasing the number of valves per working chamber 506 to improve flow and/or segregate active and passive valve roles, and/or by canting working chamber axes to favour transfer of force against a subset of the cam-ring surface (i.e., to favour torque application to the shaft 602 in one of the shaft's 602 rotational directions).

In certain example embodiments in which the variable displacement hydraulic machines are digital hydraulic machines, the pump/motor 112 is a low-speed, cam-ring machine, and the generator hydraulic drive motor 114 is a high-speed radial piston type machine, which lacks a cam-ring and where the pistons are linked to the eccentric portion of a crankshaft. The eccentric portion may be circular (in which case the piston stroke length is equal to twice the value of the eccentricity). An example of high-speed variable displacement radial piston machine is developed by Artemis Intelligent Power Limited. In the embodiment of FIGS. 1A and 1B, the low-pressure channel 514 in the pump/motor 112 is connected to the low-pressure circuit 118b, the high-pressure channel 512 is connected to the high-pressure circuit 118a, the pump/motor shaft 602 is coupled to the tether engine 104 to transmit rotational motion, and the pump/motor rotationally static component (i.e., the stator 504) is provided a means to restrain rotational motion (e.g., a torque arm).

Operation of the pump/motor 112 in pumping mode entails working chambers 506 admitting fluid from the low-pressure valve 704 as the piston 508 follows a cam-ring peak (i.e., a lobe's 510 peak) to a valley between the lobes 510; closure of the low-pressure valve 704 near maximum chamber volume; pressurization of the fluid as shaft 602 and cam-ring rotation drive the piston 508 to a smaller chamber volume; opening of the high-pressure valve 702 as pressure within the chamber 506 equals or exceeds the high-pressure channel 512 pressure (during the stroke); closure of the high-pressure valve 702 near minimum chamber volume; opening of the low-pressure valve 704; and repetition of the cycle for each period of the cam-ring. As used herein, a "period" of a cam-ring refers to one of the lobes 510 on the cam-ring.

Operation of the pump/motor 112 in motoring mode entails working chambers 506 admitting fluid from the high-pressure valve 702 as the piston 508 follows a cam-ring peak (i.e., a lobe's 510 peak) to a valley between the lobes 510, which drives shaft 602 rotation; closure of the high-pressure valve 702 near maximum chamber volume; expulsion of the fluid through the low-pressure valve 704 as shaft 604 and cam-ring rotation drive the piston 508 to a smaller chamber volume; closure of the low-pressure valve 704 near minimum chamber volume; opening of the high-pressure valve 702; and repetition of the cycle for each period of the cam-ring profile (i.e., for each of the lobes 510 on the cam-ring).

The cam-ring profile may have several periods (i.e., multiple lobes 510); therefore a working chamber 506 may displace its volume several times per revolution of the cam-ring/shaft 602. The controller determines direction of rotation and pumping versus motoring selection by the valve-controlled sequencing of chamber displacement(s).

An additional embodiment comprises a means to know the angular displacement of the shaft 602 relative to each of the working chambers 506 and the shaft's 602 angular velocity. In one example embodiment, the controller determines this knowledge from a shaft angular position sensor and known geometrical relationships between the shaft 602, cam-ring, pistons 508, and chambers 506. Valve actuation and control logic are electronic, which permits arbitrary valve actuation. In one example embodiment, valve actuation is controlled by logic such as the controller having inputs reflecting operator instructions (e.g., direction and pump versus motor mode) and the aforementioned displacement information such that fluid admittance to and from working chambers 506 express that intent.

Figure 7:
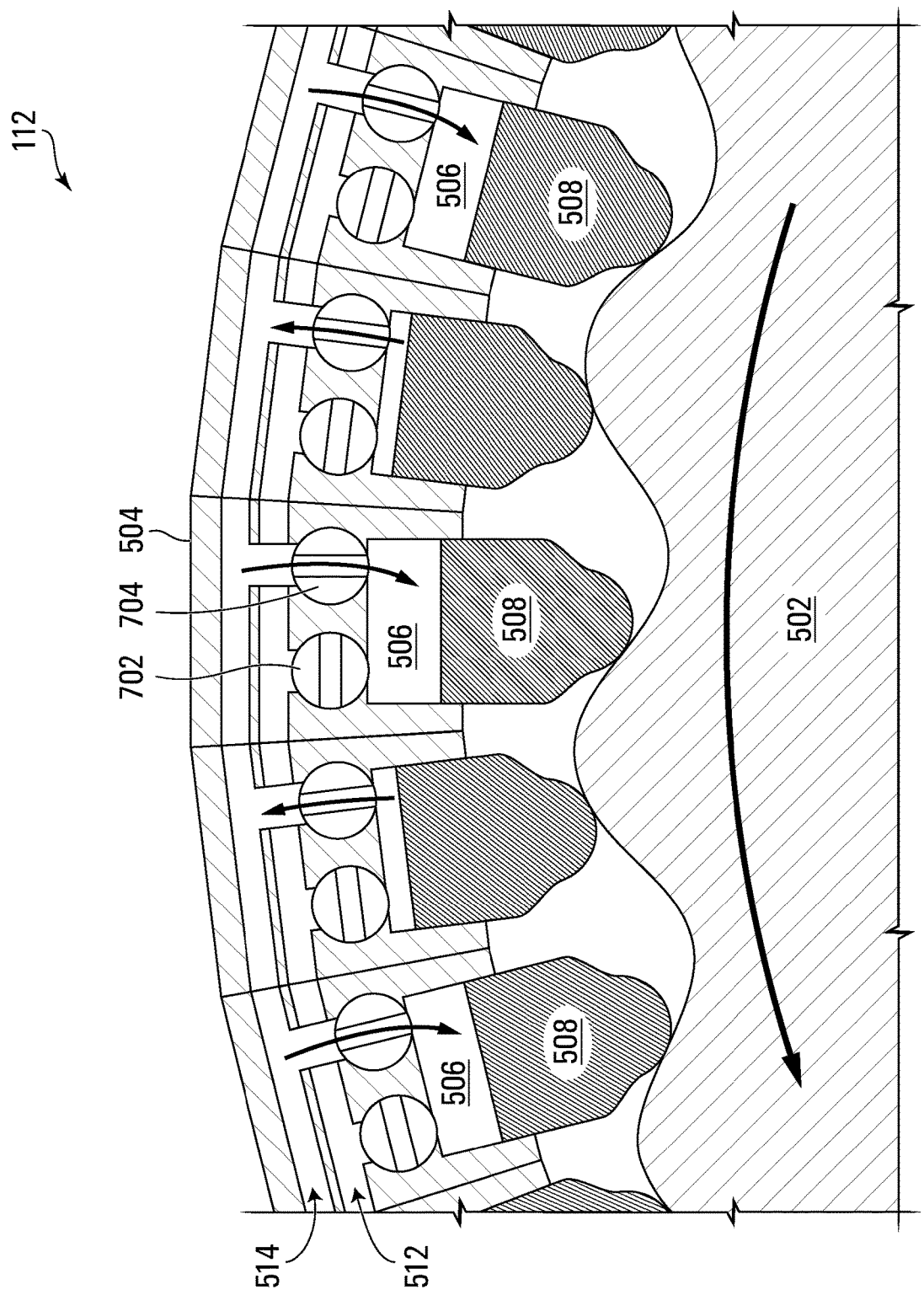
FIGS. 7-13C depict a digital hydraulic machine in which one or more working chambers is being deactivated, according to additional example embodiments.

Displacement of the pump/motor 112 per revolution of the shaft 602 may be varied by "deactivation" of any subset of working chambers 506 for some or all of a revolution (any working chamber cycle in the pump/motor 112 may be deactivated). One means of deactivation is depicted in FIG. 7. In FIG. 7, for each of the working chambers 506 to be deactivated, the low-pressure valve 702 or the high-pressure valve 704 is opened, and left open, for one piston 508 reciprocation. In the depicted embodiment, the low-pressure valve 704 for each deactivated working chamber 506 is opened. As shown in FIG. 7, the outcome is that fluid is exchanged between the deactivated working chamber 506 and the low-pressure channel 514 at a common pressure, such that there is no net work done towards motoring or pumping. Thus an additional input to the aforementioned valve control logic may be the intended productive displacement of the pump/motor 112 that contributes towards net work.

Figure 20B:
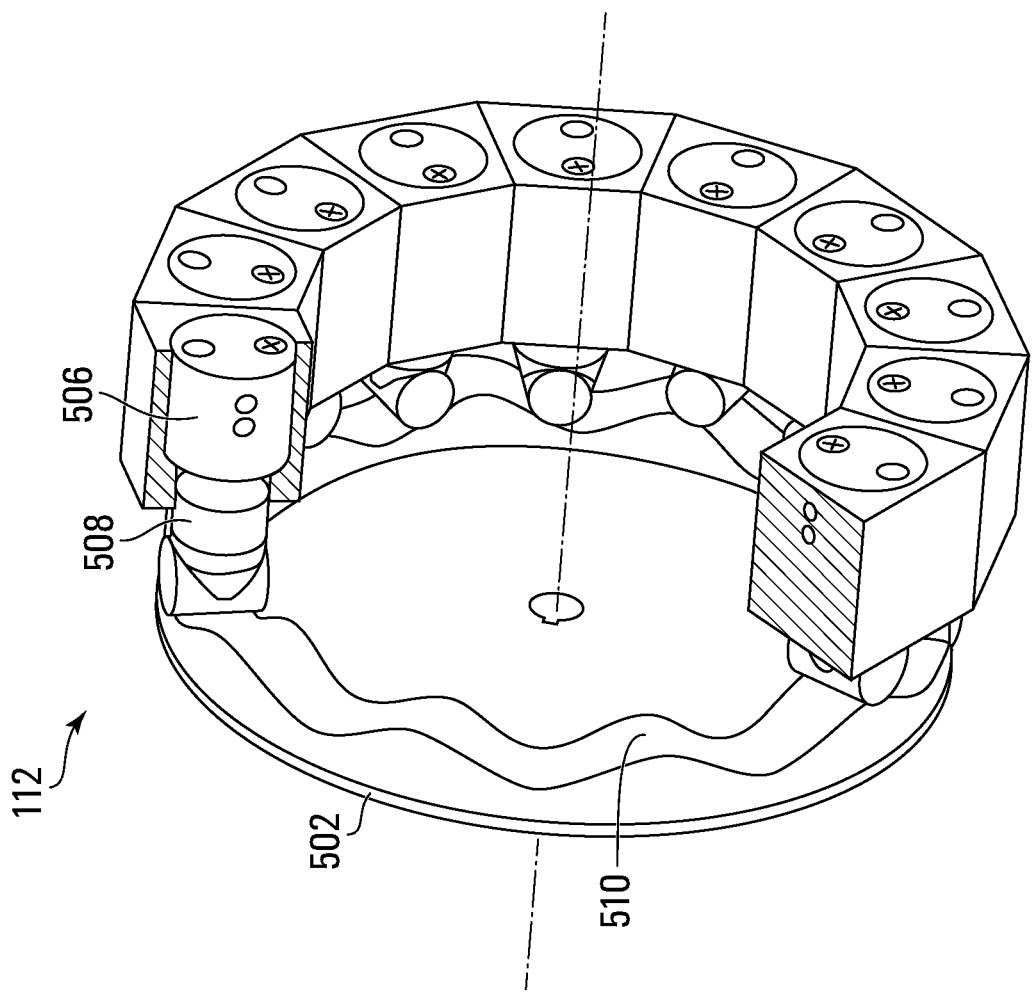
FIGS. 20A and 20B depict side elevation and perspective views, respectively, of example embodiments of a digital hydraulic machine having pistons and a cam-ring that are axially offset from each other.
Figure 20A:
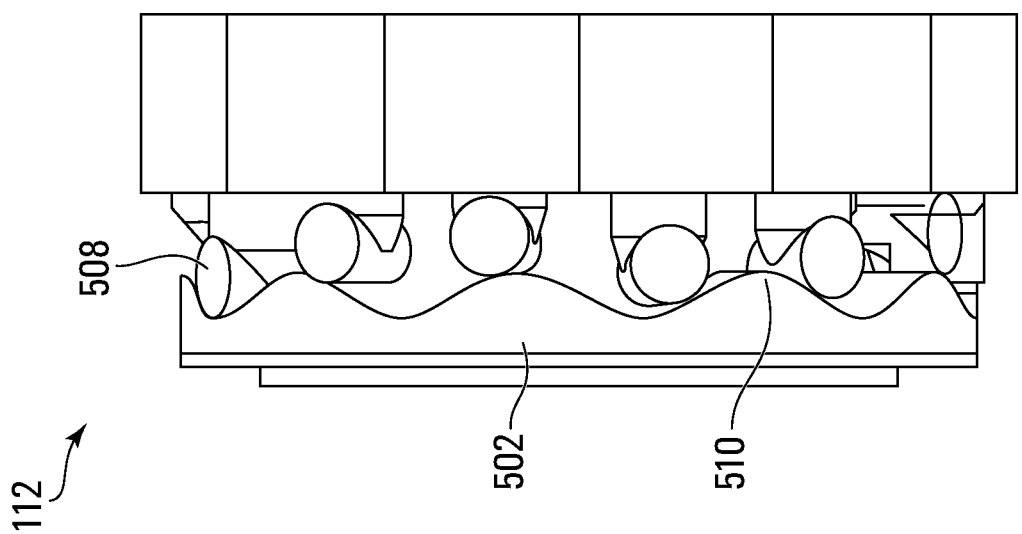
Figure 21:
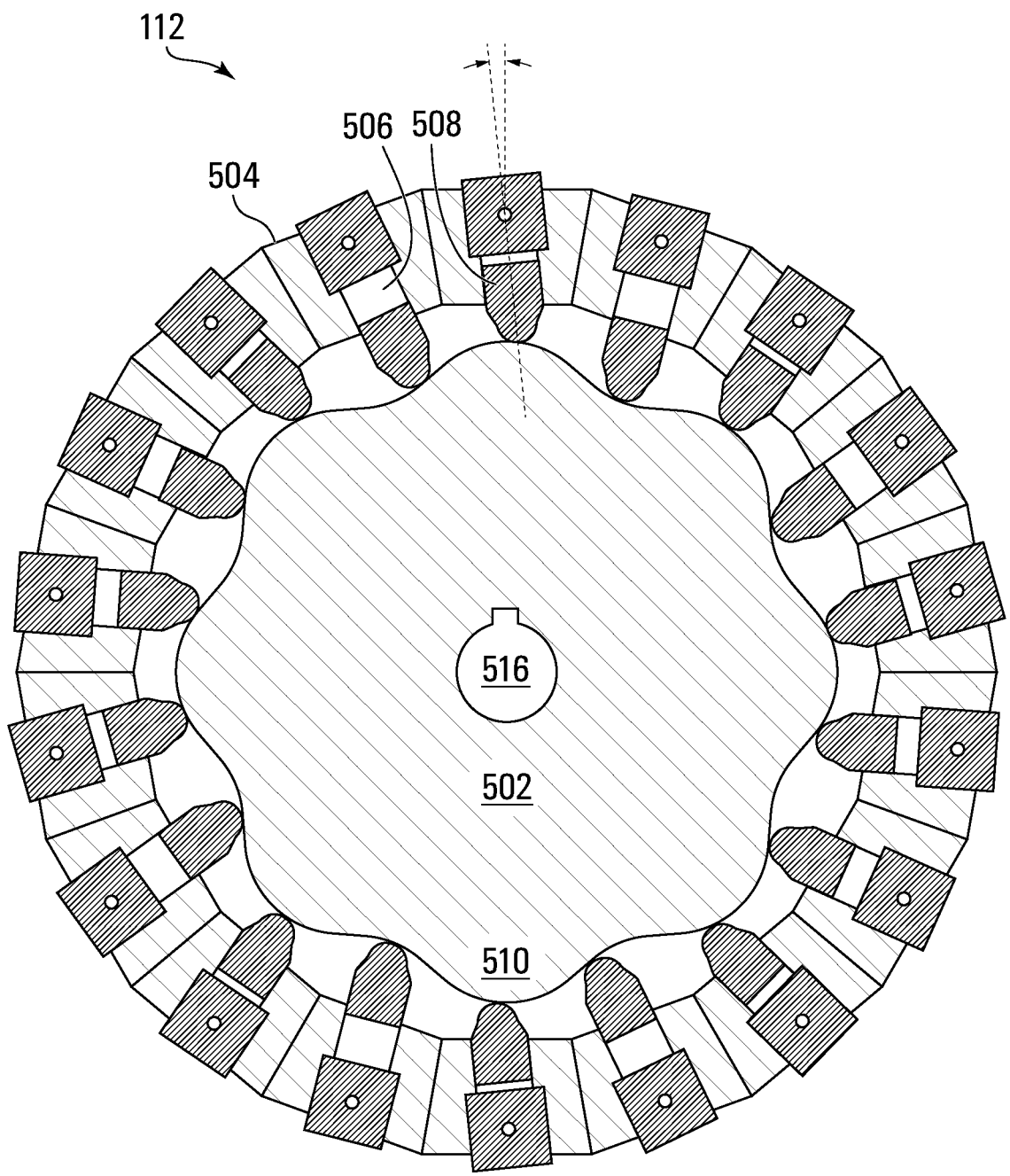
FIG. 21 depicts an example digital hydraulic machine in which the pistons are angled such that they are not radially aligned with the cam-ring.

In addition to the option of deactivation, cumulative displacement of a working chamber 506 for one shaft 602 revolution is a function of working chamber 506 geometry, piston 508 geometry, optional follower geometry, amplitude of cam-ring profile, and/or quantity of cam-ring profile periods (this includes a single lobed case). For a crankshaft machine, the last three are replaced with crankarm geometry and strictly one piston 508 reciprocation per machine revolution. These parameters may be different for each working chamber 506. As used herein, a "group of working chambers" is any number of working chambers 506 that share lobe(s) of a cam-ring that are co-planar with each other. For example, in FIG. 7 the group of working chambers share a cam-ring, and the cam-ring's lobes are co-planar. The group of working chambers in FIG. 7 are disposed in a cross-section of that cam-ring that is normal to the longitudinal axis of the shaft 602; i.e., the working chambers 506 are disposed in a cross section of that cam-ring whose normal is parallel to the longitudinal axis of the shaft 602. FIGS. 20A and 20B depict another embodiment in which a group of working chambers is axially offset from the cam-ring as opposed to radially offset as in FIG. 7. Additional embodiments are possible. For example, several sizes of working chambers 506 may be present within a group, and the number of cam-ring periods (i.e., the number of lobes 510) and/or their amplitudes may be different between two working chamber groups. As another example, FIG. 21 shows an embodiment in which the pistons 508 are angled relative to the center of the cam-ring such that they are not radially aligned with the cam-ring.

The aforementioned means of working chamber 506 deactivation entails fluid displacement that does not contribute to pump/motor 112 functionality; it is desirable to avoid this unproductive fluid motion to avoid parasitic losses from fluid friction and/or limitations on cycle speed.

In one example additional or alternative embodiment, there is provided a means of working chamber 506 deactivation that avoids unproductive fluid motion. This functions by securing the pistons 508 of the working chamber 506 at near or less than the nominal minimum working chamber 506 volume (rather than continuing to follow the cam-ring profile).

In FIG. 7, the depicted valves 702,704 are electronically actuated. As used herein, "electronic actuation" in one embodiment comprises sending an electronic signal to a pilot valve (not depicted; may be pneumatic or hydraulic, for example), which actuates and in turn directly or indirectly causes the valves 702,704 to open and close; in another embodiment it comprises sending an electronic signal directly to an electrical actuator (not depicted), such as a solenoid, that directly opens and closes the valves 702,704. Different forms of electronic actuation may be used in different embodiments. Furthermore, although the depicted embodiments use electronic actuation for the valves 702, 704, the valves 702,704 in different embodiments (not depicted) may be differently actuated.

Referring to FIGS. 8 through 15B there are depicted several embodiments of improved deactivation. The first embodiment (FIG. 8) entails interrupting normal valve actuation near the minimum volume of a working chamber 506; at this point all valves are closed such that the piston 508 remains in this retracted position. Some expansion of the fluid contained in the deactivated working chamber 506 occurs as forces on either side of the piston 508 equilibrate; for a low compressibility fluid (e.g., a liquid) this expansion is small. As the cam-ring continues to rotate, the piston 508 lifts from the cam-ring surface. As the next peak of the cam-ring approaches, brief contact of the piston 508 to the cam-ring may occur because the piston 508 will have been lifted no further from the cam-ring than the cam-ring peak (i.e., peak of the lobe 510) that originally positioned it. Ideally, resumption of normal working chamber 506 function (reactivation) occurs at or near the moment when a cam-ring peak passes the piston 508, such that the piston 508 is given minimum distance to accelerate into contact with the cam-ring, thus avoiding wear.

Figure 8:
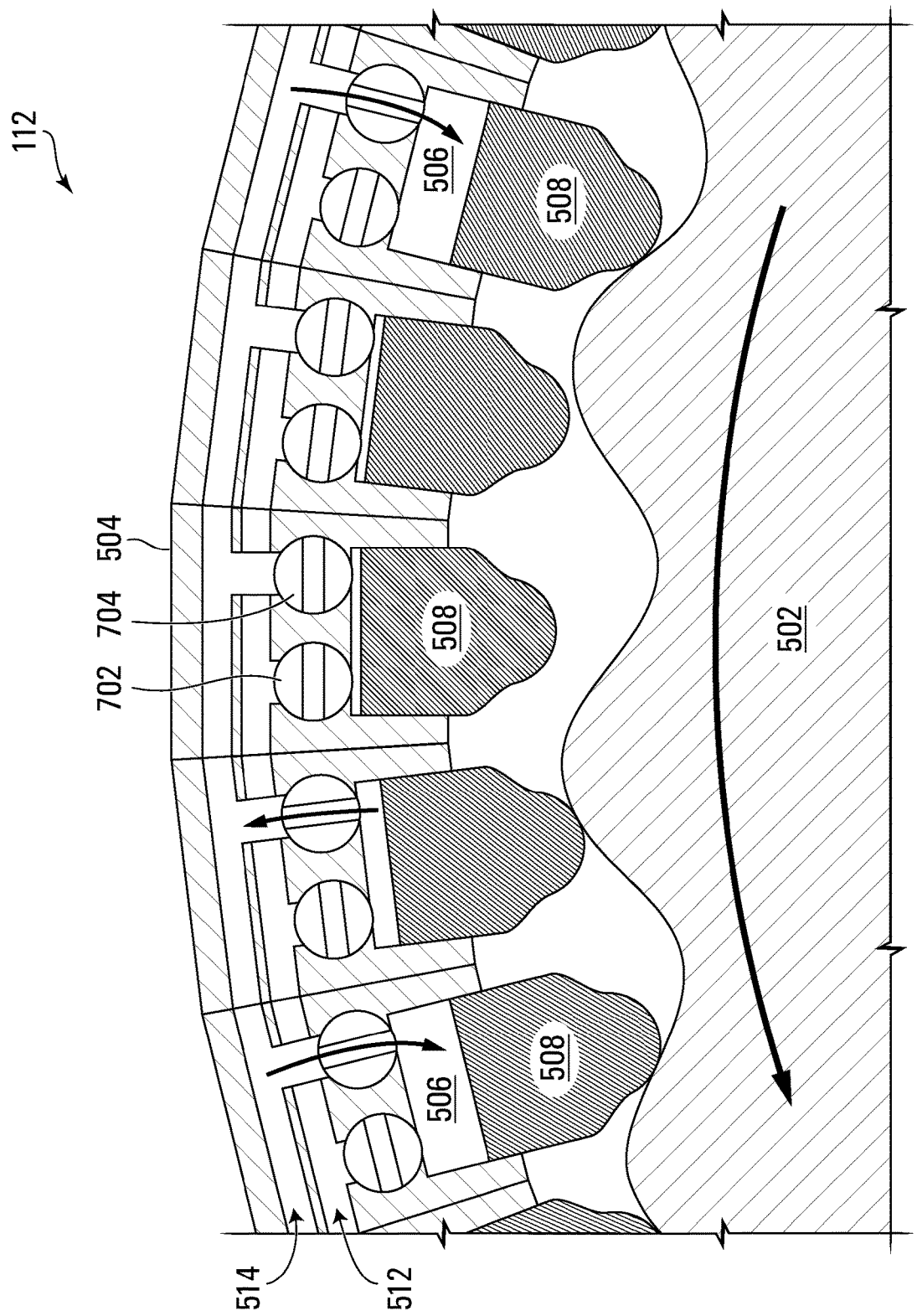

The subsequent embodiments improve upon that of FIG. 8 by retracting pistons 508 to a smaller chamber volume than that achievable by a cam-ring peak, thereby avoiding potential periodic contact of cam-ring and piston 508 as cam-ring peaks pass by. In these embodiments, the pistons 508 are displaced by a force biased against the fluid pressure incident in the working chamber 506 targeted for deactivation. For a given working chamber 506, the force bias may be created by combinations of pressurization of the atmosphere on the piston face opposing a working chamber fluid (e.g., pressurization within the pump/motor case 1302), springs differentially biasing some working chambers' pistons 508, and/or introduction of an intermediate-pressure manifold with fluid connectivity to one or more of the working chambers 506.

Figure 9A:
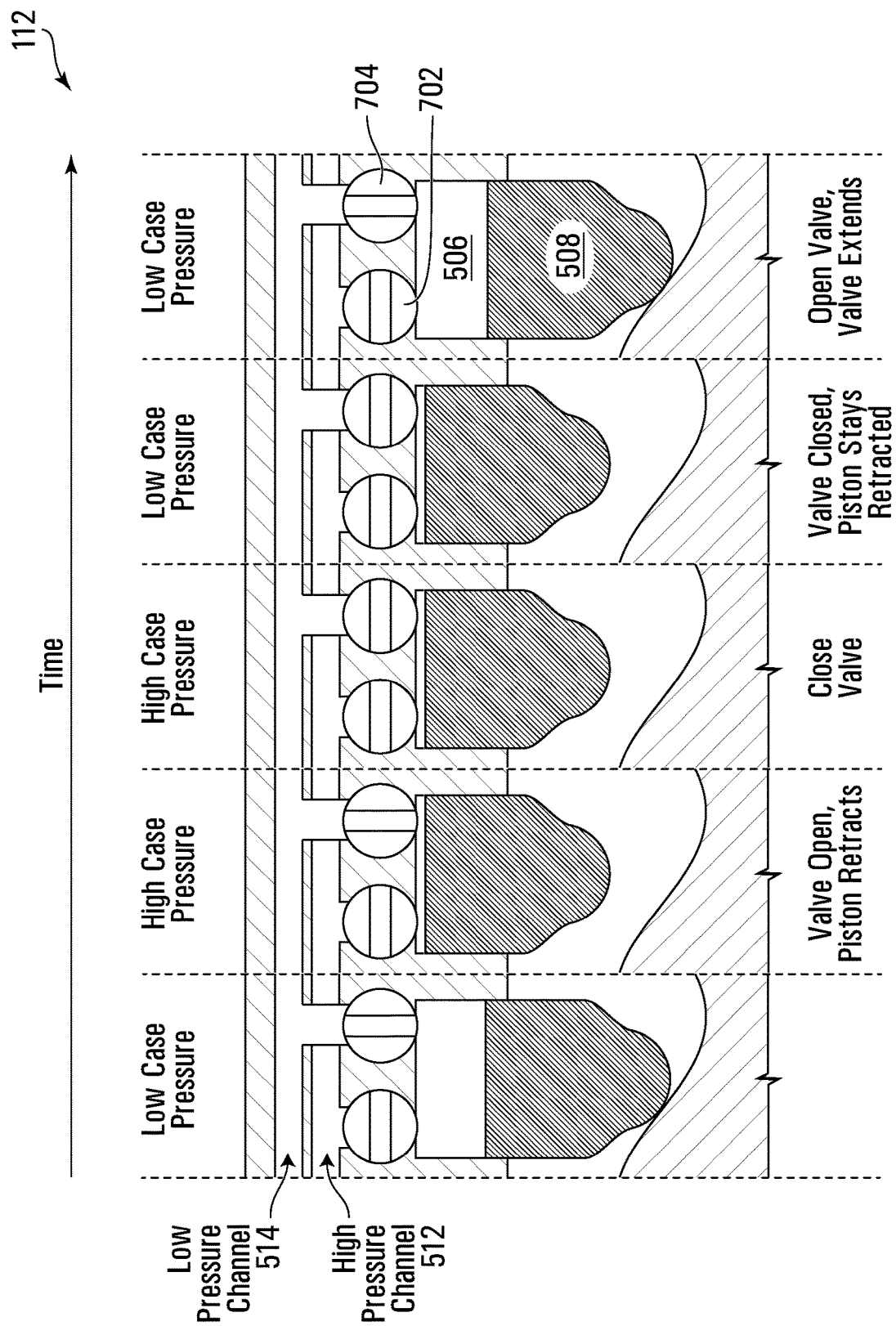
Figure 9B:
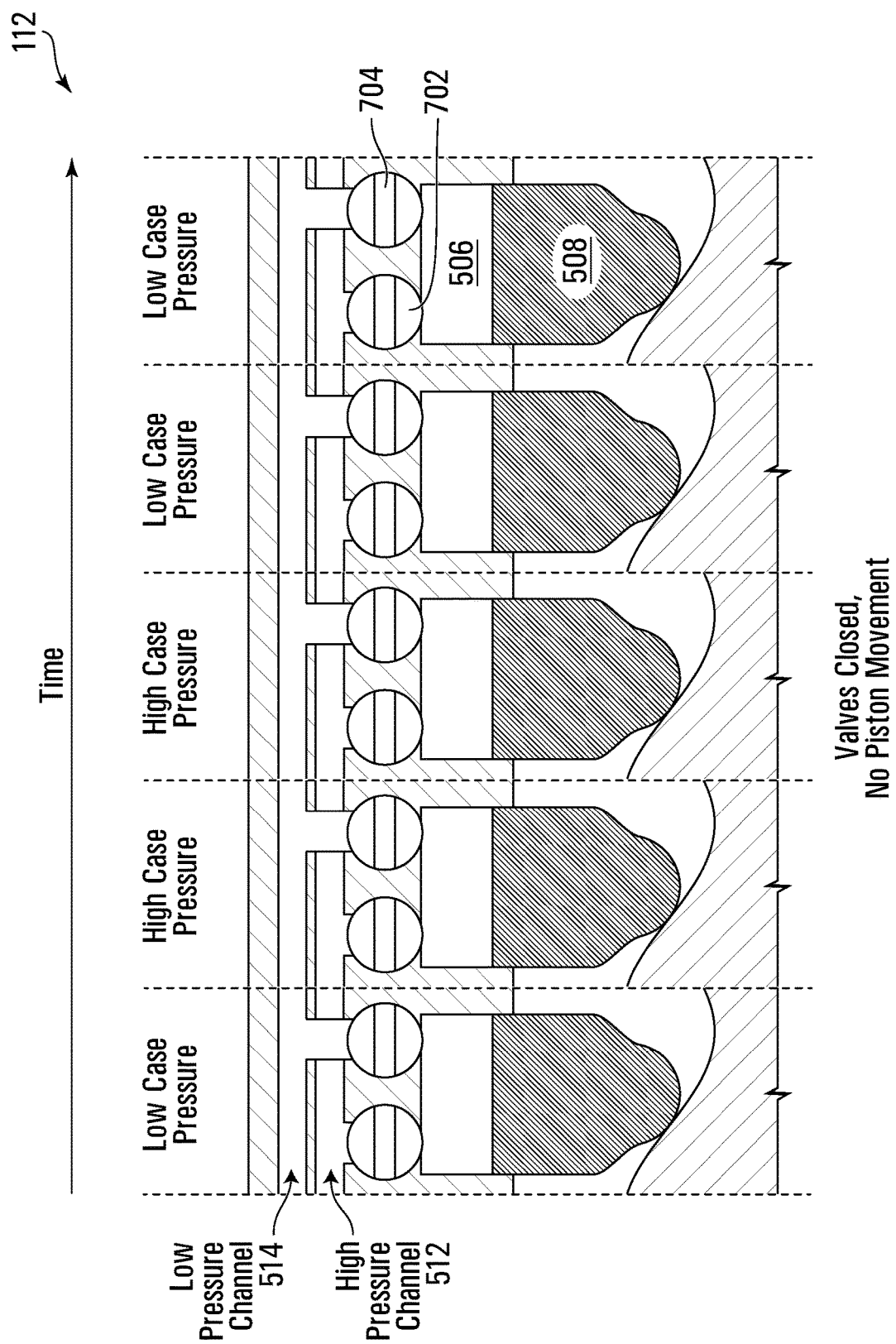

Referring to FIGS. 9A and 9B, there is depicted a first embodiment of improved working chamber deactivation means comprising at least two working chambers 506 sharing a common atmosphere on the piston 508 faces opposing the working chamber 506 fluid, and a means to pressurize said common atmosphere (pressure within the case 1304). In this embodiment, all working chambers 506 perform work when the case pressure is negligible (e.g., at atmosphere). Improved deactivation of one working chamber 506 occurs by: stopping rotation of the machine, which in FIG. 9A is done by stopping the rotor 502; closing the low-pressure valve 704 (if open) of the non-target working chamber(s) 506 (i.e., the working chamber(s) 506 to remain activated) (the high-pressure valve(s) 702 for those working chamber(s) 506 may remain in their given state); closing the high-pressure valve(s) 702 (if open) of the target working chamber(s) (i.e., the working chamber(s) 506 to be deactivated); opening the target working chamber(s)' 506 low-pressure valve(s) 704 (if closed); increasing case pressure such that the case pressure force overcomes the force of the low-pressure fluid of the target working chamber(s) 504 (the non-target working chamber(s)' 506 fluid will resist compression); immobilization of the target working chamber(s) 504 (e.g., by closing its low-pressure valve); and relief of case pressure upon complete lift of the target working chamber(s)' 506 pistons 508 from the cam-ring. FIG. 9B shows how a working chamber 506 is immobile in response to changes in case pressure when that chamber 506's valves 702,704 are closed. As used herein, "immobilization" of a working chamber 506 refers to immobilizing the piston 508 that slides into and out of that working chamber 506.

In another embodiment (not depicted), the pump/motor 112 comprises the same components. This embodiment has both working chambers 506 contributing to work when the case pressure is negligible (e.g., atmosphere). Improved deactivation of one working chamber 506 occurs by opening the low-pressure valves 704 of both working chambers 506; closing the high-pressure valves 702 of both working chambers 506; increasing case pressure such that the case pressure force overcomes the force of the low-pressure fluid in both working chambers 506 (both working chambers' volumes will consequently decrease); immobilizing the target working chamber (e.g., by closing its low-pressure valve 704) upon complete lift of the target working chamber piston 508 from the cam-ring; and upon that immobilization, relieving case pressure and returning the non-target working chamber 506 to normal operation. This embodiment is distinguished by the embodiment of FIG. 9A by avoiding stoppage of machine rotation; however, for the time working chambers 506 are being transitioned to the deactivated state, no working chambers 506 are productive.

Figure 10C:
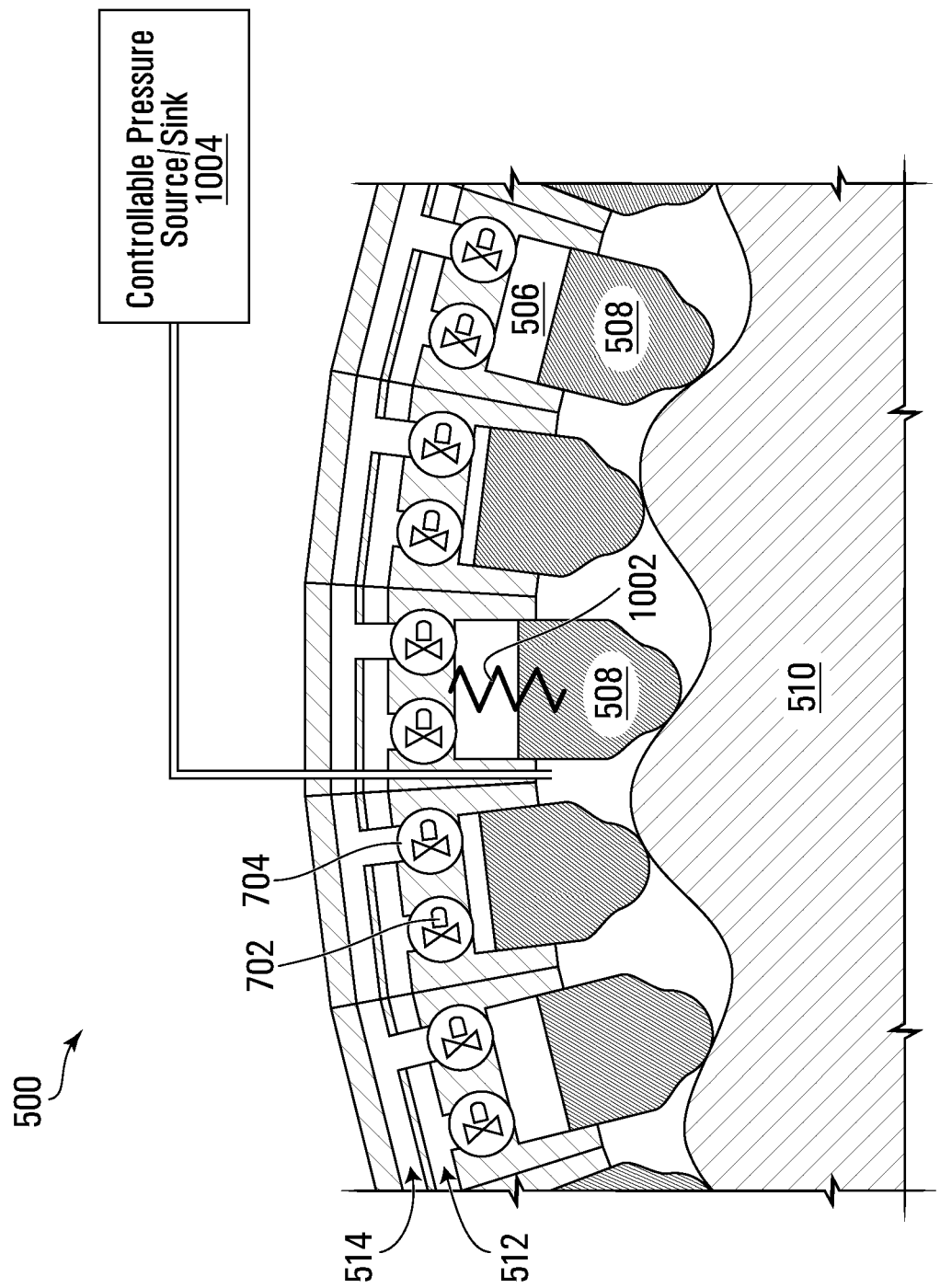
Figure 10D:
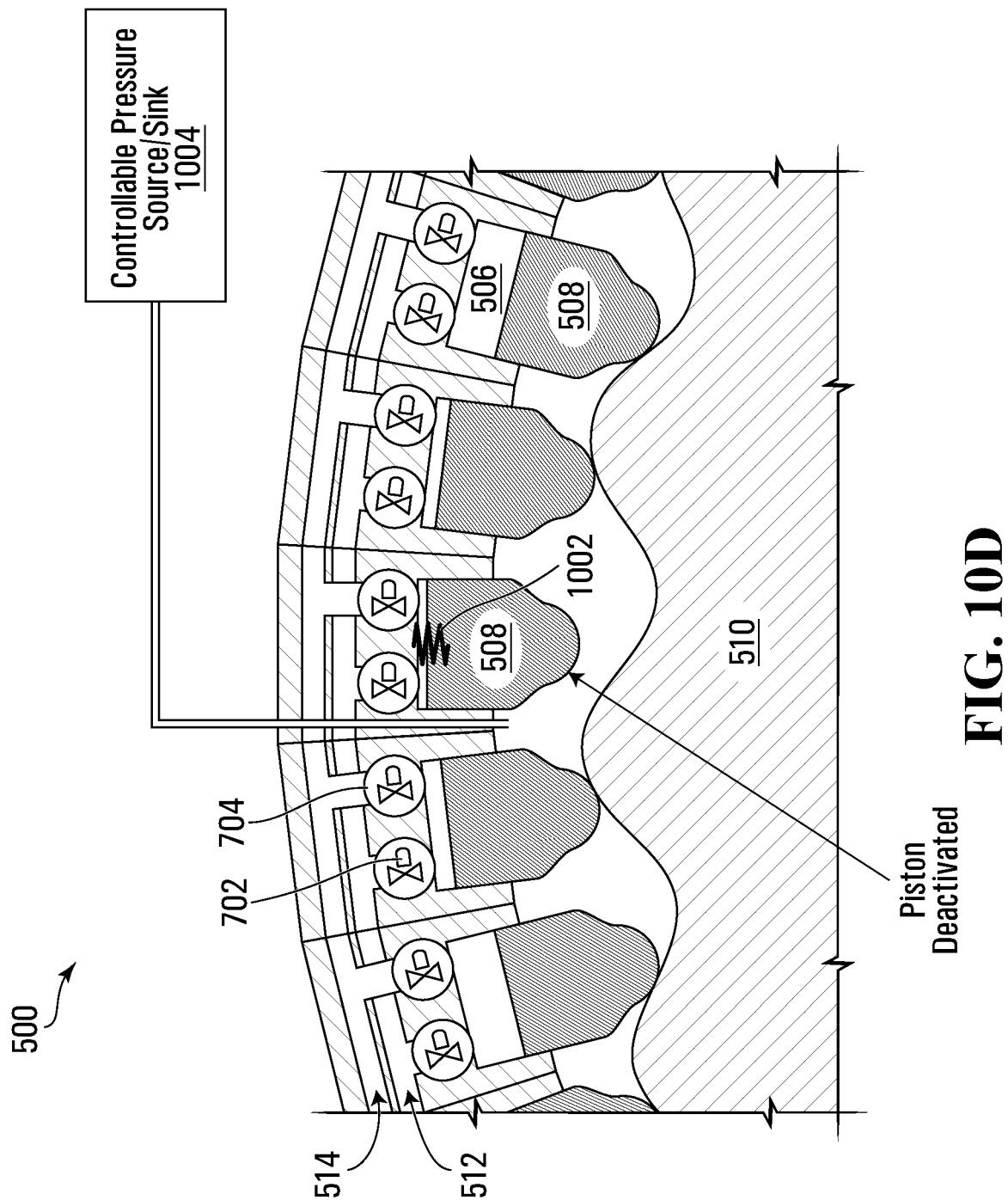

Referring to FIGS. 10A-10D, there is depicted a second embodiment of improved working chamber deactivation means comprising at least two working chambers 506 sharing a common atmosphere (gaseous or liquid environment) on the piston 508 faces opposing the working chamber fluid, a spring 1002 to bias one working chamber 506 towards contraction more than the other, and a controllable pressure source/sink 1004 used to pressurize the common atmosphere (case pressure). FIGS. 10A and 10B show how the spring 1002, which in the depicted embodiment is a tension spring 1002, interacts with the piston 508 when working chamber volume is zero (FIG. 10A) and non-zero (FIG. 10B). This embodiment has both working chambers 506 contributing to work when the case pressure is negligible (e.g., atmosphere). Improved deactivation of one working chamber 506 occurs by closing its high-pressure valve 702; opening its low-pressure valve 704; increasing case pressure using the controllable pressure source/sink 1004 such that the combination of spring force and case pressure force overcome the force of the low-pressure fluid of the target working chamber 506 without overcoming that of the other chamber 506; and, optionally, closing the low-pressure valve 704 and relief of case pressure using the source/sink 1004 upon complete lift of the target working chamber piston 508 from the cam-ring. FIG. 10C depicts operation of this embodiment when case pressure is at atmosphere, while FIG. 10D depicts operation of this embodiment when case pressure has been used to deactivate the target working chamber 506, as discussed above.

In another embodiment (not depicted), the aforementioned spring(s) 1002 may be biasing those working chambers 506 not intended for improved deactivation towards increasing working chamber volume; that is, a compression spring as opposed to a tension spring as shown in FIGS. 10A-10D may be used. In this embodiment, case pressure is increased such that the case pressure force overcomes the force of the low-pressure fluid of the target working chamber 506 without overcoming the sum of spring force and low-pressure fluid force of the non-targeted chamber(s) 506. In a further embodiment (not depicted), spring force biasing increase of non-target working chambers 506 volumes may be replaced with admittance of high-pressure hydraulic fluid; where subsequently the working chambers 506 targeted for improved deactivation are immobilized at their minimum volume, and normal operation of non-deactivated working chambers 506 resumes.

Figure 11:
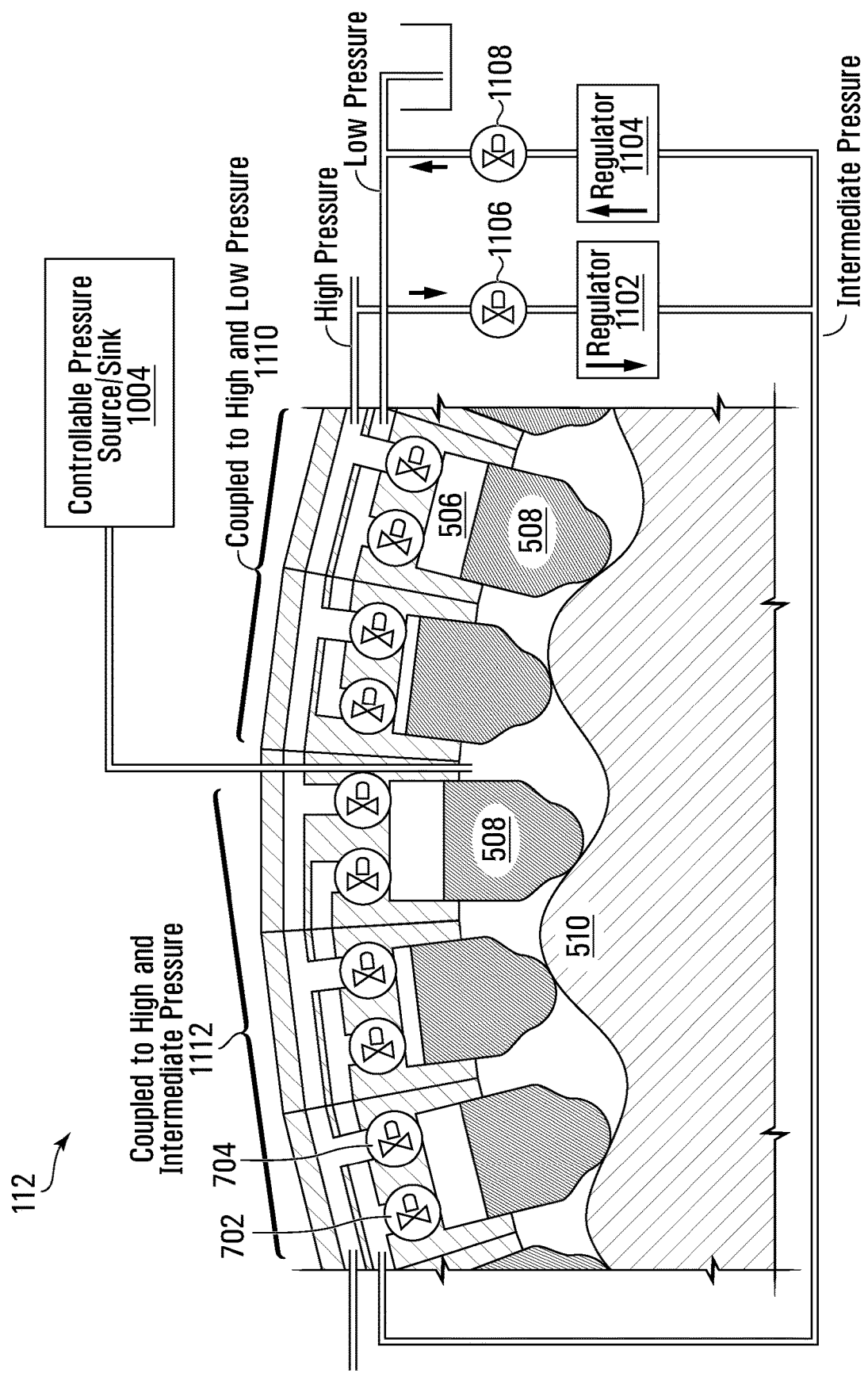

Referring to FIG. 11, there is depicted a third embodiment of improved working chamber deactivation means comprising at least two working chambers 506 sharing a common atmosphere on the piston 508 faces opposing the working chamber fluid, and the controllable pressure source/sink 1004 to pressurize the common atmosphere (case pressure). The two working chambers 506 each comprise the low-pressure channel 514, with one of those low-pressure channels 514 being used as an intermediate-pressure channel (that low-pressure channel 514 is hereinafter the "intermediate-pressure channel") in conjunction with a means to produce and maintain an intermediate pressure in the intermediate-pressure channel. The means to maintain the intermediate pressure may be, in motoring mode, a back-pressure regulator 1104 and valve 1108 at the intermediate-pressure channel that feeds the low-pressure channel 514; and in pumping mode a regulator 1102 and valve 1106 at the high-pressure channel 512 that feeds the intermediate-pressure channel. In motoring mode, this embodiment has both working chambers 506 contributing to work when the case pressure is negligible (e.g., atmosphere); whereas in pumping mode the working chamber 506 coupled to the intermediate-pressure channel, if it lacks a valve to swap to the low-pressure channel 514, is a parasitic contribution to work regardless of the case pressure. Improved deactivation of one working chamber 506 occurs by closing its high-pressure valve 702; opening its low-pressure valve 704; increasing case pressure such that the case pressure force overcomes the force of the low-pressure fluid of the target working chamber 506 without overcoming the intermediate-pressure fluid force of the other chamber 506; and optionally closing the low-pressure valve 704 and relief of case pressure upon complete lift of the target working chamber piston 508 from the cam-ring.

Figure 12:
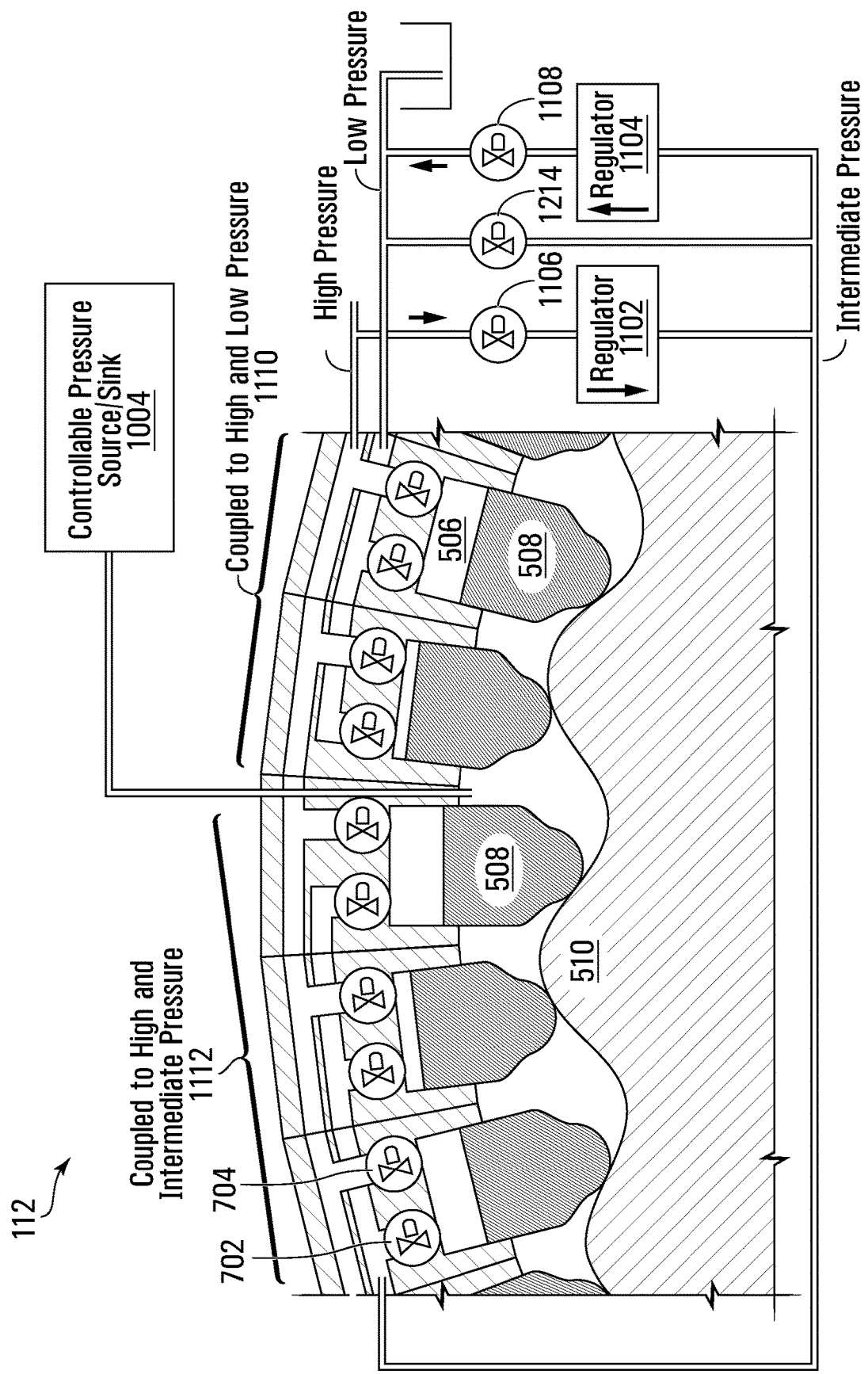

Referring to FIG. 12, there is depicted a fourth embodiment of improved working chamber deactivation means comprising at least two working chambers 506 sharing a common atmosphere on the piston 508 faces opposing the working chamber fluid; the controllable pressure source/sink 1004 to pressurize the common atmosphere (case pressure); an intermediate-pressure fluid channel as described above in respect of FIG. 11; and a means to produce and control the intermediate-pressure fluid channel pressure between intermediate and low pressures. The means to produce and control the intermediate pressure may be a valved back-pressure regulator 1104 at the intermediate-pressure channel that feeds the low-pressure channel 514 and an associated valve 1108; a valved regulator 1102 at the high-pressure channel 512 that feeds the intermediate-pressure channel and an associated valve 1106; and a valve 1214 that allows fluid communication between the low-pressure channel 514 and the intermediate-pressure channel. This embodiment has both working chambers 506 contributing to work when the intermediate-pressure channel is operated at low-pressure and the case pressure is negligible (e.g., atmosphere). Improved deactivation of one working chamber 506 occurs by closing its high-pressure valve 702; opening its low-pressure valve 704; increasing both case pressure and intermediate-pressure channel pressure such that the case pressure force overcomes the force of the low-pressure fluid of the target working chamber 506 without overcoming the intermediate-pressure fluid force in the other chamber 506; immobilizing the target working chamber piston 508 (e.g., via closure of all its valves 702,704); and reliving case pressure and returning intermediate channel pressure to low-pressure upon complete lift/immobilization of the target working chamber piston 508 from the cam-ring. This embodiment is distinguished from that of FIG. 11 by only operating the intermediate-pressure channel at intermediate pressure when transitioning a working chamber 506 to the deactivated state. The benefit of this approach is that it reduces the occurrence of throttling inefficiencies incurred by sustaining an intermediate-pressure.

Figure 13A:
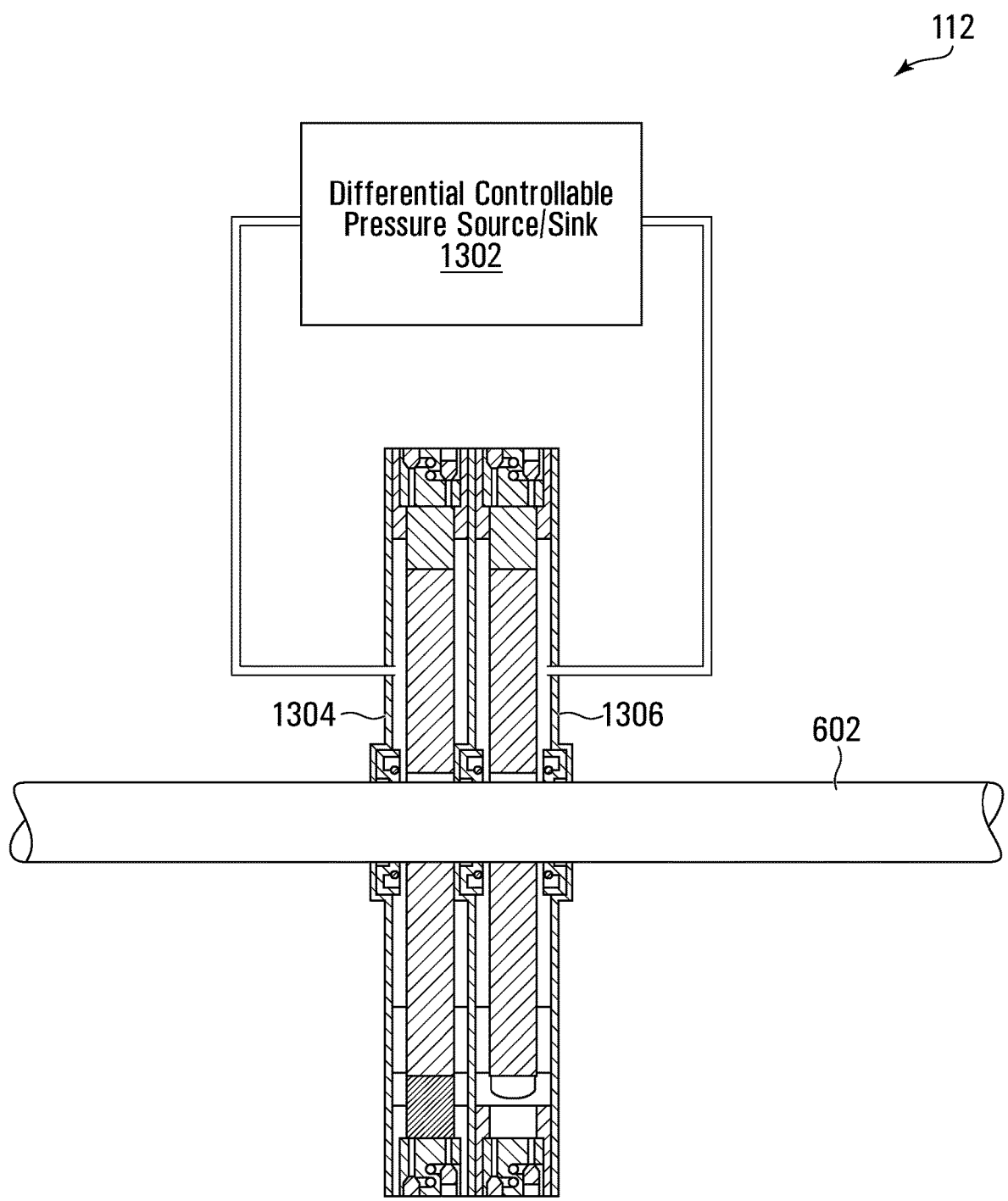
Figure 13B:
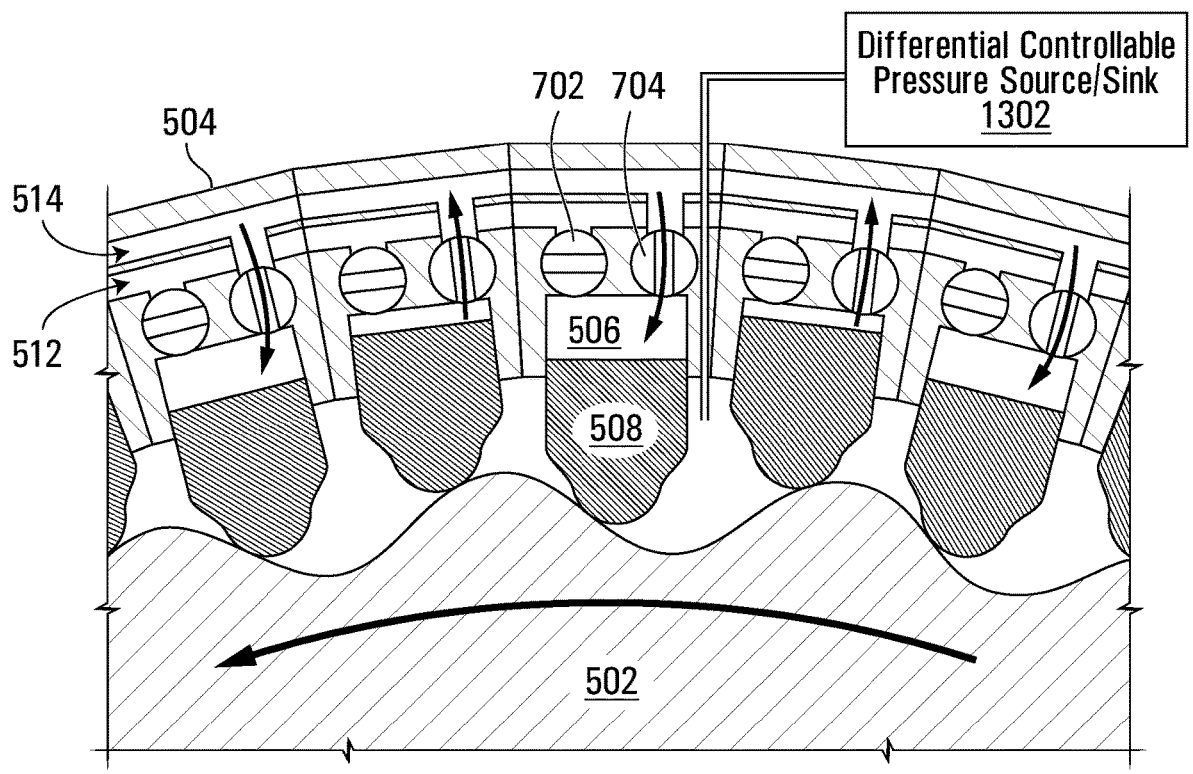
Figure 13C:
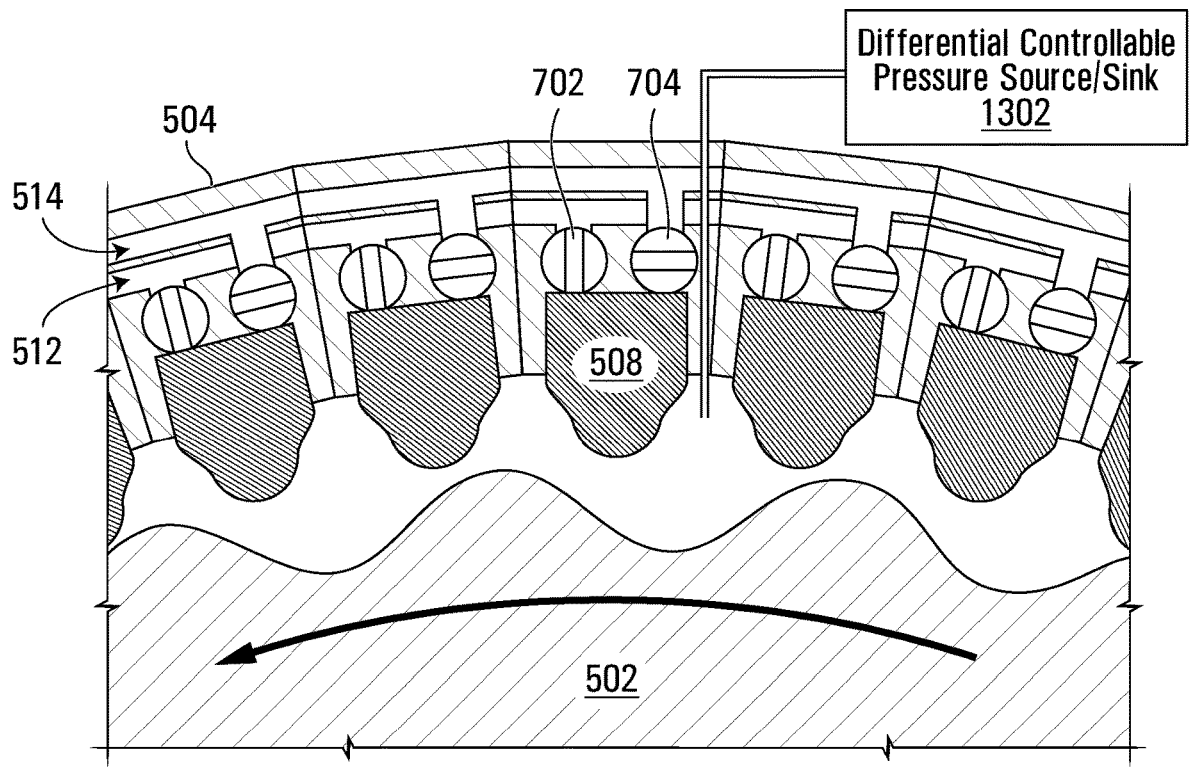

Referring to FIGS. 13A-13C, there is depicted a fifth embodiment of improved working chamber deactivation means comprising at least two working chambers 506, possessing different atmospheres on the piston faces opposing the working chamber fluid, and a differential controllable pressure source/sink 1302 to preferentially increase one atmosphere's pressure. FIG. 13A depicts different case atmospheres being provided to different working chamber groups disposed along the shaft 602, with one group at one pressure in a first case 1304 and another group at another pressure in a second case 1306, as an example embodiment, although other non-depicted embodiments are possible. This embodiment has both working chambers 506 contributing to work when both case pressures are negligible (e.g., atmosphere). Improved deactivation of one working chamber occurs by closing its high-pressure valve 702; opening its low-pressure valve 704; increasing case pressure of the target working chamber 506 such that the case pressure force overcomes the force of the low-pressure fluid of the target working chamber 506; immobilizing the piston 508 of the target working chamber 506 after the increased case pressure has lifted the piston 508; and then relieving case pressure upon complete lift of the target working chamber piston 508 from the cam-ring. The piston 508 may be immobilized by closing the low-pressure valve 704 of the target working chamber 506. FIGS. 13B and 13C depict operation of this embodiment, with FIG. 13B depicting the first case 1304 at a lower case pressure than the second case 1306 of FIG. 13C. While FIGS. 13A-13C show a differential controllable pressure source/sink 1302, in different embodiments (not depicted), the controllable pressure source/sink 1004 of FIGS. 10B-12 may be used in any of FIGS. 13A-13C, thereby permitting one case atmosphere to be increased or decreased in pressure independently of any other case atmosphere.

The aforementioned methods, systems, and techniques for working chamber deactivation may be invoked alone or in conjunction with further pump/motor adaptations, as described below, to improve PKG performance.

Additionally or in alternative to the foregoing embodiments, the pump/motor 112 may be optimized for the PKG system where two assemblies of working chambers 506 are assigned to power and retraction strokes. As used herein, an "assembly" 1110 of working chambers 506 refers to any collection of working chambers 506, whether those working chambers 506 comprise parts of different groups of working chambers 506 or are selected from within the same group. A reference to "overlapping assemblies" refers to two assemblies of working chambers 506 that are not identical but that nonetheless share at least one working chamber 506. Working chamber 506 deactivation is used to select between assemblies 1110, and one or more chambers 506 comprising a subset of an assembly 1110 may also be deactivated for additional resolution in displacement. When working chamber 506 deactivation is of a type that immobilizes the piston 508, this approach may also increase the range of operating speeds. The assemblies 1110 may comprise working chambers 506 for which individual displacements per shaft 602 revolution may be different. These assemblies 1110 may comprise whole working chamber 506 groups (about a common cam-ring), but this is not required.

Figure 14A:
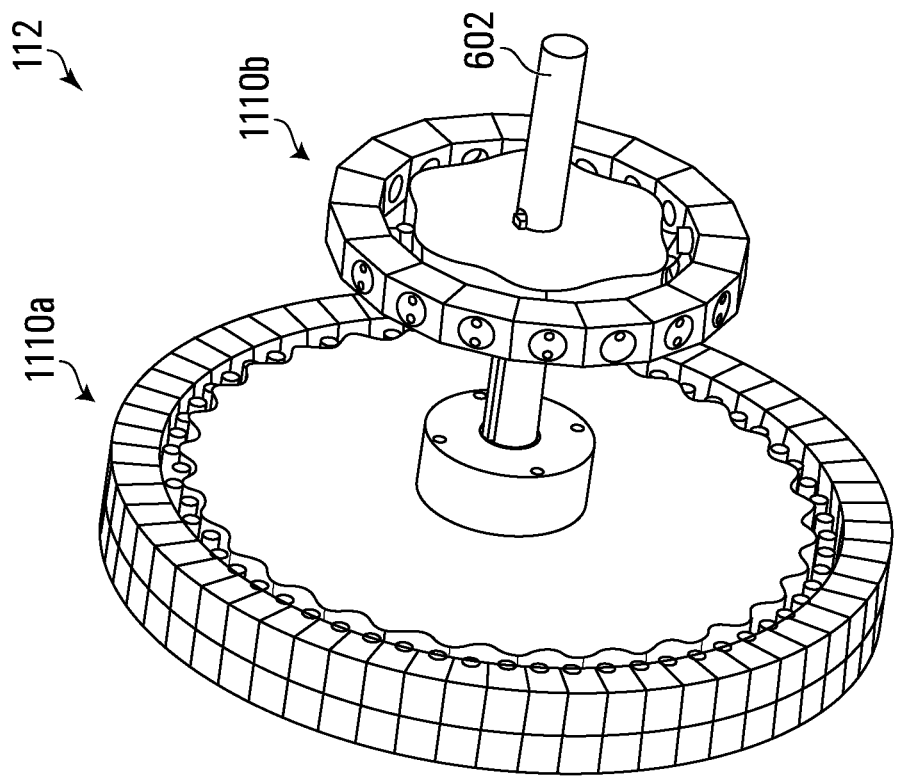
FIGS. 14A and 14B depict example working chamber assemblies having different displacements.
Figure 14B:
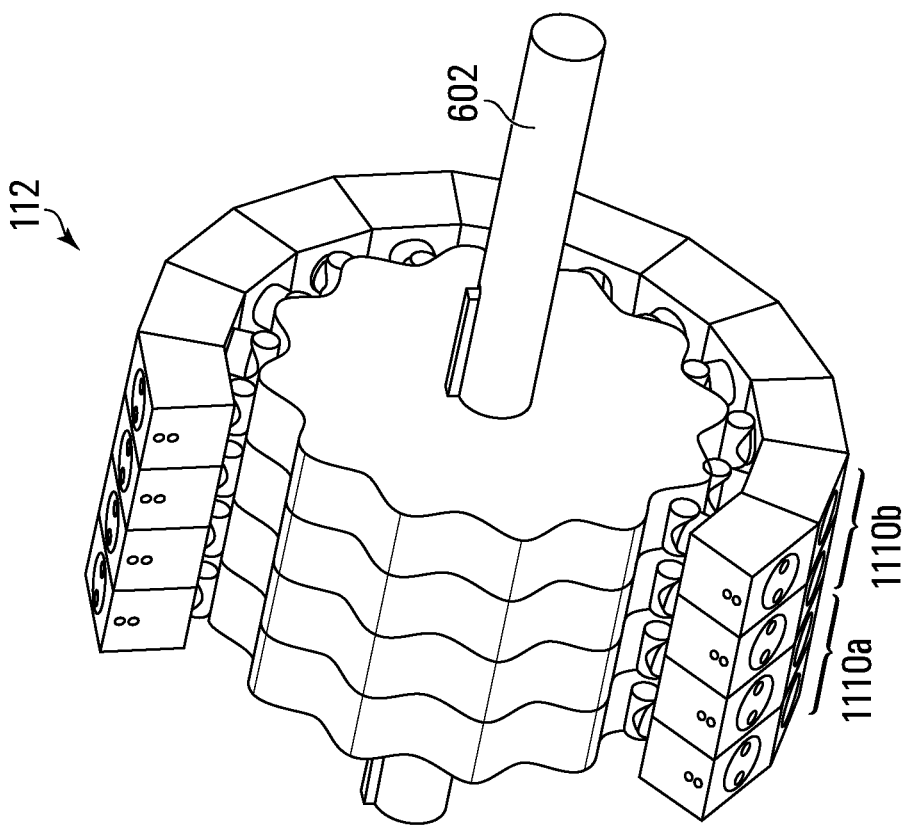

FIG. 14B depicts an embodiment comprising at least two working chamber assemblies 1110a,b axially disposed and in which one of the assemblies 1110a differs from another assembly 1110b in displacement. For an embodiment comprising two assemblies 1110a,b, it is preferred that one assembly's 1110a displacement is optimized for the PKG power stroke and the other assembly's 1110b displacement/parameters is optimized for the PKG retraction stroke. Alternatively, one assembly 1110b may be optimized for the PKG retraction stroke and the sum of both assemblies 1110a,b may be optimized for the PKG power stroke. Working chamber 506 deactivation is applied to select the appropriate one or more assemblies 1110 of working chambers 506 depending on the PKG stroke: high-speed, low-displacement for the retraction stroke or low-speed, high-displacement for the power stroke. Additional working chambers 506 of an assembly 1110 may also be deactivated to further refine displacement. Selection amongst working chambers 506 with different individual displacements may be considered a coarse pump/motor displacement adjustment; whereas selection amongst working chambers 506 of similar individual displacements may be considered a fine pump/motor displacement adjustment. In FIG. 14B, one of the assemblies 1110a comprises a rotor 502 and stator 504 with a larger radius, more working chambers 506, and more lobes 510 than the other assembly 1110b. The assembly 1110a having the rotor 502 and stator 504 with larger radii has greater displacement and is activated during the power stroke and deactivated during the refraction stroke. The assembly 1110b having the rotor 502 and stator 504 with smaller radii is optionally also active during the power stroke, and is active during the retraction stroke.

FIG. 14A depicts an embodiment comprising four groups of working chambers 506, which are collected into two overlapping assemblies 1110: a power stroke assembly 1110a and a retraction stroke assembly 1110b. The retraction stroke assembly 1110b comprises two groups of working chambers 506 and the power stroke assembly 1110a comprises the retraction stroke assembly 1110b and an additional two groups of working chambers 506. The power stroke assembly 1110a accordingly has a higher displacement than the retraction stroke assembly 1110b as discussed above in respect of FIG. 14B.

Additionally or in alternative to the foregoing embodiments, a pump/motor may be optimized for the PKG system where two assemblies 1110 of working chambers 506 are assigned to power and retraction strokes, where clutches 1502 (depicted in FIGS. 15A and 15B) are used to select between assemblies 1110, and where some subset of an assembly 1110 may also be deactivated for additional resolution in displacement.

Figure 15A:
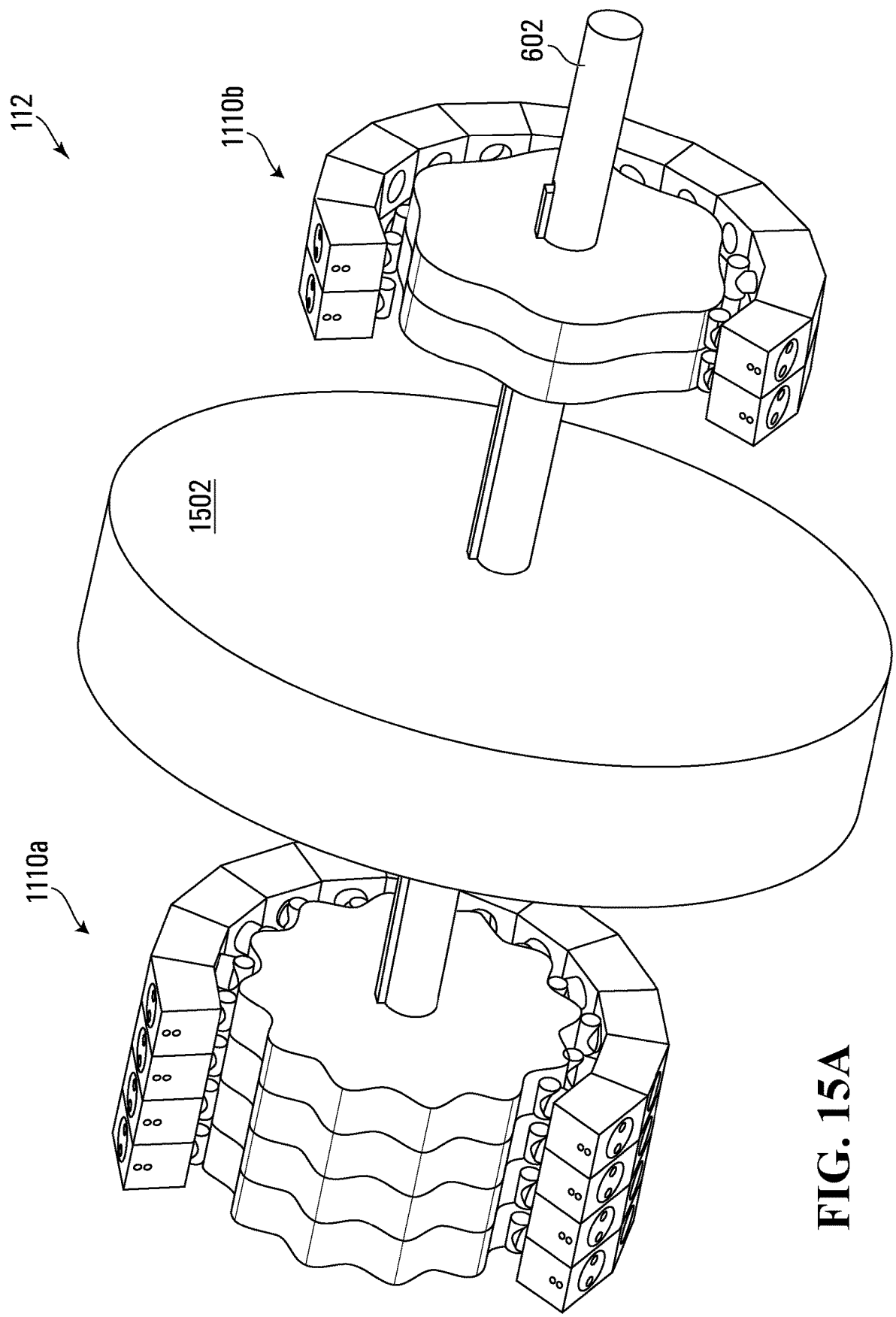
FIGS. 15A and 15B depict example working chamber assemblies each comprising a clutch.
Figure 15C:
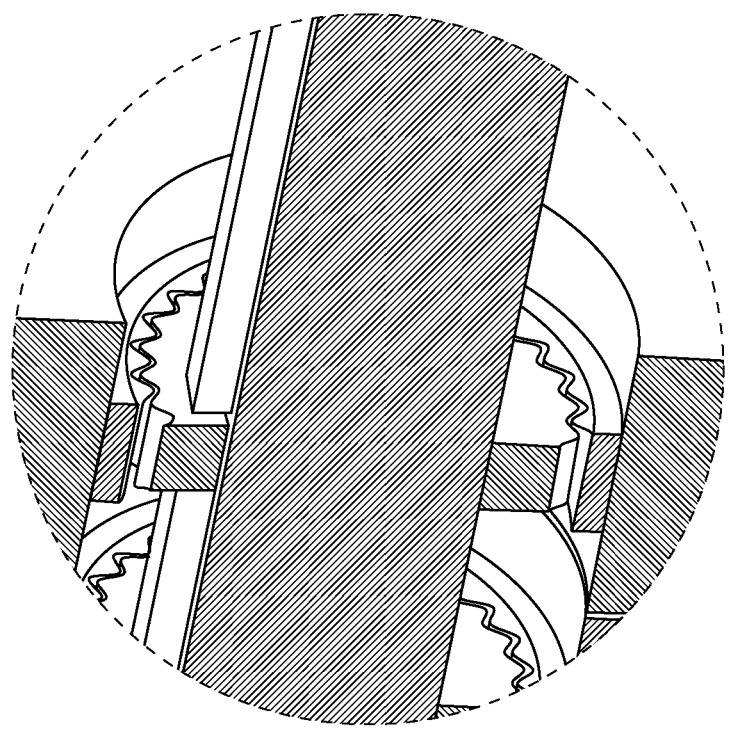
FIG. 15C depicts in detail an example clutch of the type shown in FIG. 15B.
Figure 15B:
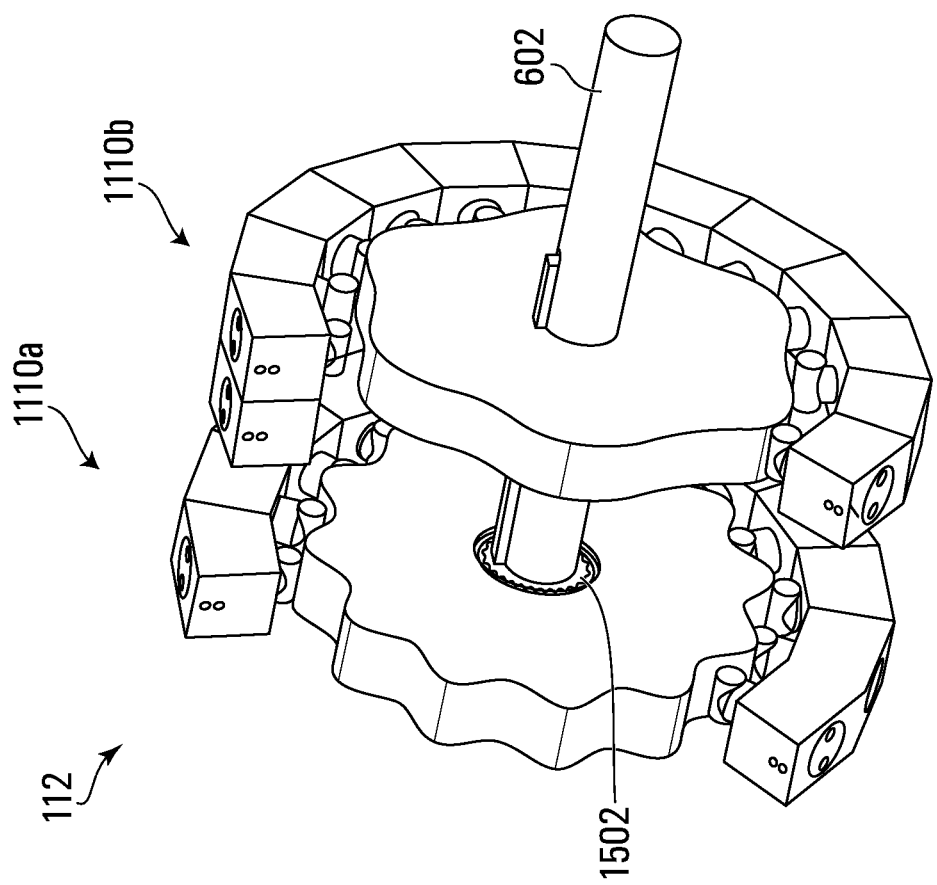

Referring to FIGS. 15A and 15B, there are depicted two embodiments, each comprising at least two working chamber groups coaxially disposed, at least one group differing from the others in quantity of displacement and/or other physical parameters, and a clutch 1502 provided between the pump/motor output shaft 602 and one working chamber group's rotary motion. The clutch 1502 may be provided between separate shafts 602 of multiple working chamber groups (FIG. 15A), or be provided between a working chamber group's cam-ring and the shaft 602 (FIG. 15B). The clutch 1502 may be actively or passively actuated (FIG. 15B depicts a passive freewheel-type clutch). In one embodiment, the displacements of working chamber groups are such that the sum of all groups is optimized for the high-displacement power stroke, and the subset of groups isolated for use via the clutch's 1502 operation is optimized for the low-displacement retraction stroke. In one embodiment, two working chamber groups are coupled by a passive clutch 1502 whose action is characteristic of a sprag clutch. The working chamber group rigidly (not through the clutch) couples to the tether engine 104 and has a displacement optimized for the retraction stroke. The displacement sum of both working chamber groups is optimized for the power stroke. When the tether 102 is extended by the airfoil 200, the tether engine 104 drives both working chamber groups in pumping mode (power stroke). To retract the tether 102, the tether engine 104 is driven in the opposite direction by the hydraulic pump/motor 112 in motoring mode where only working chambers 506 of the rigidly-coupled working chamber group are activated and the other group is deactivated (retraction stroke). This deactivated group's components are stationary owing to the action of the clutch 1502. The clutch-disconnected working chamber group may be deactivated by any suitable means during the power stroke (i.e., without the aforementioned improved means featuring piston 508 immobilization, as the clutch 1502 prevents piston 508 actuation during the retraction stroke without immobilizing pistons 508 as described in respect of FIGS. 7-14), whereby unproductive fluid motion is still avoided. Thus, the efficiency of the pump/motor 112 is improved for the PKG application, already before incorporating the aforementioned improved deactivation techniques. Any aforementioned means of working chamber 506 deactivation may still be applied to the working chambers 506 for further pump/motor 112 displacement control. The outcome is that the pump/motor 112 can deliver different displacements as a function of PKG mode with reduced unproductive fluid motion. FIG. 15C depicts in detail an example passive freewheel-type clutch of the type depicted in FIG. 15B.

Additionally or in alternative to the foregoing embodiments, the digital hydraulic pump/motor 112 is provided means of variable displacement through control of the cam-ring profile followed by working chambers 506. The cam-ring profile is defined as the perimeter of the cam-ring cross-section (taken at a given axial position) normal to machine rotation axis. An example cam-ring profile may be a sinusoid function comprising parameters of average radius, amplitude, and quantity of periods (i.e., number of lobes 510). Example cam-ring profiles are provided as FIGS. 16A-16F. Control of the cam-ring profile alters the pump/motor 112 displacement without sustained deactivation of working chambers 506. In certain embodiments, the range of variable displacement is optimized for the envisioned PKG power and retraction strokes (e.g., the profile may vary between one for high volume and one for lower volume displacement).

For example, one embodiment (not depicted) comprises a working chamber group, a cam-ring having at least two different cross-sectional profiles disposed axially (e.g., FIG. 16B), constructed as a single piece or comprising multiple pieces, and a means to change the relative position of working chambers 506 (pistons/followers) relative to the cam-ring in the axial direction. This embodiment functions by deactivating all working chambers 506 targeted for cam-ring profile change such that pistons 508 are cleared from any interference with the cam-ring, actuation of the means to relatively displace the working chambers 506 and cam-ring, and reactivation of the working chambers 506 onto the new cam-ring profile.

Another embodiment (not depicted) comprises a working chamber group, a cam-ring having a substantially tangential surface continuity where the cam-ring profile varies in the axial direction, and a means to change the relative position of working chambers 506 (pistons/followers) relative to the cam-ring. This embodiment is distinguished from the immediately preceding embodiment by specifying a continuous cam-ring surface (e.g., FIGS. 16C, 16D, 16E), such that working chamber pistons/followers may maintain contact with the cam-ring during actuation of the positioning means. The cam-ring profile control of this embodiment functions by optional deactivation of working chambers 506 targeted for cam-ring profile change; actuation of the means to relatively displace the working chambers 506 and cam-ring; and reactivation of the optionally deactivated working chambers 506. In one embodiment in which different cam-ring profiles have a different number of periods, intermediate between the profiles of different numbers of non-zero periods is a profile of zero periods (e.g., FIG. 16E shows a cam profile which transitions between six and twelve lobes with a cylindrical region of zero lobes 510 axially located in between.

Referring to FIGS. 17A-17C, there are depicted three embodiments of the aforementioned means to relatively displace working chambers and cam-ring in the form of a hydraulic actuator 1702. While a hydraulic actuator 1702 is shown, in different embodiments (not depicted) a different and still suitable type of linear actuator, such as an electric or pneumatic actuator, may be used.

FIG. 17A depicts one embodiment in which the case 1304 holding the working chambers 506 is immobile in the axial direction, a shaft 602 that is immobile in the axial direction, cam-rings that are coupled to the shaft 602 via means that constrain rotation but permit axial displacement, and a hydraulic actuator 1702 to position the cam-rings in the axial direction. The cam-ring may be coupled to the shaft 602 using a keyway or spline, for example. The actuator 1702 may act through a shift fork. This embodiment functions by displacing cam-rings directly within the case 1702, which in turn alters the cam-ring profile aligned with the working chambers 506.

FIG. 17B depicts another embodiment that comprises a case 1702 holding the working chambers 506 that is mobile in the axial direction but is rotationally constrained, a shaft 602 rigidly connected to cam-rings that is immobile in the axial direction, an actuator 1702 to position the case in the axial direction, and compliant means of connecting the pump/motor 112 to the hydraulic circuit 118. This embodiment functions by displacing the case 1702 over the shaft 602 in the axial direction, which in turn alters the cam-ring profile aligned with the working chambers 506.

FIG. 17C depicts another embodiment that comprises an immobile case 1702 holding the working chambers 506, a shaft 602 rigidly connected to cam-rings and that is mobile in the axial direction, an actuator 1702 to position the shaft 602 in the axial direction, and a means of coupling rotation of the cam-ring connected shaft 602 and the tether engine 104 (or the pump/motor output shaft) that is compliant in the axial direction. This embodiment functions by displacing the shaft 602 within the case 1702 in the axial direction, which in turn alters the cam-ring profile aligned with the working chambers 506.

Figure 18B:
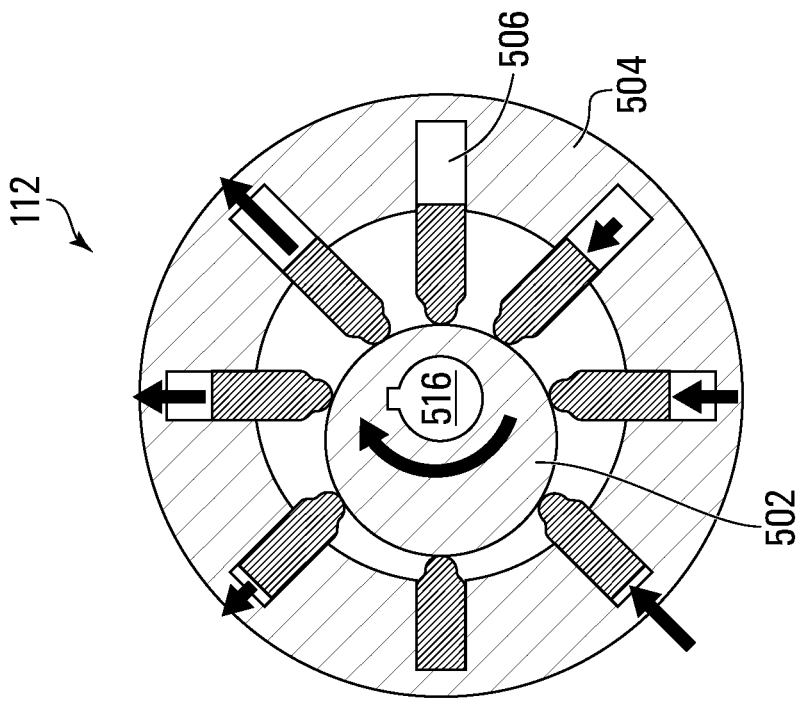
FIGS. 18A and 18B contrast example digital hydraulic machines in which the working chamber and cam-ring are concentric (FIG. 18A) and eccentric (FIG. 18B) relative to each other, according to additional embodiments.
Figure 18A:
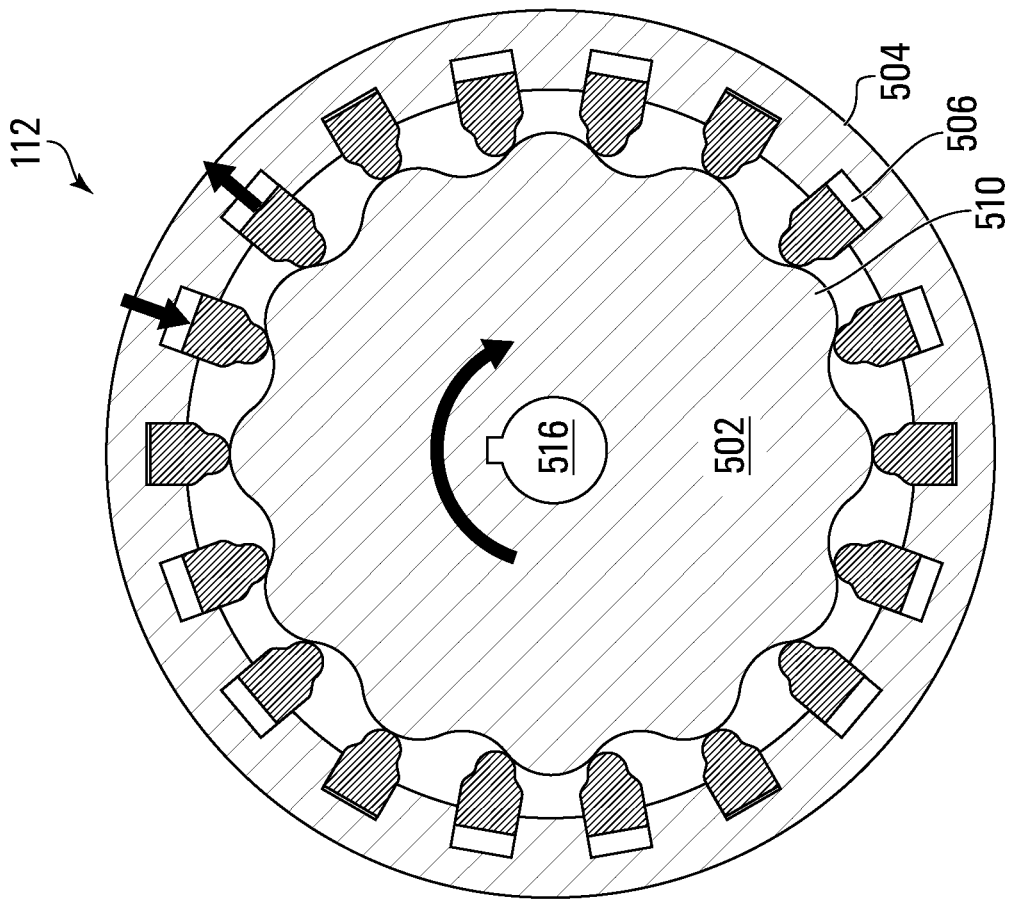

Referring now to FIG. 18B, there is shown another embodiment of the pump/motor 112 in which the cam-ring has no lobes 510 and is cylindrical. The cam-ring and the working chambers 506 are both ring-shaped and are eccentrically positioned relative to each other. Accordingly, even without any lobes 510 the relative rotation of the cam-ring and working groups 506 results in piston 508 reciprocation. An example of the displacement experienced per working chamber 506 for a concentrically arranged embodiment is shown in FIG. 18A for contrast.

Figure 19:
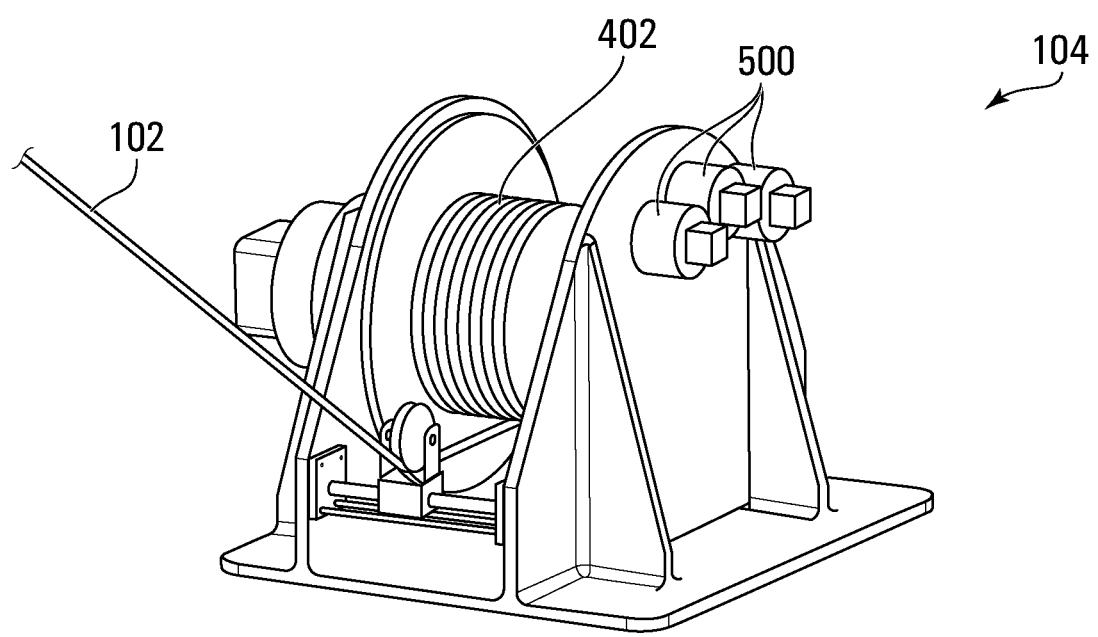
FIG. 19 depicts an example tether engine, according to another embodiment.

Referring now to FIG. 19, there is shown an example embodiment of the tether engine 104 comprising a drum 402 around which the tether 102 is wrapped, a ring gear 1902 having a center aligned with an axis of rotation of the drum 402 and fixedly coupled to the drum 402, and the hydraulic pump/motor 112. Three hydraulic pump/motors 112 are coupled to the ring gear 1902 and drive (when operating as a motor) and are driven by (when operating as a pump) the ring gear 1902. Each of the pump/motors 112 is coupled to the ring gear 1902 via a single reduction 1902 gear. In different embodiments (not depicted), two or more gears may be used to couple any one or more of the pump/motors 112 to the ring gear 1902 and/or one, two, or more than three hydraulic pump/motors 112 may be coupled to the ring gear 1902. In further different embodiments (not depicted), a variable speed gearbox may be used to couple the hydraulic pump/motor 112 to the drum 402.

The control system 106 operates the PKG as described above. The control strategy seeks to optimize cost of energy produced by controlling airfoil 200 trajectory, tether engine 104 direction and speed, energy accumulation, and/or electricity generation. These impact PKG power output and system wear, which impact revenue and operation and maintenance costs, which contribute to the cost of electricity.

One or more example embodiments have been described by way of illustration only. This description is presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. For example, in the depicted embodiments wind energy is harnessed and mechanically stored in an accumulator using hydraulic fluid to compress a body of gas. However, in different embodiments (not depicted), when mechanical energy storage and/or transfer is desired, pneumatics may be used in addition or as an alternative to hydraulics. Additionally, in certain other embodiments (not depicted), harnessed wind energy is non-mechanically stored. In one of those embodiments, the ground station may further comprise a means of electrical energy storage such as a battery or super-capacitor. In such an embodiment comprising electrical energy storage, a battery or super-capacitor may be electrically coupled (e.g., via a battery or super-capacitor interlink/controller) to the electrical generator 116 of the ground station and to the PKG electrical output connection. These embodiments may or may not still comprise a hydropneumatic accumulator 108 coupled to the hydraulic circuit 118; this allows the improved efficiency and robustness of a hydrostatic drivetrain, while also allowing the option to use emerging electrical energy storage technologies with progressively better efficiency and cost profiles. In certain embodiments in which energy storage is non-mechanical (e.g., electrical), an electric motor may be used in lieu of a hydraulic motor to retract the tether 102 during the retraction phase. For example, in embodiments in which harnessed wind energy is stored in a battery, the battery may directly power an electric motor during the retraction phase that in turn powers the tether engine to retract the tether.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. Additionally, use of "(s)" herein as a noun suffix, such as "noun(s)", means one or more of that noun.

It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Use of "and/or" in conjunction with a list of options herein means "any one or more of" those options.

The controller used in the foregoing embodiments may be, for example, a processing unit (such as a processor, microprocessor, or programmable logic controller) communicatively coupled to a non-transitory computer readable medium having stored on it program code for execution by the processing unit, microcontroller (which comprises both a processing unit and a non-transitory computer readable medium), field programmable gate array (FPGA), or an application-specific integrated circuit (ASIC). Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory.

It is contemplated that any part of any aspect or embodiment discussed in this specification can be implemented or combined with any part of any other aspect or embodiment discussed in this specification.

In construing the claims, it is to be understood that the use of a computer to implement the embodiments described herein is essential at least where the presence or use of computer equipment is positively recited in the claims.

The invention claimed is:

1. A method for harnessing wind energy using a tethered airfoil, the method comprising:
   during a traction phase, allowing wind to extend a tether mechanically coupled to at least one digital hydraulic machine operable to harness wind energy for generating electricity;
   storing at least some of the harnessed wind energy during the traction phase; and
   during a retraction phase, using at least some of the stored wind energy to cause the at least one digital hydraulic machine to retract the tether;
   wherein the at least one digital hydraulic machine comprises a plurality of working chambers each having an associated displacement, the plurality of working chambers configured to be selectively deactivated and further comprising during the retraction phase, deactivating one or more of the working chambers that are active during the traction phase to cause the at least one digital hydraulic machine to have a lower average displacement during the retraction phase than the traction phase.

2. The method of claim 1, wherein storing the at least some of the harnessed wind energy comprises mechanically storing the at least some of the harnessed wind energy.

3. The method of claim 1, wherein the at least one digital hydraulic machine comprises:
   a high pressure channel and a low pressure channel;
   for each of the working chambers, a piston movable in response to pressure within the working chamber, wherein each of the working chambers is selectively fluidly couplable to the high pressure channel and the low pressure channel to adjust the pressure; and
   lobes, wherein the lobes and working chambers are movable relative to each other and the lobes are shaped and positioned to cause the pistons to reciprocate when the working chambers and lobes move relative to each other and the pistons maintain contact with the lobes.

4. The method of claim 3, wherein deactivating one or more of the working chambers comprises, for each of at least some of the working chambers to be deactivated, fluidly coupling the working chamber to the same pressure channel for multiple reciprocations of the piston responsive to pressure within the working chamber.

5. The method of claim 4, wherein for each of at least some of the working chambers to be deactivated, the working chamber is fluidly coupled to the low pressure channel for multiple reciprocations of the piston.

6. The method of claim 3, wherein for each of at least some of the working chambers to be deactivated, deactivating the working chamber comprises:
   determining when reciprocation of the piston causes the working chamber to be at less than maximum volume; and
   when the working chamber is at less than maximum volume, sealing the working chamber from the high and low pressure channels.

7. The method of claim 6, wherein the working chamber is sealed when a peak of one of the lobes is in contact with the piston.

8. The method of claim 3, wherein for each of at least some of the working chambers to be deactivated, deactivating the working chamber comprises:
   fluidly coupling the working chamber to only the low pressure channel;
   increasing the pressure outside of the working chamber such that the piston moves to decrease the volume of the working chamber; and then
   sealing the working chamber from the low pressure channel.

9. The method of claim 8, wherein increasing the pressure outside of the working chamber comprises increasing the pressure within a case that houses the working chambers and the lobes, and further comprising sealing the working chambers that are to remain activated during the retraction phase from the high and low pressure channels prior to increasing the pressure within the case.

10. The method of claim 8, wherein the pressure outside of the working chamber is increased to a higher pressure than pressure in the low pressure channel.

11. The method of claim 8, further comprising a tension spring within the working chamber and connected to the piston and the working chamber,
   wherein the tension spring is biased to draw the piston within the working chamber and to apply a force to the piston less than that applied to the piston from the low pressure channel when the working chamber is fluidly coupled to only the low pressure channel.

12. The method of claim 10, further comprising a compression spring within at least one of the working chambers that is to remain activated during the retraction phase,
   wherein the compression spring is biased to push the piston out of the working chamber and to apply a force to the piston greater than the pressure within the case used to deactivate the at least some of the working chambers to be deactivated.

13. The method of claim 8, wherein the working chambers to be deactivated comprise a first and a second group of working chambers, and deactivating the one or more working chambers comprises:
   fluidly sealing the low pressure channel for the first group from the low pressure channel for the second group;
   fluidly coupling the first and second groups of working chambers to the low pressure channels for the first and second groups, respectively;
   pressurizing the low pressure channels for the first and second groups, wherein the low pressure channel for the first group is pressurized to a pressure higher than that of the low pressure channel for the second group;
   increasing the pressure outside of the first and second groups to be between the pressure of the low pressure channels for the first and second groups; and then
   sealing the second group from the low pressure channel for the second group.

14. The method of claim 13, wherein the low pressure channels for the first and second groups are fluidly coupled together when the first and second groups are activated.

15. The method of claim 1, wherein the at least one digital hydraulic machine comprises:
   a first group and a second group of working chambers;
   a first and a second high pressure channel and a first and a second low pressure channel;
   for each of the working chambers, a piston movable in response to pressure within the working chamber, wherein each of the first and second groups of working chambers is selectively fluidly couplable to the first high and low pressure channels and the second high and low pressure channels to adjust the pressure, respectively;
   a first and second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes;
   a first case containing the first group of working chambers and the pistons movable in response to the pressure therein, first high and low pressure channels, and first group of lobes; and
   a second case containing the second group of working chambers and the pistons movable in response to the pressure therein, second high and low pressure channels, and second group of lobes;
   wherein the first and second cases are fluidly sealed from each other, and wherein the method further comprises deactivating, during the retraction phase, at least some of one of the groups of the working chambers by pressurizing the case containing the one of the groups of working chambers to a pressure higher than that of the low pressure channel for the one of the groups of working chambers.

16. The method of claim 1, wherein the at least one digital hydraulic machine comprises:
   a first group and a second group of working chambers;
   a first and a second high pressure channel and a first and a second low pressure channel;
   for each of the working chambers, a piston movable in response to pressure within the working chamber, wherein each of the first and second groups of working chambers is selectively fluidly couplable to the first high and low pressure channels and the second high and low pressure channels to adjust the pressure, respectively; and
   a first and a second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes;
   wherein the first group of working chambers comprises part of one of a first rotor or a first stator and the first group of lobes comprises part of the other of the first rotor or the first stator;

wherein the second group of working chambers comprises part of one of a second rotor or a second stator and the second group of lobes comprises part of the other of the second rotor or the second stator;

wherein a full rotation of the first rotor relative to the first stator results in a higher displacement than a full rotation of the second rotor relative to the second stator; and wherein allowing wind to extend the tether during the traction phase comprises allowing extension of the tether to cause rotation of at least the first rotor relative to the first stator and, during the retraction phase, retracting the tether using rotation of the second rotor relative to the second stator without allowing the first rotor to rotate relative to the first stator.

17. The method of claim 16, wherein the first rotor and stator respectively have a larger ring diameter than the second rotor and stator.

18. The method of claim 16, wherein the first and second rotors are respectively located along a first and a second shaft and wherein a clutch is operable to couple the shafts together.

19. The method of claim 16, wherein each of the rotors is located along a shaft about which the rotors rotate and a first and a second clutch respectively couple the first and second rotors to the shaft.

20. The method of claim 1, wherein the at least one digital hydraulic machine comprises:
a high pressure channel and a low pressure channel;
for each of the working chambers, a piston movable in response to pressure within the working chamber, wherein each of the working chambers is selectively fluidly couplable to the high pressure channel and the low pressure channel to adjust the pressure; and
an axially extending ring of lobes, wherein the working chambers are axially and peripherally movable relative to the lobes, the lobes are shaped and positioned to cause the pistons to reciprocate when the working chambers and lobes respectively move peripherally relative to each other and the pistons maintain contact with the lobes, and the lobes axially vary in at least one of amplitude and number such that total displacement of the working chambers resulting from a full rotation of the ring of lobes depends on axial position of the working chambers relative to the lobes;
wherein the method further comprises, axially moving the working chambers and ring of lobes relative to each other such that the total displacement of the working chambers is higher during the traction phase than the retraction phase.

21. The method of claim 20, wherein the total displacement of the working chambers resulting from a full rotation of lobes relative to the working chambers changes monotonically as relative movement between the lobes and working chambers progresses axially in one direction.

22. The method of claim 20, wherein as the lobes and working chambers move axially relative to each other in the one direction, the total displacement changes, stays constant, and then changes again.

23. The method of claim 20, wherein the ring of lobes comprises part of a rotor and wherein the working chambers comprise part of a stator, and wherein relative axial movement of the working chambers and ring of lobes is caused by moving the ring of lobes axially along a shaft.

24. The method of claim 20, wherein the ring of lobes comprises part of a rotor and the working chambers comprise part of a stator, and wherein relative axial movement of the working chambers and ring of lobes is caused by axially moving a shaft on which the ring of lobes is secured.

25. The method of claim 20, wherein the ring of lobes comprises part of a rotor and the working chambers comprise part of a stator, and wherein relative axial movement of the working chambers and ring of lobes is caused by axially moving a case containing the working chambers.

26. The method of claim 1, wherein the tether is mechanically extended and retracted using a linear tether engine.

27. The method of claim 26, wherein the linear tether engine comprises wheels between which the tether is linearly extended and retracted.

28. The method of claim 26, wherein the linear tether engine comprises tracks between which the tether is linearly extended and retracted.

29. The method of claim 26, wherein the linear tether engine comprises belts between which the tether is linearly extended and retracted.

30. The method of claim 1, wherein the tether is mechanically extended and retracted using a tether engine, the tether engine comprising:
a drum around which the tether is wrapped; and
a ring gear having a center aligned with an axis of rotation of the drum and fixedly coupled to the drum;
wherein the at least one digital hydraulic machine is mechanically coupled to the tether engine via the ring gear.

31. The method of claim 1, wherein the working chambers of the at least one digital hydraulic machine are disposed in a ring and wherein the at least one digital hydraulic machine comprises:
a ring of working chambers;
a high pressure channel and a low pressure channel;
for each of the working chambers, a piston movable in response to pressure within the working chamber, wherein each of the working chambers is selectively fluidly couplable to the high pressure channel and the low pressure channel to adjust the pressure; and
a cam-ring eccentrically positioned relative to the ring of working chambers, wherein the cam-ring and working chambers are rotatable relative to each other such that the pistons reciprocate when the working chambers and cam-ring rotate relative to each other and the pistons maintain contact with the cam-ring.

32. The method of claim 1, further comprising generating electricity during the traction and retraction phases using at least some of the wind energy that is harnessed during the traction phase to power a generator using a hydraulic motor that is mechanically coupled to the generator.

33. The method of claim 32 wherein, during the traction phase, the generator is powered using a portion of the harnessed wind energy that is not stored during the traction phase.

34. The method of claim 33 wherein, during the traction phase, the generator is also powered using a portion of the harnessed wind energy that has been stored during the traction phase or during a previous traction phase.

35. A system for harnessing wind energy using a tethered airfoil, the system comprising:
an airfoil;
a tether coupled to the airfoil;
a tether engine coupled to the tether and configured to allow the tether to extend during a traction phase and to retract the tether during a retraction phase;
a hydraulic circuit;
at least one digital hydraulic machine mechanically coupled to the tether engine and hydraulically coupled to the hydraulic circuit, the at least one digital hydraulic machine configured to harness wind energy during the traction phase via extension of the tether from the tether engine, the wind energy being transferred by the at least one digital hydraulic machine to the hydraulic circuit for generating electrical energy, wherein the at least one digital hydraulic machine comprises working chambers having an associated displacement, the working chambers configured to be selectively deactivated;

wherein the at least one digital hydraulic machine is further configured to receive energy from the hydraulic circuit to actuate the tether engine to retract the tether during the retraction phase; and a control system communicatively coupled to the at least one digital hydraulic machine, the control system configured to:
during a traction phase, cause at least some of the harnessed wind energy transferred to the hydraulic circuit to be stored; and
during the traction phase, cause one or more of the working chambers that are active during the traction phase to be deactivated to cause the at least one digital hydraulic machine to have a lower average displacement during the retraction phase than the traction phase;
cause at least some of the stored wind energy to be transferred via the hydraulic circuit back to the at least one digital hydraulic machine to retract the tether.

36. The system of claim 35, wherein the hydraulic circuit comprises:
a high-pressure circuit;
a low-pressure circuit;
an accumulator hydraulically coupled to the high-pressure circuit and configured to store harnessed wind energy; and
a low pressure reservoir hydraulically coupled to the low-pressure circuit.

37. The system of claim 35, wherein the at least one digital hydraulic machine comprises:
a high pressure channel and a low pressure channel;
for each of the working chambers, a piston movable in response to pressure within the working chamber, wherein each of the working chambers is selectively fluidly couplable to the high pressure channel and the low pressure channel to adjust the pressure; and
lobes, wherein the lobes and working chambers are movable relative to each other and the lobes are shaped and positioned to cause the pistons to reciprocate when the working chambers and lobes move relative to each other and the pistons maintain contact with the lobes.

38. The system of claim 37, wherein deactivating one or more of the working chambers comprises, for each of at least some of the working chambers to be deactivated, fluidly coupling the working chamber to the same pressure channel for multiple reciprocations of the piston responsive to pressure within the working chamber.

39. The system of claim 38, wherein for each of at least some of the working chambers to be deactivated, the control system causes the working chamber to be fluidly coupled to the low pressure channel for multiple reciprocations of the piston.

40. The system of claim 37, wherein for each of at least some of the working chambers to be deactivated, deactivating the working chamber comprises:
determining when reciprocation of the piston causes the working chamber to be at less than maximum volume; and
when the working chamber is at less than maximum volume, sealing the working chamber from the high and low pressure channels.

41. The system of claim 40, wherein the control system is further configured to cause the working chamber to be sealed when a peak of one of the lobes is in contact with the piston.

42. The system of claim 37, wherein for each of at least some of the working chambers to be deactivated, deactivating the working chamber comprises:
fluidly coupling the working chamber to only the low pressure channel;
increasing the pressure outside of the working chamber such that the piston moves to decrease the volume of the working chamber; and then
sealing the working chamber from the low pressure channel.

43. The system of claim 42, wherein the at least one digital hydraulic machine further comprises a case that houses the working chambers and the lobes, wherein increasing the pressure outside of the working chamber comprises increasing the pressure within the case, and wherein the control system is further configured to seal the working chambers that are to remain activated during the retraction phase from the high and low pressure channels prior to increasing the pressure within the case.

44. The system of claim 42, wherein the pressure outside of the working chamber is increased to a higher pressure than the pressure in the low pressure channel.

45. The system of claim 42, wherein the least one digital hydraulic machine further comprises a tension spring within the working chamber and connected to the piston and the working chamber, the tension spring biased to draw the piston within the working chamber and to apply a force to the piston less than that applied to the piston from the low pressure channel when the working chamber is fluidly coupled to only the low pressure channel.

46. The system of claim 44, wherein the at least one digital hydraulic machine further comprises a compression spring within at least one of the working chambers that is to remain activated during the retraction phase, the compression spring biased to push the piston out of the working chamber and to apply a force to the piston greater than the pressure within the case used to deactivate the at least some of the working chambers to be deactivated.

47. The system of claim 42, wherein the working chambers to be deactivated comprise a first and a second group of working chambers, and wherein deactivating the one or more working chambers comprises:
fluidly sealing the low pressure channel for the first group from the low pressure channel for the second group;
fluidly coupling the first and second groups of working chambers to the low pressure channels for the first and second groups, respectively;
pressurizing the low pressure channels for the first and second groups, wherein the low pressure channel for the first group is pressurized to a pressure higher than that of the low pressure channel for the second group;
increasing the pressure outside of the first and second groups to be between the pressure of the low pressure channels for the first and second groups; and then
sealing the second group from the low pressure channel for the second group.

48. The system of claim 47, wherein the control system causes the low pressure channels for the first and second groups to be fluidly coupled when the first and second groups are activated.

49. The system of claim 35, wherein the working chambers of the at least one digital hydraulic machine comprise a first group and a second group of working chambers and wherein the at least one digital hydraulic machine comprises:
- a first and a second high pressure channel and a first and a second low pressure channel;
- for each of the working chambers, a piston movable in response to pressure within the working chamber, wherein each of the first and second groups of working chambers is selectively fluidly couplable to the first high and low pressure channels and the second high and low pressure channels to adjust the pressure, respectively;
- a first and second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes;
- a first case containing the first group of working chambers and the pistons movable in response to the pressure therein, first high and low pressure channels, and first group of lobes; and
- a second case containing the second group of working chambers and the pistons movable in response to the pressure therein, second high and low pressure channels, and second group of lobes;
- wherein the first and second cases are fluidly sealed from each other, and wherein the control system is further configured to deactivate during the retraction phase, at least some of one of the groups of the working chambers by pressurizing the case containing the one of the groups of working chambers to a pressure higher than that of the low pressure channel for the one of the groups of working chambers.

50. The system of claim 35, wherein the working chambers of the at least one digital hydraulic machine comprise a first group and a second group of working chambers and wherein the at least one digital hydraulic machine comprises:
- a first and a second high pressure channel and a first and a second low pressure channel;
- for each of the working chambers, a piston movable in response to pressure within the working chamber, wherein each of the first and second groups of working chambers is selectively fluidly couplable to the first high and low pressure channels and the second high and low pressure channels to adjust the pressure, respectively; and
- a first and a second group of lobes, wherein the first and second groups of working chambers are respectively movable relative to the first and second groups of lobes and wherein the lobes are shaped and positioned to cause the pistons to reciprocate when the first and second groups of working chambers and the first and second groups of lobes respectively move relative to each other and the pistons maintain contact with the lobes;
- wherein the first group of working chambers comprises part of one of a first rotor or a first stator and the first group of lobes comprises part of the other of the first rotor or the first stator;
- wherein the second group of working chambers comprises part of one of a second rotor or a second stator and the second group of lobes comprises part of the other of the second rotor or the second stator;
- wherein a full rotation of the first rotor relative to the first stator results in a higher displacement than a full rotation of the second rotor relative to the second stator; and
- wherein the control system is further configured to, during the traction phase, harness the wind energy by allowing extension of the tether to cause rotation of at least the first rotor relative to the first stator and, during the retraction phase, retracting the tether using rotation of the second rotor relative to the second stator without allowing the first rotor to rotate relative to the first stator.

51. The system of claim 50, wherein the first rotor and stator respectively have a larger ring diameter than the second rotor and stator.

52. The system of claim 50, further comprising a shaft on which the rotors rotate and a clutch, on the shaft, between the rotors.

53. The system of claim 50 further comprising a shaft on which the rotors rotate, and a first clutch and a second clutch respectively coupling the first and second rotors to the shaft.

54. The system of claim 35, wherein the at least one digital hydraulic machine comprises:
- a high pressure channel and a low pressure channel;
- for each of the working chambers, a piston movable in response to pressure within the working chamber, wherein each of the working chambers is selectively fluidly couplable to the high pressure channel and the low pressure channel to adjust the pressure; and
- an axially extending ring of lobes, wherein the working chambers are axially and peripherally movable relative to the lobes, the lobes are shaped and positioned to cause the pistons to reciprocate when the working chambers and lobes respectively move peripherally relative to each other and the pistons maintain contact with the lobes, and the lobes axially vary in at least one of amplitude and number such that total displacement of the working chambers resulting from a full rotation of the ring of lobes depends on axial position of the working chambers relative to the lobes;
- wherein the control system is further configured to axially move the working chambers and ring of lobes relative to each other such that the total displacement of the working chambers is higher during the traction phase than the retraction phase.

55. The system of claim 54, wherein the total displacement of the working chambers resulting from a full rotation of lobes relative to the working chambers changes monotonically as relative movement between the lobes and working chambers progresses axially in one direction.

56. The system of claim 55, wherein as the lobes and working chambers move axially relative to each other in the one direction, the total displacement changes, stays constant, and then changes again.

57. The system of claim 54, wherein the ring of lobes comprises part of a rotor and the working chambers comprise part of a stator, and relative axial movement of the working chambers and ring of lobes is caused by moving the ring of lobes axially along a shaft.

58. The system of claim 54, wherein the ring of lobes comprises part of a rotor and the working chambers comprise part of a stator, and relative axial movement of the working chambers and ring of lobes is caused by axially moving a shaft on which the ring of lobes is secured.

59. The system of claim 54, wherein the ring of lobes comprises part of a rotor and the working chambers comprise part of a stator, and relative axial movement of the working chambers and ring of lobes is caused by axially moving a case containing the working chambers.

60. The system of claim 36, wherein the tether engine linearly extends and retracts the tether.

61. The system of claim 60, wherein the tether engine comprises wheels between which the tether is linearly extended and retracted.

62. The system of claim 60, wherein the tether engine comprises tracks between which the tether is linearly extended and retracted.

63. The system of claim 60, wherein the tether engine comprises belts between which the tether is linearly extended and retracted.

64. The system of claim 35, wherein the tether engine comprises:
 a drum around which the tether is wrapped; and
 a ring gear having a center aligned with an axis of rotation of the drum and fixedly coupled to the drum;
 wherein the at least one digital hydraulic machine is mechanically coupled to the tether engine via the ring gear.

65. The system of claim 35, wherein the working chambers of the at least one digital hydraulic machine are disposed in a ring and wherein the at least one digital hydraulic machine comprises:
 a high pressure channel and a low pressure channel;
 for each of the working chambers, a piston movable in response to pressure within the working chamber, wherein each of the working chambers is selectively fluidly couplable to the high pressure channel and the low pressure channel to adjust the pressure; and
 a cam-ring eccentrically positioned relative to the ring of working chambers, wherein the cam-ring and working chambers are rotatable relative to each other such that the pistons reciprocate when the working chambers and cam-ring rotate relative to each other and the pistons maintain contact with the cam-ring.

66. The system of claim 35, further comprising a hydraulic motor fluidly coupled to the hydraulic circuit and a generator mechanically coupled to the hydraulic motor, wherein the control system is further configured to power the generator during the traction and retraction phases using at least some of the wind energy that is harnessed.

67. The system of claim 66 wherein, during the traction phase, the generator is powered using wind energy that is harnessed and not stored during the traction phase.

68. The system of claim 67 wherein, during the traction phase, the generator is also powered using wind energy that has been stored after being harnessed during the traction phase or a previous traction phase.

69. A non-transitory computer readable medium having stored thereon computer program code, executable by a processor, and that when executed by the processor causes the processor to perform a method for harnessing wind energy using a tethered airfoil, the method comprising:
 during a traction phase, allowing wind to extend a tether mechanically coupled to at least one digital hydraulic machine operable to harness wind energy for generating electricity;
 storing at least some of the harnessed wind energy during the traction phase; and
 during a retraction phase, using at least some of the stored wind energy to cause the at least one digital hydraulic machine to retract the tether;
 wherein the at least one digital hydraulic machine comprises a plurality of working chambers each having an associated displacement, the plurality of working chambers configured to be selectively deactivated and further comprising during the retraction phase, deactivating one or more of the working chambers that are active during the traction phase to cause the at least one digital hydraulic machine to have a lower average displacement during the retraction phase than the traction phase.

* * * * *